US009784843B2

(12) United States Patent
Dolinar et al.

(10) Patent No.: US 9,784,843 B2
(45) Date of Patent: Oct. 10, 2017

(54) ENHANCED ROADWAY MARK LOCATOR, INSPECTION APPARATUS, AND MARKER

(71) Applicant: LimnTech LLC, Souderton, PA (US)

(72) Inventors: Douglas D. Dolinar, Doylestown, PA (US); William R. Haller, Bethlehem, PA (US); Matthew W. Smith, Towanda, PA (US); Charles C. Stahl, Matawan, NJ (US)

(73) Assignee: Limn Tech LLC, Souderton, PA (US)

( * ) Notice: Subject to any disclaimer, the term of this patent is extended or adjusted under 35 U.S.C. 154(b) by 5 days.

(21) Appl. No.: 15/082,365

(22) Filed: Mar. 28, 2016

(65) Prior Publication Data

US 2016/0209511 A1 Jul. 21, 2016

Related U.S. Application Data

(63) Continuation-in-part of application No. 13/728,062, filed on Dec. 27, 2012, now Pat. No. 9,298,991, (Continued)

(51) Int. Cl.
*B60R 22/00* (2006.01)
*G01S 19/14* (2010.01)
(Continued)

(52) U.S. Cl.
CPC ............... *G01S 19/14* (2013.01); *B60R 1/00* (2013.01); *E01C 23/163* (2013.01); *E01H 5/06* (2013.01);
(Continued)

(58) Field of Classification Search
CPC ......... G01S 19/14; B60R 1/00; E01C 23/163; E01H 5/06; F16M 13/022; G01C 15/02;
(Continued)

(56) References Cited

U.S. PATENT DOCUMENTS 4,219,092 A 8/1980 Richter
4,460,127 A 7/1984 Hofmann
(Continued)

FOREIGN PATENT DOCUMENTS

CN 203047061 7/2013
DE 4437297 4/1996
(Continued)

OTHER PUBLICATIONS

1st Office Action dated Mar. 18, 2016 with English Translation from corresponding Japanese Application No. 2014-553359.
(Continued)

*Primary Examiner* — Shardul Patel
(74) *Attorney, Agent, or Firm* — Stradley Ronon Stevens & Young, LLP

(57) ABSTRACT

An apparatus for locating, inspecting, or placing marks on a roadway. The apparatus includes a GPS-based machine vision locator for sampling discrete geographical location data of a pre-existing roadway mark evident on the roadway. A computer may determine a continuous smooth geographical location function fitted to the sampled geographical location data. A marker is responsive to the GPS-based locator and geographical location function for replicating automatically the pre-existing roadway mark onto the roadway. The apparatus is typically part of a moving vehicle. A related method is disclosed for locating, inspecting, and placing marks on a resurfaced roadway. A similar apparatus can be used to guide a vehicle having a snow plow along a snow-covered roadway, or a paving machine along an unpaved roadway surface. The apparatus provides for accurate determination of roadway mark locations, roadway mark inspection apparatus and roadway markers using Bayesian model-based filtered enhanced GPS geographical location data.

38 Claims, 23 Drawing Sheets

Related U.S. Application Data which is a continuation-in-part of application No. 13/351,829, filed on Jan. 17, 2012, now Pat. No. 8,467,968.

(60) Provisional application No. 62/288,682, filed on Jan. 29, 2016.

(51) Int. Cl.

| | | |
|---|---|---|
| *E01H 5/06* | (2006.01) | |
| *G07C 5/08* | (2006.01) | |
| *E01C 23/16* | (2006.01) | |
| *B60R 1/00* | (2006.01) | |
| *F16M 13/02* | (2006.01) | |
| *G01C 15/02* | (2006.01) | |
| *G06K 9/00* | (2006.01) | |
| *G06K 9/62* | (2006.01) | |
| *B62D 5/04* | (2006.01) | |

(52) U.S. Cl.
CPC ........... *F16M 13/022* (2013.01); *G01C 15/02* (2013.01); *G06K 9/00798* (2013.01); *G06K 9/6278* (2013.01); *G07C 5/08* (2013.01); *B60R 2300/105* (2013.01); *B60R 2300/302* (2013.01); *B60R 2300/804* (2013.01); *B62D 5/0463* (2013.01)

(58) Field of Classification Search
CPC .... G06K 9/00798; G06K 9/6278; G07C 5/08; G07C 2300/105; G07C 2300/302; G60R 2300/804; B62D 5/0463
USPC ............... 701/49, 46, 23, 28, 117, 468, 469; 342/357.09; 404/93; 427/136, 137, 427/427.2
See application file for complete search history.

(56) References Cited

U.S. PATENT DOCUMENTS

| | | | |
|---|---|---|---|
| 4,832,331 A | 5/1989 | Brandli | |
| 5,220,876 A | 6/1993 | Monson et al. | |
| 5,296,256 A | 3/1994 | Hartman | |
| 5,375,059 A | 12/1994 | Kyrtsos et al. | |
| 5,529,433 A | 6/1996 | Huynh et al. | |
| 5,540,516 A | 7/1996 | Nicodemo et al. | |
| 5,549,412 A | 8/1996 | Malone | |
| 5,599,133 A | 2/1997 | Costello et al. | |
| 5,653,389 A | 8/1997 | Henderson et al. | |
| 5,746,539 A | 5/1998 | Mara | |
| 5,771,169 A | 6/1998 | Wendte | |
| 5,836,398 A | 11/1998 | White | |
| 5,838,277 A | 11/1998 | Loomis et al. | |
| 5,848,373 A | 12/1998 | DeLorme et al. | |
| 5,857,066 A | 1/1999 | Wyche et al. | |
| 5,990,469 A | 11/1999 | Bechtel et al. | |
| 5,995,902 A | 11/1999 | Monson | |
| 6,074,693 A | 6/2000 | Manning | |
| 6,115,481 A | 9/2000 | Wiens | |
| 6,299,934 B1 * | 10/2001 | Manning ................ | B05B 12/12 342/357.34 |
| 6,330,503 B1 | 12/2001 | Sharp et al. | |
| 6,723,375 B2 | 4/2004 | Zeck et al. | |
| 6,729,706 B1 | 5/2004 | Patton et al. | |
| 6,951,375 B2 | 10/2005 | Patton et al. | |
| 7,029,199 B2 | 4/2006 | Mayfield et al. | |
| 7,370,818 B2 | 5/2008 | Ward et al. | |
| 7,552,008 B2 | 6/2009 | Newstrom et al. | |
| 7,640,105 B2 | 12/2009 | Nielsen et al. | |
| 7,698,032 B2 | 4/2010 | Matsumoto et al. | |
| 7,832,762 B2 | 11/2010 | Breed | |
| 7,866,917 B2 | 1/2011 | Malit | |
| 7,899,611 B2 | 3/2011 | Downs et al. | |
| 7,970,529 B2 | 6/2011 | Mori et al. | |
| 7,981,462 B2 | 7/2011 | Bustgens | |
| 8,190,362 B2 | 5/2012 | Barker et al. | |
| 8,935,057 B2 | 1/2015 | Dolinar et al. | |
| 9,098,751 B2 | 8/2015 | Hilldore et al. | |
| 9,298,991 B2 * | 3/2016 | Dolinar .................. | G01C 15/02 |
| 2002/0040962 A1 * | 4/2002 | Schofield ............... | B60N 2/002 250/208.1 |
| 2002/0044087 A1 * | 4/2002 | Krasner ................ | G01C 21/206 342/357.64 |
| 2003/0058346 A1 | 3/2003 | Bechtel et al. | |
| 2003/0139879 A1 | 7/2003 | Krasner | |
| 2004/0124260 A1 | 7/2004 | Ward et al. | |
| 2006/0215882 A1 | 9/2006 | Ando et al. | |
| 2007/0128899 A1 | 6/2007 | Mayer | |
| 2007/0208497 A1 | 9/2007 | Downs et al. | |
| 2008/0046174 A1 | 2/2008 | Johnson | |
| 2008/0203187 A1 | 8/2008 | Ward et al. | |
| 2009/0118994 A1 | 5/2009 | Mori et al. | |
| 2010/0025709 A1 * | 2/2010 | Koseki .................... | H01L 33/56 257/98 |
| 2010/0091017 A1 * | 4/2010 | Kmiecik ................ | G01C 11/02 345/420 |
| 2010/0104199 A1 | 4/2010 | Zhang et al. | |
| 2010/0185382 A1 | 7/2010 | Barker et al. | |
| 2010/0256912 A1 | 10/2010 | Nielsen et al. | |
| 2010/0257029 A1 | 10/2010 | Nielsen et al. | |
| 2010/0259609 A1 | 10/2010 | Takahashi | |
| 2010/0262470 A1 | 10/2010 | Nielsen et al. | |
| 2010/0263591 A1 | 10/2010 | Nielsen et al. | |
| 2010/0286899 A1 * | 11/2010 | Jain ........................ | G08G 1/127 701/119 |
| 2010/0295668 A1 * | 11/2010 | Kataoka ............... | B62D 15/025 340/435 |
| 2011/0039021 A1 | 2/2011 | Persson et al. | |
| 2011/0285849 A1 | 11/2011 | Schofield et al. | |
| 2012/0054028 A1 | 3/2012 | Tengler et al. | |
| 2012/0072080 A1 * | 3/2012 | Jeromin ................. | B60Q 1/143 701/49 |
| 2012/0098657 A1 | 4/2012 | Bogatine | |
| 2015/0127223 A1 | 5/2015 | Dolinar et al. | |

FOREIGN PATENT DOCUMENTS

| | | |
|---|---|---|
| DE | 102005044977 | 3/2007 |
| EP | 1486799 | 12/2004 |
| JP | 2005-242460 | 9/2005 |
| JP | 2007316767 | 12/2007 |
| JP | 2009-237901 | 10/2009 |
| JP | 2009223220 | 10/2009 |
| JP | 2009223817 | 10/2009 |
| JP | 2009258651 | 11/2009 |
| JP | 2009259215 | 11/2009 |
| JP | 2010-506291 | 2/2010 |
| JP | 2010175756 | 8/2010 |

OTHER PUBLICATIONS

A Comparative Study of Location Aided Routing Protocols for MANET; Hnatyshin, V. et al.; Wireless Days (WD) 2011 IFIP; Digital Object Identifier; Publication Year 2011; pp. 1-3.

A Study of Precise Road Feature Localization Using Mobile Mapping System; Ishikawa, K., Amano, Y., Hashizume, T., Takiguchi, J.; Advanced intelligent mechatronics, 2007 IEEE/ASME international conference on: 10.1109/AIM.2007.4412541; Publication Year 2007; pp. 1-6.

Click4BuildingID@NTU: Click for Building Identification with GPS-enabled Camera Cell Phone; Chai Kiat Yeo; Liang-Tien Chia; Tat Jen Cham; Rajon, D.; Multimedia and Expo, 2007 IEEE International Conference on; Digital Object Identifier: 10.1109/ICME.2007.4284836; Publication Year: 2007, pp. 1059-1062.

GeoLANMAR: Geo Assisted Landmark Routing For Scalable, Troup Motion Wireless Ad Hoc Networks; Zhou B. et al.; Vehicular Technology Conference 2005; 2005 IEEE 61st; vol. 4; Digital Object Identifier; Publication Year 2005; pp. 2420-2424 vol. 4.

GPS Multipath Mitigation for Urban Area Using Omnidirectional Infrared Camera; Meguro, J., Murata, T., Takiguchi, J., Amano, Y.;

(56) References Cited

OTHER PUBLICATIONS

Hashizume, T.; Intelligent Transportation Systems, IEEE Transactions on; vol. 10, Issue 1; Digital Object Identifier: 10.1109/TITS.2008.2011688; Publication Year 2009; pp. 22-30.
Implementation of GPS for Location Tracking; Ariffin et al.; Control and System Graduate Research Colloquium (ICSGRC), 2011 IEEE; Digital Object Identifier; 10.1109/ICSGRC.2011.5991833; Publication Year 2011; pp. 77-81.
Intelligent Vehicle Localization Using GPS, Compass, and Machine Vision; Limsoonthrakul, S.; Dailey, M.N.; Parnichkun, M.; Intelligent Robots and Systems, 2009; IROS 2009; IEEE/RSJ International Conference on; DOI: 10.1109/IROS.2009.5354042; Publication Year 2009; pp. 3981-3986.
International Search Report dated May 9, 2013 for international application No. PCT/US2013/021684.
Lane detection with roadside structure using on-board monocular camera; Watanabe, A.; Naito, T.; Ninomiya, Y,; Intelligent Vehicles Symposium, 2009 IEEE; Digital Object Indentifier: 10.1109/IVS.2009.5164276; Publication Year 2009; pp. 191-196.
Light-weight localization for vehicles using road markings; Ranganathan, A.; Illstrup.D.; Tao Wu; 2013 IEEE/RSJ International Conference on Intelligent Robots and Systems (IROS), Nov. 3-7, 2013, Tokyo, Japan; Publication Year 2013; pp. 921-927.
Localization Algorithms for Distributed Platform Among Vehicles; Tsuchiya, T.; Yoshinaga, H.; Lihan, M.; Koyanagi, K.; Ultra Modern Telecommunications & Workshops, 2009; ICUMT '09; International Conference on; DOI: 10.1109/ICUMT.2009.5345615; Publication Year 2009; pp. 1-6.
Map-based Lane Identification and Prediction for Autonomous Vehicles; Leonardo et al.; Electro/Information Technology (EIT), 2014 IEEE International Conference; Publication Year 2014; pp. 448-453.
Mapping and localization using GPS, lane markings and proprioceptive sensors; Tao et al.; 2013 IEEE/RSJ International Conference on Intelligent Robots and Systems (IROS); Publication Year 2013; pp. 406-412.
Notice of Allowance dated Sep. 3, 2014 for U.S. Appl. No. 13/741,573 with PTO-892, Notice of References.
Online Road Segmentation for Urban Complex Environments; Suzuki, M.; Saitoh, T.; Terada E.; Kuroda, Y.; Communications and Information Technologies (ISCIT), 2010 International Symposium on; DOI: 10.1109/ISCIT.2010.5665142; Publication Year 2010, pp. 1039-1044.
Performance analysis of a shipborne gyrocompass with a multi-antenna GPS system; Lu, G.,; Lachapelle, G.; Cannon, M.E.; Vogel, B.; Position Location and Navigation Symposium, 1994., IEEE; Digital Object Identifier: 10.1109/PLANS, 1994.303334; Publication Year: 1994, pp. 337-343.
Segmentation of Dense Range Information in Complex Urban Scenes; Schoenberg, J.R.; Nathan A.; Campbell, M.; Intelligent Robots and Systems (IROS); 2010 IEEE/RSJ International Conference on; DOI: 10.1109/IROS2010.5651749; Publication Year 2010; pp. 2033-2038.
Stop-line Detection and Localization Method for Intersection Scenarios; Marita et al.; Intelligent Computer Communication and Processing (ICCP), 2011 IEEE International Conference; Publication Year 2011; pp. 293-298.
Supporting Drivers in Keeping Safe Speed and Safe Distance: The SASPENCE Subproject Within the European Framework Frogramme 6 Integrating Project PReVENT; Bertolazzi, E. et al.; Intelligent Transportation Systems, IEEE Trans. on; vol. 11, Issue 3; Digital Object ID: 10.1109/TITS.2009.2035925; Pub. Yr. 2010; pp. 525-538.
EPO Communication dated Mar. 2, 2016 with the Supplementary European Search Report.

\* cited by examiner

ENHANCED ROADWAY MARK LOCATOR, INSPECTION APPARATUS, AND MARKER

CROSS REFERENCE TO RELATED APPLICATIONS

This application is a continuation-in-part of U.S. patent application Ser. No. 13/728,062, filed on Dec. 27, 2012, which is a continuation-in-part of U.S. patent application Ser. No. 13/351,829, filed on Jan. 17, 2012 and issued as U.S. Pat. No. 8,467,968 on Jun. 18, 2013. This application further claims priority to U.S. Provisional Patent Application No. 62/288,682 filed Jan. 29, 2016. All prior applications are incorporated by reference into this document, in their entirety and for all purposes.

TECHNICAL FIELD

The present invention relates generally to GPS-based machine vision locating and inspecting systems and to devices for making a visual indicia in or on top of pavement. More particularly, the present invention relates to a vehicle-mounted Bayesian model-based filter-enhanced GPS-based locating and inspecting systems for determining the geographical location and condition of roadway marks, and Bayesian model-based filter-enhanced GPS-based systems used for painting or otherwise "marking" roadway traffic lane demarcation lines.

BACKGROUND OF THE INVENTION

New or repaved roadway surfaces almost always require the application of roadway surface markings as a mechanism for visually providing motorists with lane demarcation lines for controlling and directing traffic. In the past, the process of applying new roadway surface markings consisted of first manually determining the center of the roadway surface and painting small dots to visually define the roadway center. A driver of a paint vehicle would then use the roadway center to guide a paint sprayer which would deposit paint along the path defined by the small dots.

Currently, this task is accomplished by determining the center of the roadway at a first location point by manually measuring the width of the roadway and placing a mark at the center point. This process is then repeated to determine the center point of the roadway at a second location point which is displaced from the first point. These two points now define the starting and ending points for a line segment which identifies the center path of the roadway. A chain or string line is then stretched between the first and second center points and small white (or other colored) painted dots are manually sprayed and spaced along the stretched chain giving a visual indication of the center line of the roadway. The chain or string line is then removed from the roadway surface. This entire process is then repeated for the next segment of the roadway using the ending position of the first segment as the starting position for the second segment. This process is continuously repeated until the location of the center of the entire roadway has been defined. The roadway center line is used as a reference to define the roadway mark path (i.e., the roadway center line defines the mark path).

Having defined the position of the center of the roadway, a truck equipped with line painting equipment is positioned over the white dots. The driver of the truck then uses the white dots as a visual guide along with a pointer for coarsely positioning the truck over the defined segments. A second operator sits at the rear of the truck and positions paint spray nozzles(s) mounted on a side moveable paint carriage directly over the dots for all defined segments of the roadway center. The side moveable carriage allows the second operator to apply the roadway marking paint at the desired location and to correct for any slight misalignment of the truck position with respect to the guide dots. The controlled paint spray nozzle array then applies the paint onto the roadway surface as the truck follows each center segment of the roadway. As the truck follows the mark path (i.e., the center of the roadway), the nozzle array applies the desired roadway mark (e.g., a single or multiple, solid or dashed, roadway marking) which may be offset from the mark path.

Although the current technology achieves the desired goal of providing a system for applying roadway markings, the current system is manually intensive and places the personal safety of workers at significant risk. For example, two workers are required to measure the starting and ending position of the segments, and two workers are required to actually paint the roadway markings (one worker is required to drive the truck and the other worker is required to operate both the carriage and paint dispensing equipment). In addition, to minimize the impact of applying the roadway surface markings to actively traveled roads and highways, the application of roadway markings is usually done in the late evening hours. During this time, traffic visibility is impeded and there is a significant potential for oncoming traffic to collide with those workers manually defining the starting and ending positions for each segment.

Previous attempts to automate the process of marking roadways included guiding the road marking equipment along a predetermined mark path using electromagnetic beams. Unfortunately, these methods required the placement of transmitters along the roadway. Other previous attempts have included the use of light beams arranged in a manner to define the proper path. Again, this attempt proved difficult to implement because of sunlight interference. Other attempts have included using radioactive marking material which would emit a characteristic fingerprint to define the roadway mark path. There are many disadvantages with using radioactive marking material, including health and safety issues, longevity (half-life) of the radioactive material, and disposal problems.

Other attempts to re-mark roadway surfaces have included using a drawing application program in combination with a global positioning system (GPS)-based paint sprayer. A drawing pattern is created using the drawing application program and geographical coordinates for the pattern which are manually defined and then used by the GPS paint sprayer to mark the roadway surface. This attempt requires that the drawing pattern for the roadway be predetermined and fails if the exact location of the roadway marking is inaccurately defined, or if the drawing pattern does not correspond exactly with the geographical position of the actual roadway.

U.S. Pat. Nos. 6,074,693 and 6,299,934 (related as a divisional) each disclose one example of a paint sprayer for marking roadways and fields with a drawing pattern. Both issued to Manning and titled "Global Positioning System Controlled Paint Sprayer," the patents teach a system having an external computer and a GPS paint sprayer. The drawing pattern is created by a designer using either a geographical information system (GIS) which runs, or drawing application programs which run, on the external computer. A print file of the drawing pattern is created by the operating system software and is passed to the GPS paint sprayer. The print file may contain the geographical mapping of pixel data; instead, the geographical mapping of the pixel data may be completed within the GPS paint sprayer. In either case, the geographical mapping of the drawing pattern is determined and then stored in memory within the GPS paint sprayer. The GPS paint sprayer further includes a GPS receiver and a location comparator. The GPS receiver determines the geographical location of the GPS paint sprayer and the location comparator determines if a match occurs between the current GPS location of the paint sprayer and the geographical mapping of the drawing pattern. If a location match between the current GPS location of the GPS paint sprayer and geographical mapping data of the drawing pattern is detected, a control signal is sent to a spray nozzle which deposits paint or other material at the match location. Both lines and picture-like drawings can be marked onto a surface using this patented system.

The current roadway marking technology has at least several problems. One problem is that a significant amount of manual labor is required to accurately paint lines on roadways, and as a result workers are placed in an unsafe working environment during the roadway marking process. Another problem with current technology is the inability to easily and quickly obtain sampled geographical coordinates of the existing roadway line marks using GPS or GPS-based pseudolite arrays. A related problem is the inability to use this sampled data to generate a continuous function of the geographical coordinates for the entire mark path. Additional problems are the lack of an offsetting capability to determine other substantially parallel mark paths for line marking and, therefore, the inability to uniformly deposit paint or other material along the first (or second) mark path duplicating the previous mark.

Manning's '693 patent expressly notes certain disadvantages with the current roadway marking technology. Under the heading "Description of the Prior Art," as column 1, lines 11-40, the '693 patent states: "Road markings are produced to a great extent with the assistance of so called 'road marking' machines which apply paint under pressure from spray nozzle jets onto the road surface. In marking the road it is quite important that the horizontal registration of the paint be accurate with respect to the position of the road. In the past even experienced machine operators have found it difficult to manually guide a road marking machine with sufficient accuracy even where old markings are available. Heretofore, attempts have been made to automatically detect the presence of old markings and to use their detection for automatically guiding the road marking machine and switching the spray nozzle on and off as required. However, such attempts have not been wholly satisfactory because a break in the old marking does not give steering guidance during breaks. Moreover, this approach is of no use whatsoever where the old marks have disappeared or for new markings. Various arrangements have been disclosed for solving these problems by automatically guiding the road marking machine along a pre-determined path using light or electromagnetic beams. However, these arrangements require transmitters to be placed along the road, and in the case of light beams, are degraded by the effect of sunlight. In order to overcome these problems, it has been proposed to embed material [that] emitting radiation in the path that is to be marked. However, this method suffers from the disadvantage that embedding the radiating material in the road surface can be costly. Furthermore, radiating materials tend to lose their effectiveness after a time period. Similar issues pertain to parking lots, air landing fields, and the like."

Although Manning identifies certain disadvantages with the known roadway marking technology, the GPS-controlled paint spray system disclosed by Manning in the '693 and '934 patents has its own disadvantages. First, a designer must generate a drawing pattern and it must be assumed that the designer has accurately generated the drawing pattern. It must be further assumed that the actual constructed road matches the content of the drawing pattern. The system fails if a discrepancy exists between the actual and drawing pattern road position.

In addition, the disclosed system cannot maintain the accurate horizontal registration of the paint markings which is required when the drawing pattern does not accurately match the actual constructed roadway. This situation occurs where on-site construction changes are prompted by unforeseen construction problems. Such problems include, for example, bedrock formations, unstable ground structure, water runoff, and the like.

The designer using the system disclosed by Manning in the '693 and '934 patents must determine and enter data corresponding to the reference geographical location for the center of the drawing, scaling information, orientation information, and other aspect ratio information to accurately determine the marking size and orientation. Thus, the system may require registration, orientation, and size input. The designer also must enter data manually for road markings, such as end points for a line, or an equation using known geographical location coordinates. This includes known coordinates from a previous survey. The system assumes that the designer can accurately determine geographical mark locations.

For an arc, the designer must select the end points and a radius. Such selection does not allow for a smoothly constructed functional fit. The designer must manually join line segments used to make a relatively long continuous painted line. The track line, which is a line, is produced from individual points and is not a smoothly derived curve from a mathematically derived function.

The system disclosed by Manning relies on an available equation. It does not sample pre-existing roadway marks (or produce a set of spaced points). The system does not record cross track position relative to a GPS receiver. The '693 patent does not disclose any mechanism for producing a curved line. Finally, the system disclosed by Manning paints only when there is a location match between the current GPS-based location and one of the data points in the geographical mark location data.

Others have attempted to use a combination of videogrammetry (imagers) and navigation tools (GPS systems for example) to map roadway features including roadway marks. For example, a study of precise road feature localization using a mobile mapping system has been completed. To determine the location of a roadway mark, however, an operator must manually select the feature position (i.e., roadway mark) on the camera's u-v coordinates using a manual digitizing tool. The conventionally defined east, north, up (ENU) coordinates of the manually selected feature are then determined by the mobile mapping system.

This system is prone to positional inaccuracies of the operator and is not completely automated. Individual selection of each roadway mark is time consuming and dependent upon the skill and experience of the operator. Furthermore, no mechanism is provided to automatically inspect the roadway marks for reflectivity and contrast, length and width dimensions, mark fill percentage, and other important quality standards.

Additionally, vehicle-mounted roadway mark locators, inspection apparatus and marking systems which rely solely upon raw (i.e., not post-processed) GPS or GPS-based pseudolite array systems positional data are prone to many errors which may degrade the usefulness and accuracy of these systems.

For example, it is well known that functioning vehicle-mounted GPS or GPS-based pseudolite systems rely upon the continuous reception of ranging and other radio frequency signals by their respective GPS receiver(s). These signals are then decoded by the respective vehicle-mounted GPS receiver(s) to determine the geographical location of the vehicle and may then also be used to determine any point located on the vehicle (positional offset corrected).

However, if the reception of these signals are temporarily lost as the result of foliage obstructions, such as tree cover, or are lost as the result of the vehicle passing through a tunnel or other RF blocking obstruction, the GPS receiver fails to provide accurate geographical location data resulting in inaccurate roadway mark geographical location data.

Other sources of error exist and include the inherent random noise occurring during the reception of the GPS signals. Although real time kinematic (RTK) enhanced GPS-based systems improve the accuracy of the GPS or GPS-based pseudolite systems to centimeter accuracy, errors still arise particularly in determining the GPS geographical location of moving vehicles from raw GPS positional data even with the improvements afforded by RTK enhanced raw GPS-based systems. For example, RTK signal reception may be lost in addition to the GPS signals, thereby causing inaccurate geographical location data.

Moving vehicles are also prone to vibrations caused by pot holes and other roadway imperfections which may cause the GPS antenna to vibrate, yielding inaccurate determination of GPS geographical location data. Vehicle suspension systems may also cause vibrations as the vehicle moves along a roadway. Additionally, vehicle loads may change causing changes in the GPS antenna(s) location and therefore errors in determining the GPS location of the vehicle. For example, paint trucks carry large vessels of paint which is subsequently dispensed during the remarking process. The dispensing process decreases the vehicle load and may cause changes in the roll and pitch of the vehicle, again causing changes in the GPS antenna(s) location.

Therefore the loss of either RTK and GPS signals or both along with vehicle vibrations may cause geographical location inaccuracies for those roadway mark locators, inspection systems and markers singularly dependent upon the reception of only RTK and GPS signals. Thus there is a need in the roadway industry for locating, inspection and marking systems that requires less manual labor, increases the operational safety factor for workers, and is less expensive than the current roadway marking technology, and which will more accurately locate, inspect and uniformly mark roadway repaved surfaces.

BRIEF SUMMARY

This application is intended to teach the use of sensor and data fusion algorithms for roadway mark locators, inspection apparatus and roadway markers for the roadway marking industry. In particular, this application teaches the use of Bayesian model-based filters in combination with a plurality of sensors for achieving more precise GPS geographical location data of a moving vehicle, and therefore any point located on the vehicle (offset corrected), thereby improving the accuracy of roadway mark locators, inspection apparatus and markers. This application discloses an apparatus for inputting raw GPS positional data (which may also include RTK enhanced raw GPS positional data) along with data derived from multiple sensors along with a kinematic model (i.e., a model based on the physical laws of motion) of the vehicle into a Bayesian model-based filter to fuse this data to achieve a more accurate GPS geographical location data of both the vehicle and roadway marks.

To meet the needs identified above and others which will be apparent from a review of the current technology, and in view of its purposes, the present invention provide Bayesian model-based filter enhanced GPS-based systems used for painting or otherwise "marking" roadway traffic lane demarcation lines and vehicle-mounted locating and inspection systems for determining the geographical location and condition of roadway marks.

To overcome the shortcomings of current roadway marking technology, a new apparatus and method for placing marks on a resurfaced (or repaved) roadway are provided. A basic object of the present invention is to provide an improved apparatus for automatically marking repaved roadways. A related object is to accurately sample the geographical position of a pre-existing roadway mark path. A further related object is to sample the geographical position of a pre-existing roadway mark path using a GPS or GPS-based pseudolite array system. A further related object is to sample the geographical position of a pre-existing roadway mark path using a GPS or GPS-based pseudolite array system and to further improve the accuracy of the raw GPS-derived sampled geographical position using a Bayesian model-based filter.

Another object of the invention is to process raw GPS positional data (i.e., data derived directly from the GPS receiver) along with sensor data and a kinematic model of the vehicle within a Bayesian model-based filter algorithm to achieve more accurate GPS positional (i.e., geographical location) data than that obtained from only the raw GPS positional data.

Another object of the invention is to process raw GPS positional with sensor data and a kinematic model of the vehicle within a Bayesian model-based filter algorithm, such as a Kalman or Kalman-like filter algorithm, to achieve more accurate GPS positional (geographical) location data of a roadway mark than that obtained from only the raw GPS positional data.

Yet another object of the invention is to combine raw GPS positional data with sensor data and a kinematic model of the vehicle within a Bayesian model-based filter algorithm along with an image of the roadway mark, to achieve more accurate GPS positional (i.e., geographical location) data of a roadway mark than that obtained from only the raw GPS positional data from an image of the roadway mark.

Another object of the invention is to process raw GPS positional data with sensor data and a kinematic model of the vehicle within a Bayesian model-based filter algorithm, such as a Kalman or Kalman-like filter algorithm, along with an image of the roadway mark, to achieve more accurate GPS positional (i.e., geographical location) data of a roadway mark than that obtained from only the raw GPS positional data.

Another object of the invention is to process raw GPS positional data with sensor data from a moving vehicle along with a kinematic model of the vehicle within a Bayesian model-based filter algorithm, such as a Kalman or Kalman-like filter algorithm, in addition with an image of the roadway mark, to achieve more accurate GPS positional (i.e., geographical location) data of a roadway mark than that obtained from only the raw GPS positional data.

It is another object of the invention to determine a continuous mark path based upon the sampled geographical mark path. It is another object of the invention to determine a continuous mark path based upon the sampled GPS geographical mark path derived from a Bayesian model-based filter algorithm. It is another object of the invention to determine a continuous mark path based upon the sampled GPS geographical mark path locations further processed by a Bayesian model-based filter algorithm, such as a Kalman or Kalman-like filter algorithm.

It is still another object of the invention to quickly determine the pre-existing roadway mark characteristics, pattern, and accurate geographical position. An additional object is to accurately deposit paint or other marking material onto a repaved roadway replicating the pre-existing mark at locations determined by the continuous mark path.

An additional object is to accurately deposit paint or other marking material onto a repaved roadway replicating the pre-existing mark at locations determined by the continuous mark path, the continuous mark path derived from Bayesian model-based filtered raw GPS geographical location data.

Yet another object of the invention is to automatically create a second continuous roadway mark path substantially parallel to and offset from the original mark path. It is a further object of the invention to accurately deposit paint or other marking material onto a repaved roadway at the location determined by the second continuous roadway mark path. It is yet another object of the invention to provide a system for guiding the driver of the roadway marking vehicle. A related object is to dispense an even and consistent paint mark irrespective of vehicle speed. The invention has as another object automatically guiding the paint vehicle along the mark path based upon a mark path continuous function.

The present invention also provides an apparatus and method for automatically determining the accurate geographical location of a pre-existing roadway mark. The present invention provides for an apparatus and method for automatically determining the accurate geographical location of a pre-existing roadway mark from a moving vehicle. For example, the accurate geographical location of a pre-existing roadway mark may be determined from an image of the mark. It is another object of the invention to determine the accurate GPS geographical location of a pre-existing mark from an image of the mark. A further object of the invention is to determine a Bayesian model based filter enhanced GPS geographical location of a pre-existing roadway mark evident on a roadway surface from an image of the mark. It is yet another object of the invention to sample the geographical location of a roadway mark.

The present invention provides for an apparatus and method to image roadway marks from a moving vehicle. It is another object of the invention to image roadway marks to the left and to the right sides of a moving vehicle. It is still yet another object of the invention to image roadway lane demarcation marks from a moving vehicle travelling within the lane. One or more imagers may be mounted onto the side of the moving vehicle to image roadway marks. It is another object of the invention to provide for a rotational mount for affixing the imager to the side of the vehicle. It is another object of the invention to provide for a removable rotational mount which is quickly and easily affixed to, and removed from, the side of a vehicle.

Another object of the invention is to accurately synchronize mark images with their respective Bayesian model based filter enhanced GPS geographical locations. Yet another object of the invention is to accurately synchronize mark images with their respective Kalman or Kalman-like filter enhanced GPS geographical locations.

And yet another object of the invention is to provide accurate GPS location data of roadway marks and vehicle location for interfacing to lane warning departure systems.

Additional objects of the invention are to automatically determine the quality of roadway marks and to automatically compare the actual image of a roadway mark with a standard image of the roadway mark. A related object of the invention is to automatically determine the length and width of roadway marks and the relative spacing between consecutive roadway marks from the roadway mark images. Yet another object of the invention is to determine the skip line pattern of a roadway mark. A further object of the invention is to determine the area of the roadway mark. For example, the apparatus and method may automatically determine the area fill percentage of a roadway mark. A still further object of the invention is to automatically determine the reflective contrast between the roadway surface and the roadway mark. Another object of the invention is to determine the lateral distance between multi-parallel roadway mark lines, such as the distance between a double line roadway mark. Yet another object of the invention is to automatically determine the accurate geographical position of roadway marks which do not meet the acceptable standards. The invention has as an object to provide for an imaging system to image roadway marks during low ambient light conditions.

The invention further provides an apparatus for placing marks on a resurfaced roadway. The apparatus includes a filter enhanced GPS-based locator for sampling discrete geographical location data of a pre-existing roadway mark evident on the roadway before resurfacing. A computer determines a continuous smooth geographical location function fitted to the sampled Bayesian model-based filter enhanced GPS geographical location data. A marker is responsive to the Bayesian model-based filter enhanced GPS-based locator and geographical location function for replicating automatically the pre-existing roadway mark onto the resurfaced roadway. The apparatus is typically part of a moving vehicle. A related method is disclosed for placing marks on a resurfaced roadway. A similar apparatus can be used to guide a vehicle having a snow plow, paver, or other similar equipment along a roadway.

Other objects and advantages of the present invention will become more clear following a review of the specification and drawings. It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

The present invention provides Bayesian model-based filter-enhanced GPS-based systems used for painting or otherwise marking roadway traffic lane demarcation lines and vehicle-mounted locating and inspection systems for determining an accurate geographical location and condition of roadway marks. One type of a Bayesian model-based filter is, for example, a Kalman or Kalman-like filter. It is noted that other Bayesian model-based filters exist.

Figure 1:
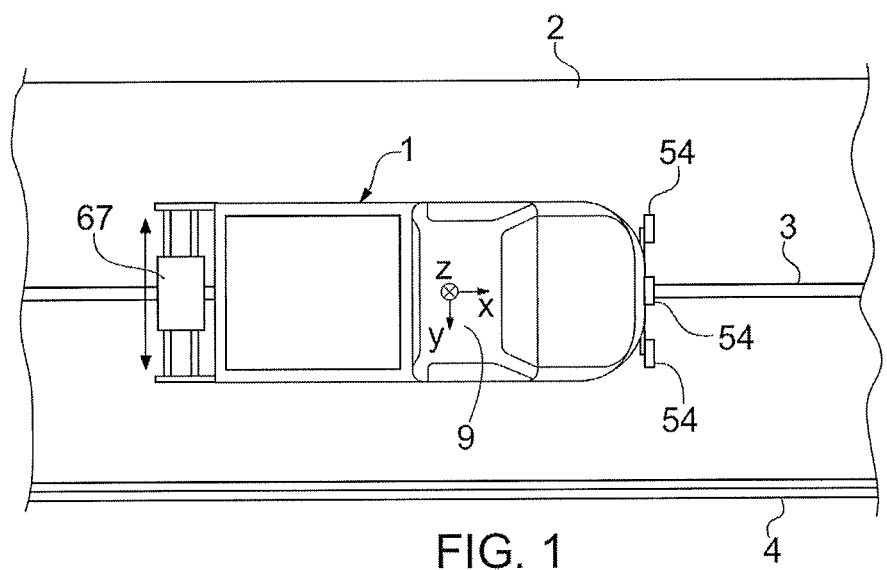
FIG. 1 is a diagrammatic plan view of a vehicle fitted with the apparatus according to the present invention and moving along a road.

Referring now to the drawing, in which like reference numbers refer to like elements throughout the various figures that comprise the drawing, FIG. 1 shows a moving or self-propelled vehicle 1 which is located on a road or roadway 2 near a center mark line 3 applied to the surface of the roadway 2. Also shown is a roadway edge boundary line 4 and a vehicle-referenced Cartesian coordinate system 9.

The term "vehicle" used in this document is given its broadest meaning, including any conveyance, motorized device, or moving piece of mechanical equipment for transporting passengers or apparatus. More specific and preferred examples of the vehicle 1 are cars, vans, trucks, snow plows, construction equipment, and road marking and other roadway machines, such as machines to remove roadway marks. The terms "road" and "roadway" are used interchangeably in this document to include any road, highway, street, avenue, alley, boulevard, bridge, viaduct, trestle, or the like, and approaches to them (including public and private roads and parking lots) designed or ordinarily used for vehicular travel.

Figure 2:
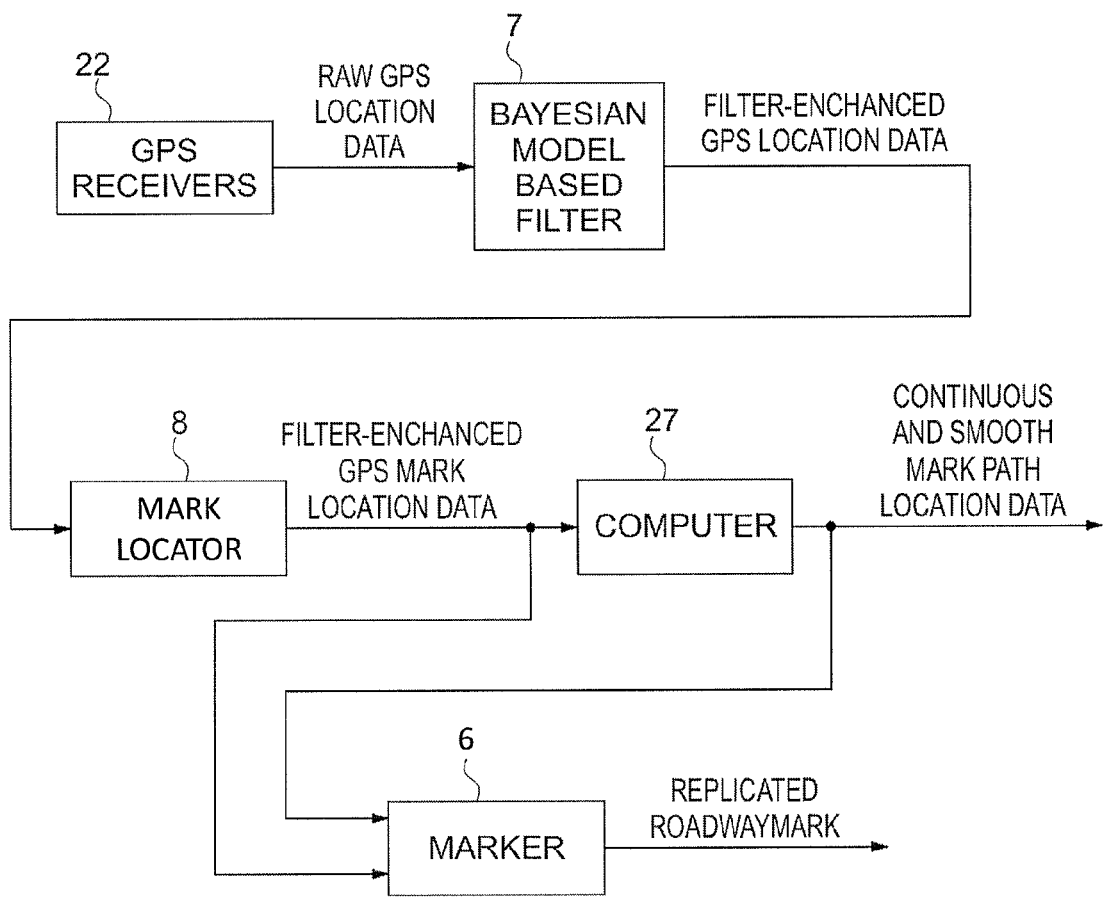
FIG. 2 is a schematic block diagram illustrating the components of an apparatus according to the present invention.

According to one embodiment and referring to FIG. 2, an apparatus for placing marks on a resurfaced roadway 2 is provided. The apparatus includes a GPS receiver 22, a Bayesian model-based filter 7 to improve sampled GPS geographical location data accuracy and smoothness, for example implemented as a Kalman filter discussed in greater detail below, and a filtered-enhanced GPS locator 8 for sampling discrete geographical location data of a pre-existing roadway mark evident on the roadway 2 before resurfacing; a computer 27 for determining a continuous smooth geographical location function fitted to the filtered-enhanced sampled GPS geographical location data; and a marker 6 responsive to the filtered-enhanced GPS-based locator 8 and the continuous smooth geographical location function for replicating automatically the pre-existing roadway mark onto the resurfaced roadway 2.

Figure 3:
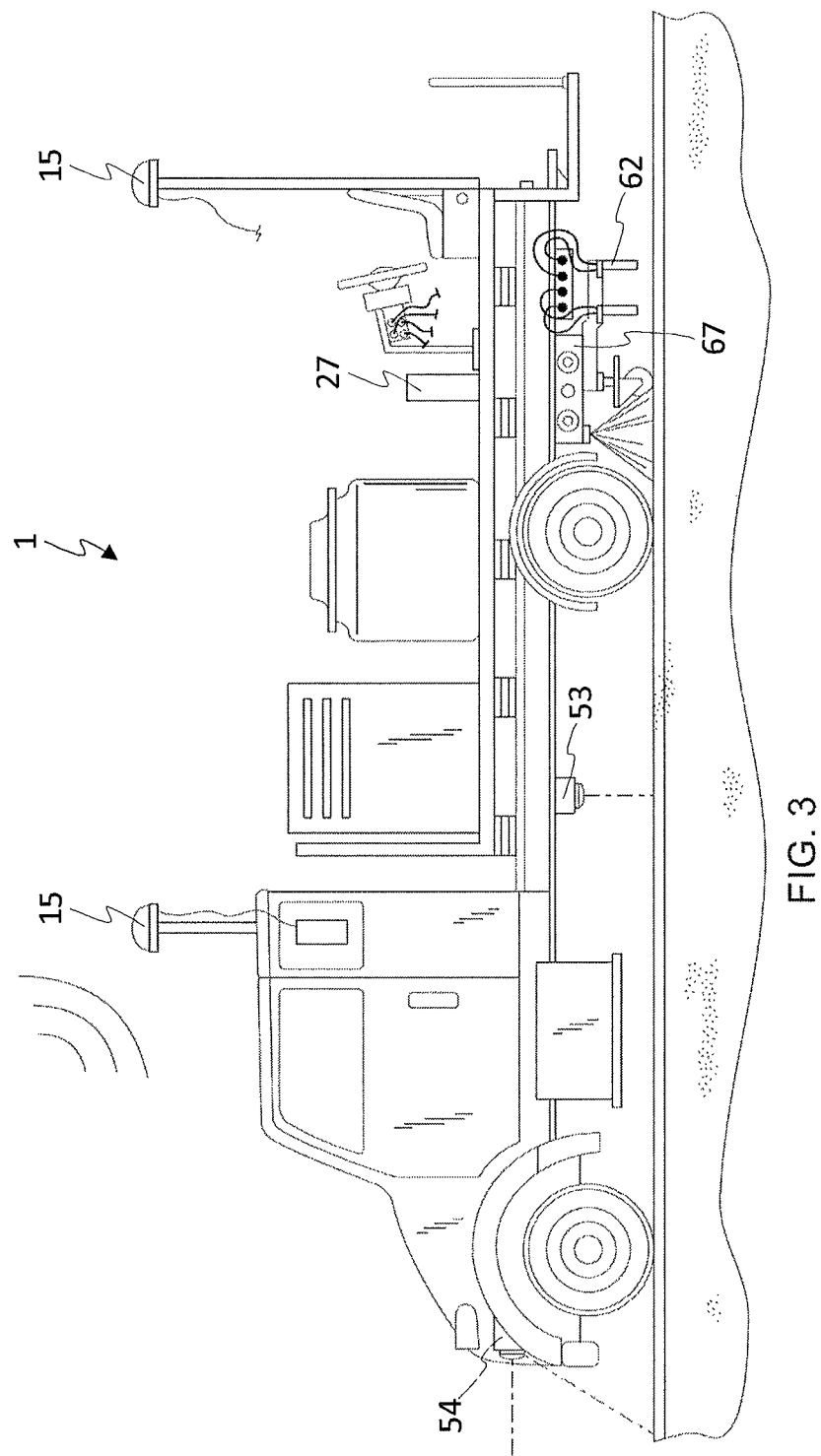
FIG. 3 is a diagrammatic side view of a vehicle fitted with the apparatus according to the present invention, illustrating additional components of the apparatus.

As illustrated in FIG. 3, the vehicle 1 is fitted with a number of components. Specifically illustrated in FIG. 3 are a GPS antenna 15, the computer 27, a first imager 53, a second imager 54, a nozzle array and control system 62, and a moveable cross track carriage 67. As shown in FIG. 1, the vehicle 1 may be fitted with any number of second imagers 54 (e.g., three as shown in FIG. 1). The first imager 53 and the second imager(s) 54 may be optically and GPS-calibrated imagers for determining the equivalent GPS location of each individual pixel of their respective image.

Figure 4:
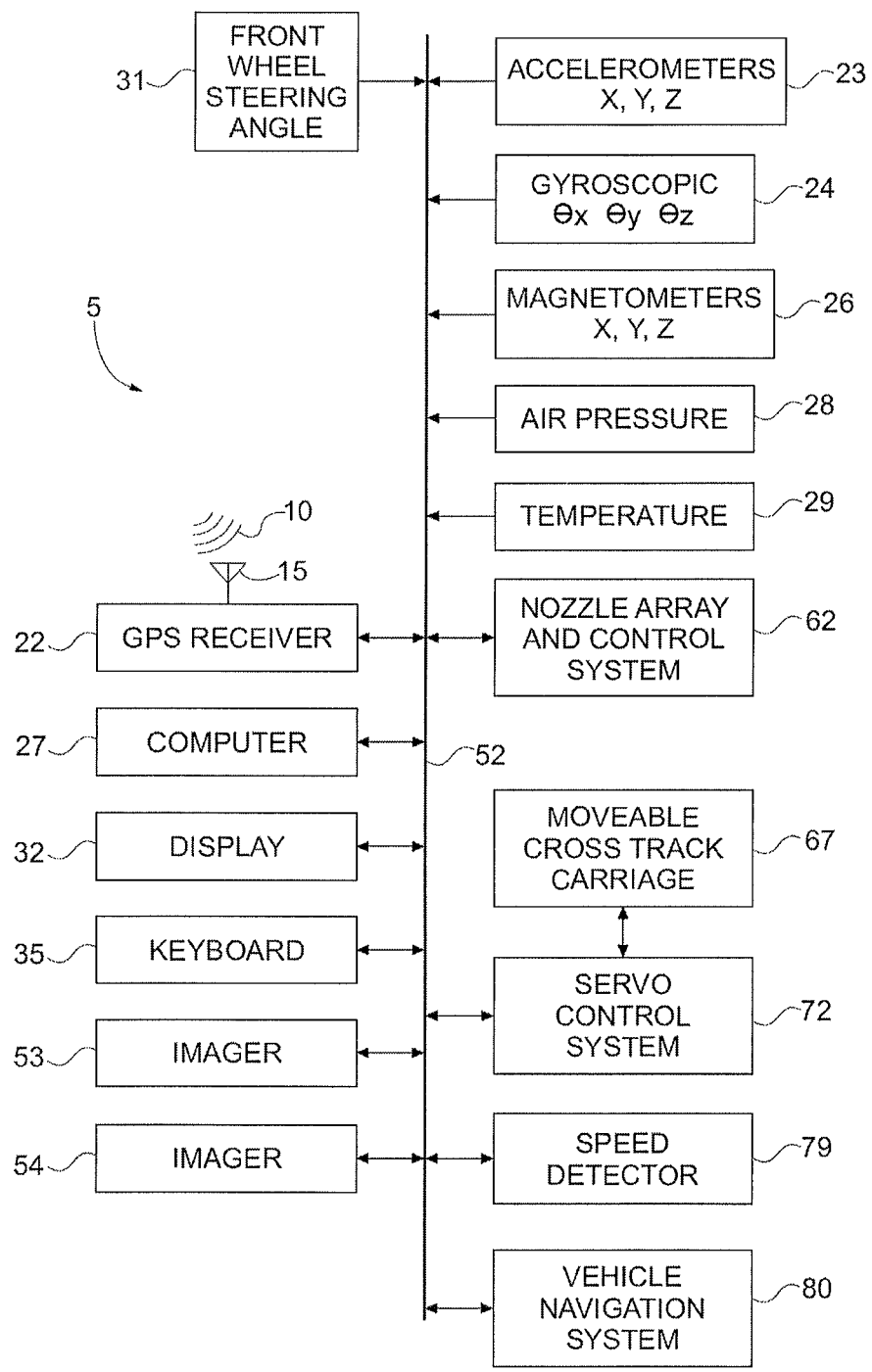
FIG. 4 is a schematic block diagram illustrating components of a preferred embodiment of the apparatus according to the present invention, specifically illustrating the sensors used for computing a Bayesian model-based filter enhanced GPS geographical location.

FIG. 4 is a schematic block diagram 5 illustrating components of a preferred embodiment of the apparatus according to the present invention. The preferred embodiment comprises a number of components and systems which include the GPS antenna 15, a GPS receiver 22, the computer 27, a visual display 32, a keyboard 35, the first imager 53, the second imager 54, the nozzle array and control system 62, the moveable cross track carriage 67, a servo control system 72, a speed detector 79, and a vehicle navigation and control system 80.

Also shown in FIG. 4 is accelerometer sub-system 23, gyroscopic sub-system 24, magnetometer sub-system 26, air pressure sensor 28, temperature sensor 29 and front wheel steering angle sensor 31. All of the components and systems with the exception of the moveable cross track carriage 67 are electrically interconnected, and in communication with each other, for example, via a bus 52.

The GPS antenna 15 receives GPS radio wave signals 10 which originate from a GPS satellite system or a GPS-pseudolite array (not shown). "Pseudolite" is a contraction of the term "pseudo-satellite," used to refer to something that is not a satellite which performs a function commonly in the domain of satellites. Pseudolites are typically small transceivers that are used to create a local, ground-based GPS alternative. The range of each transceiver's signal depends on the power available to the unit. Being able to deploy one's own positioning system, independent of the GPS, can be useful in situations where the normal GPS signals are either blocked or jammed (e.g., in deference to military conflicts), or simply not available.

The GPS antenna 15 is connected to the input of the GPS receiver 22, which decodes the GPS radio wave signals 10 for determining its geographical location. Specifically, the GPS receiver 22 determines the raw GPS location (i.e., non-filtered enhanced GPS location) of the GPS antenna 15. The GPS radio waves signals 10 could also include real time kinematic (RTK) service provider signals (not shown) and the GPS receiver 22 may be adapted to use the RTK signal information or a separate communication channel and system could be used to fuse the RTK signals with the GPS data from the GPS receiver 22. Raw GPS positional data throughout this disclosure also includes RTK enhanced raw GPS positional data.

Throughout the following discussion, GPS-derived or referred-to location(s), coordinate(s) data, geographical location(s) and position(s) refer to Bayesian model-based filter-enhanced GPS geographical location data, and in particular, to Kalman filter-enhanced GPS geographical position/location data and not the raw GPS position data decoded by the GPS receiver 22.

The GPS receiver 22 is further electrically connected to the bus 52, and is in bi-directional communication with the other components and systems connected to the bus 52. The GPS geographic position of the GPS antenna 15 is offset adjusted to account for any physical separation of the nozzle array and control system 62 from the GPS antenna 15, so that the actual geographical position of the nozzle array (and each individual nozzle jet) and control system 62 is determined by the decoded GPS radio wave signals 10. Additionally, the filter-enhanced GPS geographical location of any point on vehicle 1 may be similarly determined (positional offset corrected).

The accelerometer sub-system 23 includes conventional accelerometers for each vehicle coordinate system 9 axis x, y, and z, and measures the acceleration of the vehicle 1 for each axis and also computes the velocity and position for each axis (which may be derived from the acceleration data). The gyroscopic sub-system 24 includes gyroscopes for measuring the rotational acceleration about each x, y and z axis and also computes angular velocity and position, Euler angle based orientation, and roll, pitch and yaw angles of the vehicle 1. The gyroscopic sub-system 24 may include micro-electromechanical (MEMS) or fiber optic gyroscopes. The magnetometer sub-system 26 measures the earth's magnetic field in the x, y and z directions and computes the direction and magnitude of the magnetic field with respect to the coordinate system 9. The air pressure sensor 28 measures the atmospheric air pressure and the temperature sensor 29 measures the ambient temperature. Both the air pressure sensor 28 and the temperature sensor 29 are of conventional design. The front wheel steering angle sensor 31 measures the angle of the front wheels with respect to the forward direction of the vehicle 1. Steering wheel steering angle may be obtained from a steering wheel sensor of conventional design and may use optical or magnetic rotational sensors, such as those manufactured by SKF or Bosch (described later with reference to FIG. 12). Data from the accelerometer sub-system 23, the gyroscopic sub-system 24, the magnetometer sub-system 26, the air pressure sensor 28, the temperature sensor 29, the speed detector 79, in addition to the raw GPS location data from the GPS receiver 22, are inputs to a Bayesian model-based filter (one implementation includes a Bayesian model-based filter program 295, discussed below with reference to FIGS. 5, 24 and 25) and are available to the computer 27 via the bus 52.

Figure 5:
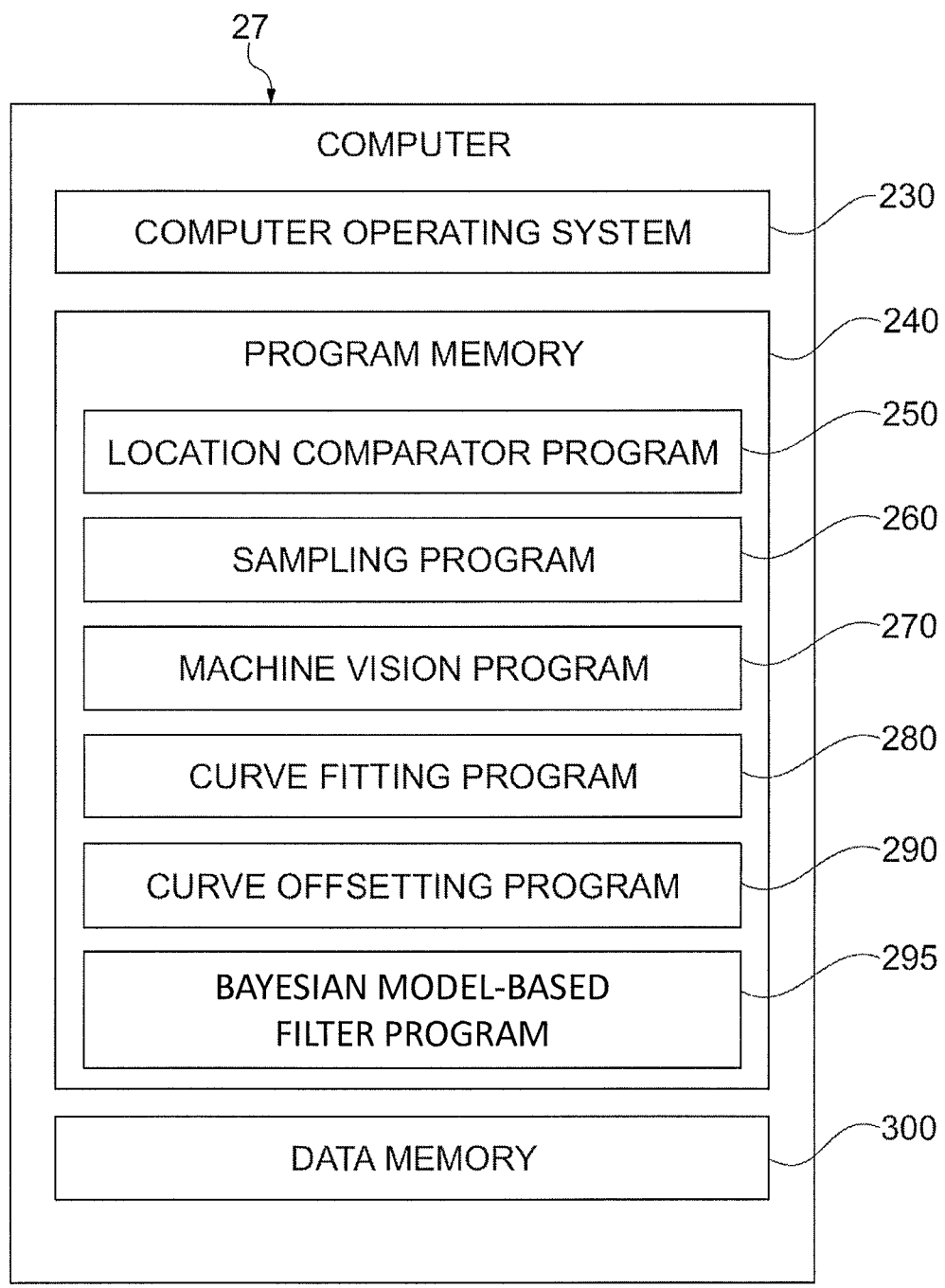
FIG. 5 is a schematic block diagram illustrating components of a computer of the preferred embodiment of the apparatus shown in FIG. 3, specifically showing the statistically optimal Bayesian model-based filter program implemented as a Kalman filter program.

The computer 27 is a conventional computer having data and program memory as shown in FIG. 5. Operating system (OS) software 230 installed on the computer 27 is a conventional operating system such as Windows 7 manufactured by Microsoft, a Unix-based OS, or an Apple Computer OS X Lion operating system. The computer 27 also has a program memory 240 and a data memory 300, in addition to any memory required by the OS software 230. The computer 27 further has a real-time clock (real time base) for calculating accurate time intervals (not shown).

The program memory 240 comprises a location comparator program 250, a sampling program 260, a machine vision program 270, a curve fitting program 280, a curve offsetting program 290, and a statistically optimal Bayesian model-based filter program 295, for example implemented as a Kalman filter. The location comparator program 250 compares the current filtered-enhanced GPS geographical location data of the roadway mark derived from the raw GPS data received by the GPS antenna 15 and decoded by the GPS receiver 22 (which may include fusing this data with the RTK signals), to previously stored filtered-enhanced GPS geographical location data of the roadway mark stored in the data memory 300 (along with the characteristics of the pre-existing roadway mark, including type, geometry, and dimensions). The location comparator program 250 then determines the difference between the currently received and stored filtered-enhanced GPS geographical location data.

The Bayesian model-based filter program 295 computes a statistically optimal estimate of the GPS position of the antenna and therefore, accounting for offsets, a statistically optimal estimate of the geographical location of the vehicle and any other physically attached vehicle components or points, such as imagers, paint carriage, nozzle array and individual nozzle jets (via positional offset calibration). The output of the Bayesian model-based filter program 295 is the sampled filter-enhanced GPS geographical location data of the vehicle 1, and accounting for positional offsets, can be used to determine the filter-enhanced GPS geographical location of the roadway mark (offset adjusted) using imager 53 or other means.

The Bayesian model-based filter program 295 fuses (combines) inaccurate observational data from a number of sensors (such as the accelerometer sub-system 23, the gyroscopic sub-system 24, the magnetometer sub-system 26, the air pressure sensor 28, the temperature sensor 29, the speed detector 79, the front wheel steering angle 31 and the GPS receiver 22) and processes these data along with a kinematic model of the vehicle 1 to generate a statistically optimal estimate of the GPS geographical location of the vehicle 1 or any other point on the vehicle 1 including imagers, nozzle jet(s), etc. (offset corrected). The kinematic model of the vehicle 1 is stored within the Bayesian model-based filter program 295. The statistically optimal estimate of any GPS geographical location data is referred to filter-enhanced GPS geographical location data. The statistically optimal estimate of the GPS geographical location of the vehicle 1 is usually better than the estimate obtained using only the GPS location data derived from the raw GPS geographical location data alone.

The sampling program 260 receives the filtered-enhanced GPS reference location and constructs an orthogonal Cartesian coordinate system (or other coordinate system such as Universal Transverse Mercator) (grid system) 16 (see FIG. 7) having the origin defined at the reference location and further, based upon the constructed grid system and the distance sampling interval, or a timing signal derived from the real-time base of the computer 27, samples the geographical location of the pre-existing roadway mark. Other timing sources may be used to produce the timing signals. The timing signal may also be derived from other timing sources such as the GPS receiver 22. For example, GPS receiver model number BX982 manufactured by Trimble Navigation outputs an accurate signal pulse every one second (1 pps).

The machine vision program 270 inputs data from the imagers 53 and 54 and performs edge detection, geometric computations, and other generic machine vision operations on the image data from the imagers 53 and 54, and in particular can determine the filter-enhanced GPS geographical roadway mark location from the roadway mark image.

The curve fitting program 280 inputs the filtered-enhanced GPS coordinate data stored in the data memory 300 and determines a first continuous mathematical function which fits the filtered-enhanced GPS geographical location data. The curve offsetting program 290 inputs the continuous function determined by the curve fitting program 280 and generates a second continuous function similar and parallel to the first function but offset from the first function by a given distance. For example, the first function may represent the center mark line 3 on the roadway 2. A second function defining the roadway edge mark line 4 may be derived from the first function by offsetting the first function by a distance, or the second function representing the roadway edge mark line 4 and the center mark line 3 may be derived from the first function by offsetting the first function by a distance.

Thus, the present invention can further be embodied in the form of computer-implemented processes and apparatus for practicing such processes, for example, and can be embodied in the form of computer program code embodied in tangible media, such as floppy diskettes, fixed (hard) drives, CD ROM's, magnetic tape, fixed/integrated circuit devices, or any other computer-readable storage medium, such that when the computer program code is loaded into and executed by the computer 27, the computer 27 becomes an apparatus for practicing the invention. The program also may be embodied in a carrier where the carrier may be a tangible media or a transmitted carrier wave.

Figure 6:
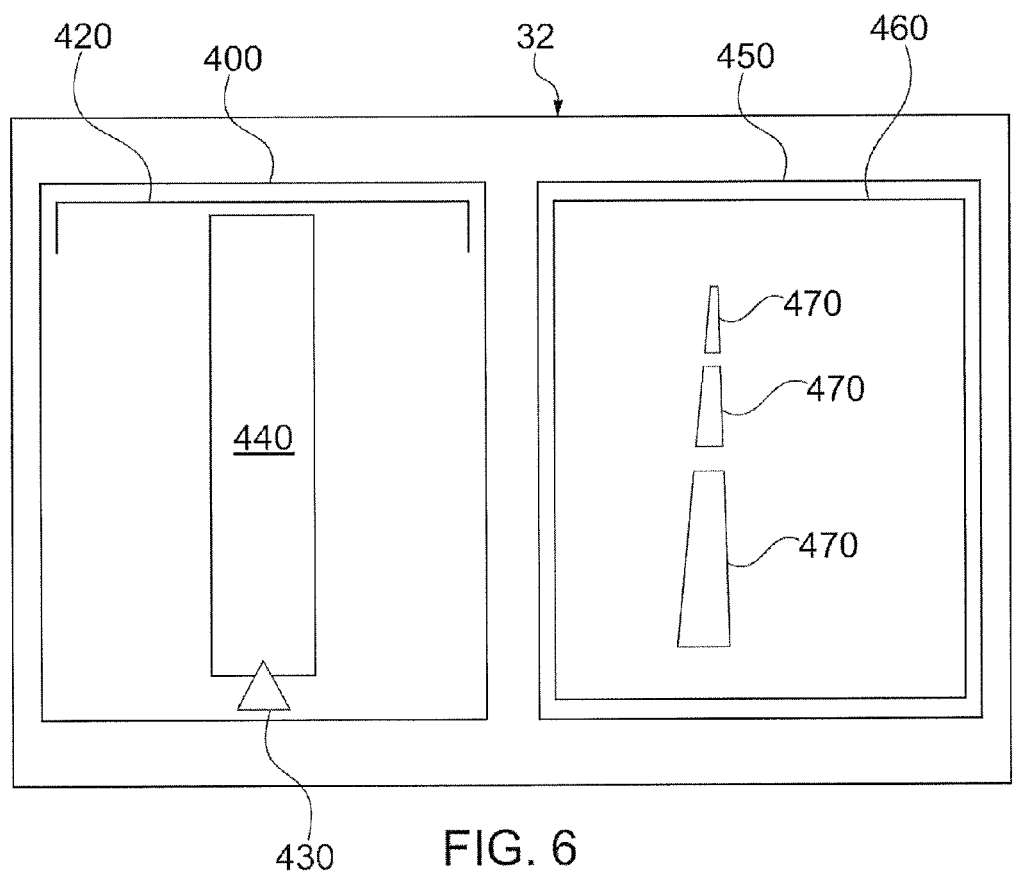
FIG. 6 is a schematic block diagram illustrating components of a display of the preferred embodiment of the apparatus shown in FIG. 3.

The display 32 is a conventional or heads-up computer display adapted to present information to an operator. The display 32 is capable of displaying one or more windows such as an operator may view using a windows-based operating system. Preferably the display 32 contains a left window 400 and a right window 450 as shown in FIG. 6. The left window 400 displays the image from the first imager 53. Displayed within the left window 400 are a cross travel bar 420; a yellow, rectangle-shaped roadway mark 440 imaged by the first imager 53 located proximate the rear of the vehicle 1; and the position of the nozzle array and control system 62 (and in particular the position of a nozzle jet for dispensing roadway mark paint) represented by the arrow 430. The right window 450 of the display 32 depicts the image from the second imager 54 which images the roadway mark path 470 in front of the vehicle 1. Also displayed within the right window 450 is a red alignment box 460.

The keyboard 35 permits the operator to manually enter data similar to a conventional computer keyboard. The keyboard 35 is connected to the bus 52. Alternatively, the keyboard 35 may be directly connected to the computer 27.

The first imager 53 may be fixedly attached to the vehicle 1. As illustrated in FIG. 3, the first imager 53 is downwardly focused onto the surface of the roadway 2 such that its field of view includes the entire roadway surface under the moveable cross track carriage 67. The second imager 54 is also fixedly attached to the vehicle 1 and, as illustrated in FIGS. 1 and 3, focused to image the roadway surface in front of the vehicle 1 so that a clear image of the roadway mark is visible. For clarity purposes, imager 53 in FIG. 3 is shown forward of the moveable cross track carriage 67.

The nozzle array and control system 62 is mounted onto the moveable cross track carriage 67. One or more nozzle jets may be incorporated into the nozzle array and control system 62 for spraying (or otherwise placing or delivering) one of more lines of paint (or any other suitable marking material). The paint may be the same or a different color. Other material may be sprayed onto the surface of the roadway 2 with the paint, such as (reflective) glass beads or other reflective elements in addition to the paint. In addition, the nozzle array and control system 62 is responsive to the speed of the vehicle 1, as determined by the speed detector 79, and adjusts the dispensing rate of the paint dependent upon the speed of the vehicle 1 to maintain the same paint thickness irrespective of the speed of the vehicle 1. The nozzle array and control system 62 compensates for positional offsets of the individual jets, such that the filter-enhanced GPS coordinates for the individual jets are determined.

The moveable cross track carriage 67 may be (although not necessarily) mounted on the rear (as shown in FIG. 1) or on the back driver's side (as shown in FIG. 3) of the vehicle 1. The moveable cross track carriage 67 laterally moves to position the nozzle array over the roadway mark line. Hydraulic or electrical actuators mounted on the vehicle 1 (not shown) are used to position the moveable cross track carriage 67 (and in particular the nozzle jets) over the roadway mark line.

The servo control system 72 is responsive to control signals placed onto the bus 52 and is responsive to the machine vision program 270 and also to the location and comparator program 250. The servo control system 72 controls the hydraulic or electrical actuators. Thus, the servo control system 72 controllably moves the moveable cross track carriage 67 to a desired cross track position.

The speed detector 79 determines the speed of the vehicle 1. The vehicle speed may be determined by conventional mechanisms such as an electronic speedometer. The speed detector 79 may be used along with the real time base of computer 27 to calculate sampling distance, or alternatively the sampling distance may be determined from the filter-enhanced GPS geographical location data of vehicle 1.

The vehicle navigation system 80 is a conventional automated system for controlling the direction, speed, and acceleration of the vehicle 1 along a predetermined path. By "predetermined" is meant determined beforehand, so that the predetermined characteristic must be determined, i.e., chosen or at least known, in advance of some event. The navigation system 80 includes both the hardware and software necessary to completely control the movement of the vehicle 1 along a path without human intervention. The apparatus described above forms a GPS-based system used for painting, or otherwise "marking," roadway traffic lane demarcation lines.

In operation, the apparatus according to the present invention can be used as follows. The operator of the vehicle 1 first positions the vehicle 1 at the start of the desired roadway mark and in a direction of travel for recording the mark path. The first imager 53 images the surface of the roadway 2 under the complete moveable cross track carriage 67 travel distance and the operator positions the vehicle 1 so that an image of the roadway mark appears in the left window 400 of the display 32. The machine vision program 270 recognizes the roadway mark and determines the amount of cross travel necessary to align the cross travel carriage 67 to the mark center. The machine vision program 270 may use the cross travel distance and calibration data to determine the filter-enhanced GPS geographical location of the roadway mark (offset corrected), or may use machine vision (image processing) operations on the image data to determine the filter-enhanced GPS mark location. A control signal is then sent to the servo control system 72 from the machine vision program 270 to move and align the moveable cross track carriage 67 having the attached nozzle array and control system 62 to the center of the mark (aligning the nozzle jet(s) over the center of the roadway mark). Alignment is displayed as a red arrow 430 centered on the imaged roadway mark 440. The imaged mark along with the aligned red arrow relative to the cross travel bar 420 is shown in FIG. 6. The cross travel bar 420 gives the operator a visual indication of the maximum cross travel distance of the moveable cross track carriage 67.

The operator then enters the positional sampling interval (distance interval) by using the keyboard 35, which is then sent by the computer 27 to the sampling program 260 or alternately, a time sampling interval may be entered or a source of a timing signal may be identified, such as the GPS receiver 22. The operator then depresses a "Start-to-Record" key on the keyboard 35 which begins the process of recording the filtered-enhanced GPS geographical location and characteristics of the mark. The reference location is determined as the filter-enhanced GPS geographical location position of the aligned moveable cross track carriage 67 (corrected for any positional offsets of the GPS antenna 15) and may correspond to the origin of coordinate system 16 when the Start-to-Record key is depressed. The roadway mark may be a solid or dashed, single or double line, or any combination thereof. For example, a roadway mark may consist of a solid line and a parallel dashed line in close proximity to the solid line, such as a conventional roadway mark to indicate that passing in one direction is allowed but passing in the opposite direction is not allowed.

Once the Start-to-Record key is depressed, the computer 27 begins to input data from the temperature sensor 29, the air pressure sensor 28, the magnetometer sub-system 26, the gyroscopic sub-system 24, the accelerometer sub-system 23, the front wheel steering angle sensor 31, the speed detector 79 and the raw GPS geographical location data from the GPS receiver 22. The computer 27 additionally inputs image data from the imager 53. The operator then begins to move the vehicle 1 in the direction of the roadway mark path 470 and uses the right window 450 of the display 32 to assist in maintaining the vehicle path coincident with the roadway mark path 470 (shown for a middle rear mounted cross track carriage 67, see FIG. 1). The operator steers the vehicle 1 so that the roadway mark path 470 is maintained within the red alignment box 460. Maintaining the vehicle 1 within the red alignment box 460 insures that the servo control system 72 along with the machine vision program 270 will be able to position the moveable cross track carriage 67 within the cross travel limitations indicated by the cross travel bar 420 of the moveable cross track carriage 67 along the roadway mark path 470. Additionally, the computer 27 fuses the raw GPS geographical location data from the GPS receiver 22 with the data from the temperature sensor 29, the air pressure sensor 28, the magnetometer sub-system 26, the gyroscopic sub-system 24, the accelerometer sub-system 23, the front wheel steering angle sensor 31, the speed detector 79, and the kinematic model of vehicle 1, into a statistically optimal GPS geographical location data (filter-enhanced GPS geographical location data) using the Bayesian model-based filter program 295, and determines the filtered-enhanced GPS geographical location of the roadway mark.

Filter-enhanced GPS geographical position data of the mark are sequentially sampled and subsequently stored in the data memory 300 of the computer 27 using the sampling program 260 and the Cartesian coordinate system (see the orthogonal X, Y, and Z axes of coordinate system 16 shown in FIG. 3, or other coordinate systems such as Universal Transverse Mercator (UTM). The geographical positional sampling occurs at a distance interval previously defined by the operator (which may include one or more of the Cartesian or other coordinate system axis). Sampling of the geographical position for the roadway mark path 470 occurs when the vehicle 1 has travelled the sampling interval which is calculated by the sampling program 260 using the filter-enhanced GPS positional data derived from the raw GPS data of receiver 22 and the Cartesian or other coordinate system 16.

Alternatively, the sampling distance can be calculated using the speed detector 79 and the time base of the computer 27, or time sampling using timing signals may be used in place distance sampling.

As the vehicle 1 passes over the mark, the computer 27 determines the length, width, color, and the number of lines (single, double) of the mark by using the machine vision program 270 and the speed of the vehicle 1 derived from the speed detector 79 and the time base of the computer 27. The characteristics of the mark are also stored within the data memory 300. If the mark characteristics change from one form to another as the vehicle 1 transverses the roadway mark path 470, the machine vision program 270 recognizes the change in the mark characteristics and stores the filter-enhanced GPS geographical location of the change, along with the new mark characteristics. For example, dashed marks may change to a solid line mark, and a double solid line mark may change to a single dashed line mark. The filter-enhanced GPS geographical location of the change in mark characteristics is recorded along with the sampled mark path.

At the end of the roadway mark path 470, the operator depresses a "Stop-Record" key on the keyboard 35, which terminates the process of sampling and storing the mark filter-enhanced GPS geographical location and mark characteristics. In addition, upon depression of the Stop-Record key, the curve fitting program 280 determines a continuous mark path function using a curve fitting algorithm over the mark path interval using the Cartesian or other coordinate system 16 determined by the sampling program 260. The original mark path is now defined as a continuous function referenced to the start location and to the grid pattern of the Cartesian coordinate system. The Cartesian coordinate system may also include a two dimensional coordinate system, such as the conformal mapping UTM two dimensional Cartesian coordinate system.

The roadway is now ready to be repaved. The process of repaving the roadway surface completely covers all remnants of the old roadway mark. Alternatively, the old roadway mark may be removed by physical mechanisms such as by wire brushing, by grinding, by water jetting or blasting, or by some other conventional mechanism.

To re-establish or replicate the roadway mark at the same location, the location comparator program 250 compares the current filter-enhanced GPS location of the moveable cross track carriage 67 (along with the nozzle array and control system 62 with positional offset correction) with the reference filter-enhanced GPS location previously stored in the data memory 300. The location comparator program 250 then further displays positional instructions to the operator of the vehicle 1 in the left window 400 of the display 32 for assisting the operator in positioning the red arrow of the moveable cross track carriage 67 in close proximity to the reference position.

Once the vehicle 1 has been approximately positioned at the filter-enhanced GPS reference point location, the machine vision program 270 displays the original mark previously stored in the data memory 300 into the left window 400 of the display 32 and commands the servo control system 72 to move the calibrated cross travel carriage 67 into alignment with the reference position (aligning the nozzle jet over the roadway mark). In addition, the right window 450 of the display 32 now displays the original mark path for the operator to follow along with the red alignment box 460 to assist the operator in maintaining alignment of the cross track carriage 67 to the desired position given by the previously determined mark path continuous function.

After the cross track carriage 67 has been aligned with the reference position, the operator depresses the "Start-to-Repaint" key on the keyboard 35 and begins to move the vehicle 1 along the roadway mark path 470 displayed (along with the actual mark) in the right window 450 of the display 32. The displayed roadway mark path 470 is now derived from the mark path continuous function.

As the vehicle 1 moves, the location comparator program 250 compares the filter-enhanced GPS position of the cross track carriage 67 (i.e., the nozzle position offset corrected) with the roadway mark path 470 defined by the continuous function derived from the filter-enhanced GPS geographical location data, and generates an error signal representing the difference between the actual calibrated cross track carriage 67 (nozzle position) geographical position and the continuous function mark path geographical position. This error signal is used by the servo control system 72 to move the cross track carriage 67 (and hence the nozzle jet) back onto the roadway mark path 470 defined by the continuous function. As the vehicle 1 moves along the roadway mark path 470 defined by the continuous function, the previously stored mark location and characteristic data are compared to the current filter-enhanced GPS location of the cross track carriage 67 and the respective mark is replicated onto the surface of the roadway 2 by the nozzle array and control system 62.

Depending upon the speed of the vehicle 1, the nozzle array and control system 62 dispenses the appropriate volume of paint responsive to the speed of the vehicle 1 derived from the speed detector 79 to maintain the desired paint thickness. For example, a slow moving vehicle 1 would dispense paint at a slower rate than that for a fast moving vehicle 1 which would require dispensing paint at a faster rate to maintain consistency of paint thickness.

The apparatus and method described above in accordance with a preferred embodiment of the invention gives the operator the ability to sample an existing roadway mark using Bayesian model-based filter-enhanced GPS or GPS pseudolite technology. Sampling of the roadway mark requires discrete geographical points which may be accomplished, depending upon the acquisition speed of the geographical positioning system, at a vehicle 1 speed which will minimally impact the flow of regular traffic.

The apparatus and method use conventional curve fitting techniques to produce a continuous function representing the mark path from the sampled filter-enhanced GPS geographical location data points and yield a consistently smooth curve. Such curve fitting techniques are unlike the joining of linear line segments which have a tendency to have a jagged, or "put-together," appearance. The curve fitting of only one roadway mark (e.g., the centerline of a mark) is required and any additional roadway marks (e.g., the roadway edge boundary line 4) may be obtained by offsetting the continuous function derived from a first continuous mark path by an amount consistent with the desired relative position of the second mark path. For example, to define a side roadway mark using a centered defined functional mark path requires only a simple mathematical operation of offsetting the original functional mark path by a desired distance (typically the width of the traffic lane). This technique guarantees exact parallel placement of the side mark with respect to the center mark.

In addition, the actual sampling of a pre-existing roadway mark ensures that, after repavement of the roadway 2 is completed, the new repainted mark will be placed in exactly the same position on the roadway 2 as the previous mark. For known systems that convert a drawing pattern into geographical coordinates for painting a surface, a problem arises in the field where the actual drawn pattern is not compatible with the actual field requirements. For example, sometimes the roadway must be changed as the result of a rock formation or other obstructions. Further, roadway positions are frequently changed to accommodate commercial or residential development in a particular area. A predetermined drawing pattern unfortunately does not reflect the reality of changes in the road position as the result of field-induced changes. Thus, any system using a drawing pattern may not reflect the actual road position and, therefore, may not accurately mark the roadway 2. The apparatus and method according to a preferred embodiment of the invention avoid these problems.

Another improvement over the known systems is that the original roadway mark is characterized according to type (color, dashed, continuous, or other) and geometrical dimensions (length, width, and the like). This is an important consideration for maintaining the exact mark sequence for a mark path. For example, a portion of the mark path may have a dashed yellow mark and another portion of the mark path may have a continuous white mark. This information is used to selectively choose the correct color and also to control the spray width and dispensing cycle so that the original mark may be exactly reproduced.

Still yet another improvement over the known systems is that the raw GPS geographical locations are Bayesian model-based filtered (and may be implemented with a Kalman filter), i.e., the GPS locations determined and used by the roadway mark locator, inspection apparatus and marker are more accurate than just using the raw GPS location data, yielding better and more accurate results.

The apparatus and method for placing (printing) marks on a resurfaced roadway 2, according to a preferred embodiment of the invention, achieve numerous additional advantages over the known technology. Among those advantages are the following:

1. Geographically sampling the coordinates of pre-existing roadway marks using Bayesian model-based filter enhanced GPS technology;
2. Computing a continuous function to determine the mark path from the mark samples;
3. Automatically duplicating and re-painting the roadway mark patterns depending upon the previous mark pattern;
4. Accurately depositing roadway mark patterns such as continuous or dashed lines independent of the speed of the vehicle 1;
5. Providing for automatic and semi-automatic vehicle alignment and/or movement on the mark path;
6. Automatically determining pre-existing mark geometric characteristics;
7. Coordinating the material spray dispensing rate in response to vehicle speed;
8. Protecting workers completely from vehicular traffic and weather;
9. Reducing work force requirements because only one operator is required both to determine the geographical coordinates of existing roadway marks and to re-paint the marks;
10. Converting the mark samples and geometric characteristics into a pattern;
11. Automatically adding a positional offset to re-paint other roadway marks which can be mathematically offset from the sampled mark path; and
12. Providing for a smooth and continuous true mark path derived from filter-enhanced GPS geographical location data.

The apparatus and method for placing marks on a resurfaced roadway 2, according to a preferred embodiment of the invention, use a Kalman filter enhanced GPS-based location system as an example to sample the geographical position of an existing roadway mark. Although many of the known patents use GPS for positional information to determine the location of vehicles, the apparatus and method of the present invention singularly use a Bayesian model-based filter enhanced GPS to determine the geographical position of an existing roadway mark using machine vision. The advantages of determining the roadway mark before repaving or re-painting include: (1) determining the exact location of the mark; and (2) from this information, using a mathematical model to form a continuous geometrical function of the mark path. The Kalman filter enhanced GPS-based location system includes any GPS pseudolite or GPS-like, self-calibrating, pseudolite array system and is not restricted to any one GPS technology and may include RTK enhanced GPS technology. Additionally, Kalman filter enhanced GPS-based location data tend to be "smoother", i.e., Kalman filter enhanced GPS-based location data tends to have lower root mean square error over raw GPS-based geographical location data.

Geographical sampling requires discrete geographical data along the mark path. A continuous geographical path is not required. A vehicle 1 equipped with the apparatus of the present invention will be able to travel at moderate speed with respect to the current traffic flow and will only need to sample the roadway mark along the mark path at discrete points.

The apparatus of the present invention uses the sampled positions of the roadway mark to determine a continuous mathematical function which provides a smoothly varying function representing the actual mark path. Although the Manning patents discussed above disclose that the designer of a drawing pattern can use linear interpolation between two points for a roadway mark, and then these individual line segments can be joined to make a relatively long continuous painted line, or the designer may use a pre-existing equation using known geographical location coordinates as independent variables within the drawing pattern, no mathematical computation is disclosed which determines a "best fit" continuous geographical location equation based upon the actual sampled roadway mark locations. The apparatus of the present invention calculates a "best fit" equation. Further, the Manning patents do not disclose the use of a Bayesian model-based filter to improve the accuracy of GPS geographical location data.

The apparatus also automatically re-paints roadway marks depending upon the previous mark type. The mark type and dimensional characteristics are used in combination with the determined vehicle speed to control the paint dispensing unit. Thus, the unit accurately and uniformly re-paints the prior existing mark onto the repaved or milled roadway surface. Further, the imager 53 may be color responsive and along with the machine vision program 270 may determine the actual color of the roadway mark and used as any other roadway mark characteristic. For example, yellow or white marks may be determined during the time when the mark characteristic data is being collected and this data then used to selectively paint or otherwise mark the roadway with the previous mark color.

The apparatus provides for automatic and semi-automatic vehicle alignment and movement on a path. A vehicle navigation system (an "auto-pilot") maintains the vehicle 1 on the roadway mark path 470. The desired mark location is mathematically determined using sampled geographical positions derived from the old mark. A comparison is then made between the actual mark location and the desired mark location. An error signal is determined based upon this difference which is used by the auto-pilot to correct the position of the vehicle 1.

A visual indication of the position of the vehicle 1 with respect to the roadway mark path 470 is also provided. The display 32 helps the driver of the vehicle 1 in steering and maintaining the position of the vehicle 1 on the desired roadway mark path 470. The display 32 preferably illustrates the actual mark path of the vehicle 1 as computed by the previously sampled mark path, and therefore a conventional guide wheel and guide wheel support bracket or other assistive pointer devices are not required. The visual indication of the position of the vehicle 1 with respect to the roadway mark path can also assist the driver of a snow plow to maintain the proper position on the roadway.

During the sampling process for determining the geographical location of the roadway mark path 470, the apparatus also automatically determines the type and dimensional characteristics (for example the length and width and, if appropriate, the spacing distance between marks) of the roadway mark. For example, the mark may be a dashed sequence or may be a solid line. If the mark is a dashed line, the apparatus is capable of determining the spacing between the dashes. The apparatus is also capable of determining the lateral distance between parallel roadway marks (lines), such as the distance between double lines. Thus, the apparatus of the present invention automatically determines existing roadway mark characteristics.

The material spray dispensing rate is responsive to vehicle speed. This feature of the apparatus is important toward depositing a consistent and uniform amount of paint onto the roadway 2. If the dispensing rate is held constant, a different amount of paint could be deposited onto the roadway 2 depending upon the speed of the vehicle 1. For example, a slow moving vehicle 1 would deposit a greater amount of paint than a faster moving vehicle 1 with a constant dispensing rate.

Like known devices, the apparatus of the present invention uses a predetermined path, map, or image for the paint dispenser or vehicle 1 to follow. A significant difference between the apparatus and known devices, however, is how the predetermined path is obtained. The apparatus creates a digital image of the surface before painting or marking the surface. A crude image (i.e., the mark may be worn having missing sections) of the mark is scanned (the image is mapped) and then an enhanced version is repainted over the original crude image. The apparatus also mathematically models the predetermined path using sampled Kalman filter enhanced geographical data of the original mark path. The sampled data are obtained using raw GPS location data along with a multitude of sensor data, a kinematic model of the vehicle and a Kalman filter.

The apparatus also uses any conventional paint (or other material) to place (paint or deposit or apply) the marking on the roadway 2. The material need not be modified. Some conventional devices modify the marker material in order to function. For example, U.S. Pat. No. 4,219,092 discloses using a radioactive paint as the marker material. The radioactive emission of the paint is then differentially detected by the vehicle and used to guide the vehicle along the predetermined path. It is an advantage of the apparatus according to the present invention, of course, that the material need not be modified.

Other conventional devices convert a drawing pattern produced from an application drawing program into a geographically defined image in suitable form for being deposited onto a surface using GPS technology. Still other conventional devices use a drawing tool to draw polygons to define geographical areas of interest for farming or other applications. The apparatus according to the present invention does not require a drawing pattern, and in fact can create the actual mark path for other purposes.

One of those other purposes is the creation of another parallel path which is derived from the original continuous mark path. The apparatus calculates a parallel path displaced from the calculated continuous mark path which was derived from the sampled original roadway mark. For example, having the calculated continuous mark path such as the center line of a roadway, a positional offset can be used to calculate another mark path which parallels the center line. This second mark path could be the roadway side mark line. An advantage of the apparatus is that only one roadway mark is required.

Potential applications for the apparatus and method of the present invention are many and varied. The primary application is, of course, re-painting of demarcation line marks on roads. Related applications include the deposition of replacement marks on highways, parking lots, air landing fields, pathways, or walkway structures designed for vehicular, foot, or other traffic. In addition to marking pavement, the apparatus and method can re-mark a playing field for a sport such as football.

The apparatus and method can also be applied to assist snow plows, specifically by providing a snow plow truck guidance system. Such a system can guide a vehicle 1 having a snow plow along a roadway. The Bayesian model-based filter enhanced GPS-based locator samples discrete geographical location data of a pre-existing roadway mark. The computer determines a continuous smooth geographical location function fitted to the sampled geographical location data. An actuator responsive to the GPS-based locator and geographical location function then positions the snow plow.

Another application for the apparatus and method is re-applying or re-depositing a demarcation line mark as a coating on a surface. The coating may be hard or soft, permanent or transitory. The mark may be formed by causing a coating material to extend, impregnate, or penetrate into the surface material; the term "coating" is used in the general sense to include both surface coating and impregnation. Preparatory treatments of the surface material, subsequent treatments of the coated surface material, and other ancillary non-coating operations are also envisioned. Such operations include processes like etching to make the surface more compatible with, or adherent to, the coating. The coating can form lines, stripes, or indicative markings and can contain material particularly adapted to reflect light.

Figure 7:
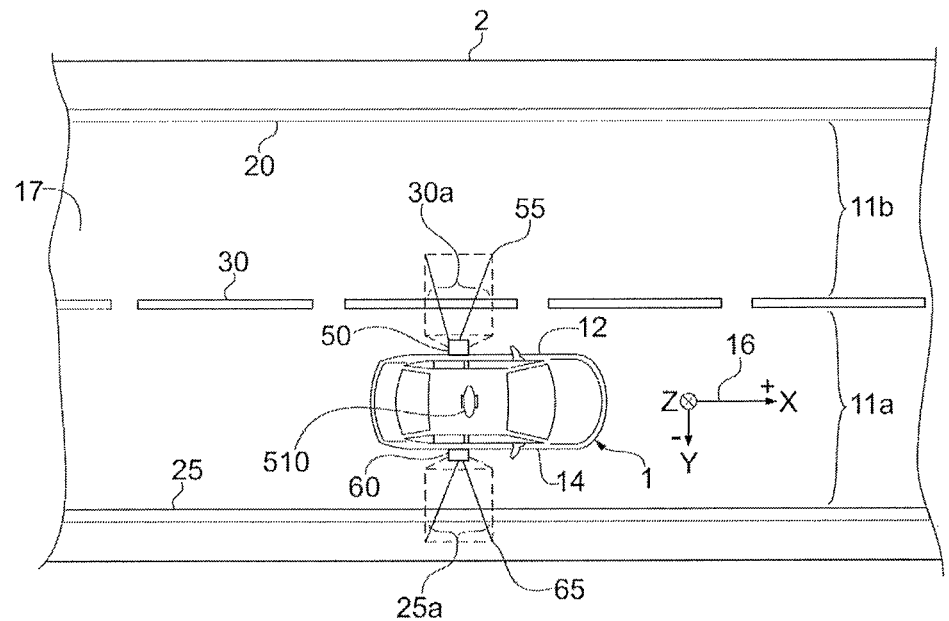
FIG. 7 is a top view of a vehicle having one embodiment of the invention and moving along a roadway lane defined by roadway marks.
Figure 8:
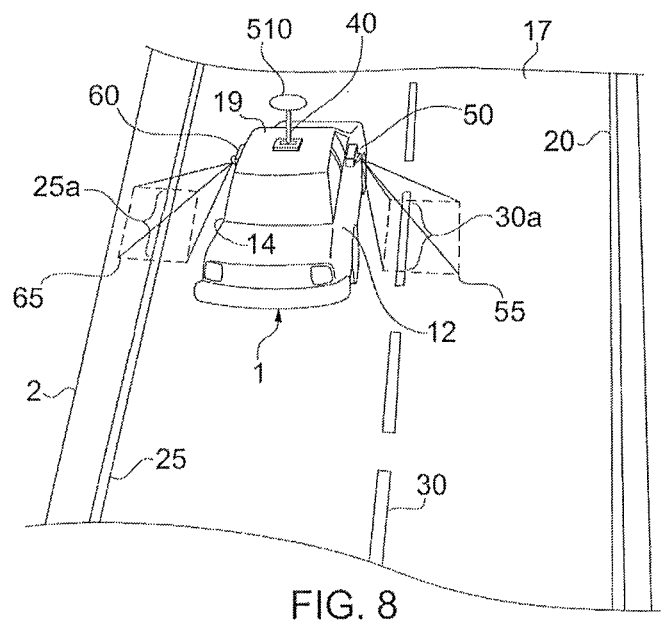
FIG. 8 is a front view of the vehicle shown in FIG. 6 illustrating the placement of the GPS antenna and side mounted imagers.

Referring now to FIGS. 7-8, according to another embodiment of the invention, an apparatus for determining the geographical location of a roadway mark, such as roadway edge mark 20, roadway edge mark 25, or roadway center mark 30 from a moving vehicle 1 may include at least one vehicle-mounted imager, for example vehicle mounted imagers 50 and 60 responsive to a trigger signal for imaging at least one roadway mark located substantially parallel to the direction of travel of the vehicle 1; a GPS antenna 510; a GPS receiver 22 (FIG. 12) responsive to the GPS antenna 510 for determining the raw geographical location of the GPS antenna 510; a Bayesian model-based filter for filtering the raw GPS geographical location data, an apparatus for providing a GPS receiver synchronized image trigger signal to the imager 50, 60; and an apparatus for determining the filter-enhanced GPS geographical location of the roadway mark 20, 25, 30 from the triggered roadway mark image and the filter-enhanced GPS geographical location data of the GPS antenna 510.

FIG. 7 illustrates a top view of a moving vehicle 1 travelling along the X-axis defined by Cartesian coordinate system 16 and within a demarcated traffic lane 11a of a roadway 2. The roadway 2 has a paved top surface 17. The traffic lane 11a is demarcated with the pre-existing roadway dashed center mark 30 and the pre-existing roadway edge mark 25. In addition, a traffic lane 11b is demarcated also by the dashed center mark 30 and the roadway edge mark 20. The center mark 30 and the edge marks 20 and 25 are located on the top surface 17 of the roadway 2 and are usually composed of epoxy, paint (with or without reflective glass beads), thermoplastic markings, or other materials commonly used in the roadway marking industry. The center mark 30 and the edge mark 25 are visible from the moving vehicle 1. A left side panel 12 (conventionally referred to as the driver's side for American-built vehicles) of the vehicle 1 faces the center mark 30 and a right side panel 14

(conventionally referred to as the passenger's side for American-built vehicles) of the vehicle 1 faces the edge mark 25.

Referring now to FIGS. 7 and 8, the vehicle 1 has the fixed GPS antenna 510 supported above a roof 19 of the vehicle 1 by a support 40. The first imager 50 is mounted on the left side of vehicle 1 and is adjustably positioned to image an area 55 of the roadway top surface 17 to the left of the direction of travel of the vehicle 1 which includes a section 30a of the center mark 30. The second side mounted imager 60 is adjustably positioned onto the right side of vehicle 1 to image an area 65 of roadway top surface 17 which includes a section 25a of the edge mark 25. Further, it is understood that the first and second imagers 50 and 60 could be mounted in any suitable location (e.g., on the roof 19 of the vehicle 1 in close proximity to the left and right sides of vehicle 1 and similarly positioned to image the areas 55 and 65, respectively). The GPS receiver 22 is electrically connected to the GPS antenna 510 and is contained within the vehicle 1).

The description above refers to the standard direction for vehicular traffic defined for United States roadways. The preferred embodiment also applies to roadways having the direction of vehicle traffic defined opposite that of the United States such as that found in Europe. In this case, the second imager 60 would image the center mark 30 and the first imager 50 would image the edge mark 20. Further, the lane 11b could carry traffic in the opposite direction of the vehicle 1, or could be a second lane of a multi-lane highway carrying additional traffic in the same direction as the vehicle 1.

Figure 9:
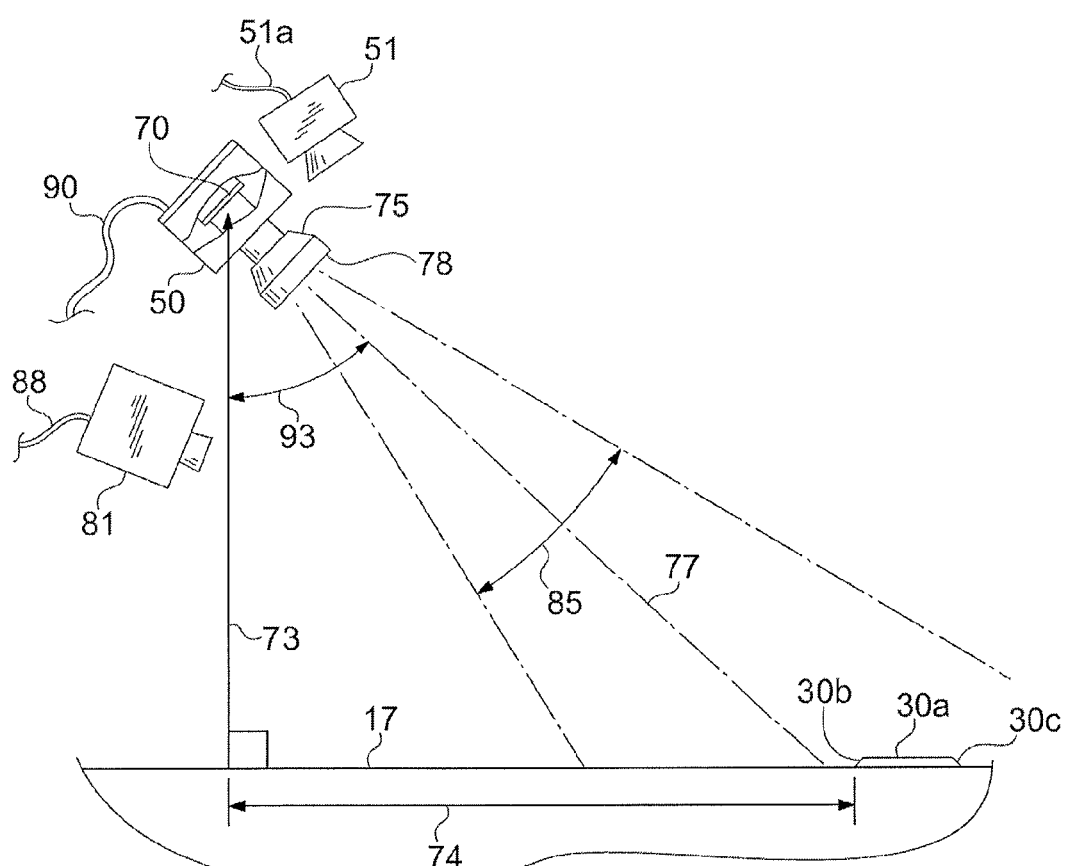
FIG. 9 is a detailed side view of a first imager positioned to image a roadway mark.

Referring now to FIG. 9, a partially cut away side view of the first imager 50 is shown imaging the roadway top surface 17. The adjustable mounting system affixing the first imager 50 to vehicle 1 is not shown in FIG. 9 but is further discussed in reference to FIG. 10. The following discussion specifically refers to the first imager 50; it should be understood, however, that the discussion also pertains to the second imager 60, which is substantially the same as the first imager 50.

Mounted within the first imager 50 is an imaging sensor 70. The center of the imaging sensor 70 is vertically displaced from the roadway top surface 17 by a vector 73 which is normal to the roadway top surface 17 and a distance 74 from the mark edge 30b. The imaging sensor 70 is preferably a conventional charge-coupled device (CCD) or may be an active pixel complementary metal-oxide-semiconductor (CMOS) sensor, having a square or rectangular array of sensor pixels (not shown). A CCD is a device for the movement of electrical charge, usually from within the device to an area where the charge can be manipulated, for example conversion into a digital value. This movement is achieved by "shifting" the signals between stages within the device one at a time. CCDs move charge between capacitive bins in the device, with the shift allowing for the transfer of charge between bins.

Figure 12:
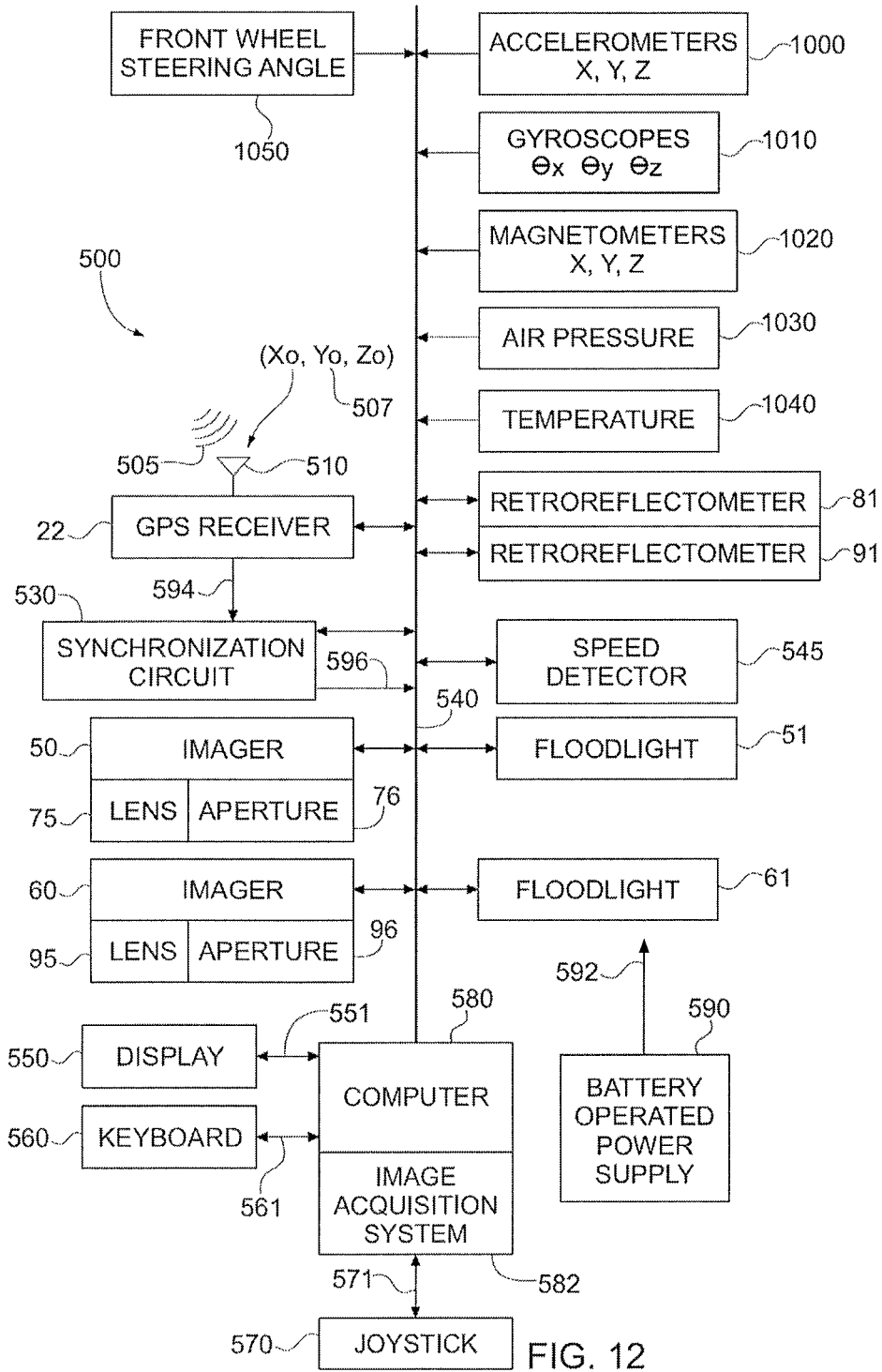
FIG. 12 is a block diagram of one embodiment of the invention, specifically illustrating the sensors used for computing the Bayesian model-based filter enhanced GPS geographical location.

Affixed to the first imager 50 is an electronically adjustable optical lens element 75 having an optical axis 77 and an electronically adjustable aperture 76 (see FIG. 12). Further affixed to the lens element 75 is an optical filter 78. An angle 93 defines the acute angle between the normal vector 73 and the optical axis 77. Preferably, the center of the imaging sensor 70 coincides with the optical axis 77. Likewise, affixed to the second imager 60 are an electronically adjustable optical lens element 95 (FIG. 12), an electronically adjustable aperture 96 (FIG. 12), and an optical filter (not shown but corresponding to the optical filter 78 affixed to first imager 50).

Data and control signals are able to communicate with the first imager 50, the lens element 75, and the adjustable aperture 76 via a flexible cable 90. The cable 90 also includes power cables to supply the necessary electrical power to the first imager 50 and the electronically adjustable lens element 75 and the aperture 76.

The lens element 75 and the aperture 76 define an angular field of view 85 of the first imager 50 and focuses objects within the angular field of view 85 onto the imaging sensor 70. The angular field of view 85 preferably includes the section 30a of the center mark 30 including mark edges 30b and 30c. Likewise, the lens element 95 and the aperture 96 define the angular field of view of the second imager 60 and focus objects within this angular field of view onto the imaging sensor of the second imager 60.

It is noted that the center mark 30 shown in FIGS. 7 and 8 is a dashed line. The center mark 30 could be a solid line, a double solid line, or any mark type currently used on roadways. Likewise, the edge marks 20 and 25 could be any mark type currently used on roadways.

Also shown in FIG. 9 is a conventional floodlight 51. The floodlight 51 is positioned above the first imager 50 and is affixed to the left side panel 12 by a conventional mechanism. The floodlight 51 illuminates the image area 55 in low ambient light conditions (such as at dusk or night time) so that the first imager 50 can distinctly image the roadway mark section 30a including the edges 30b and 30c.

Another floodlight 61 (see FIG. 12) may be positioned above the second imager 60 and affixed to the right side panel 14. The floodlight 61 correspondingly illuminates the area 65 in low ambient light conditions (such as at dusk or night time). Power to both the floodlights 51 and 61 may be provided via power cables. A power cable 51a is shown in FIG. 9 attached to the floodlight 51. A similar power cable (not shown) is attached to the floodlight 61. The on/off state for each floodlight 51, 61 is electrically controlled by conventional mechanisms. When the floodlights 51 and 61 are turned on, the image areas 55 and 65 are respectively illuminated.

Also shown in FIG. 9 is a retroreflectometer 81. The retroreflectometer 81 is a device capable of measuring the retroreflectivity of materials, for example, by measuring retroreflected light and retroreflective surfaces. Retroreflectivity is an optical phenomenon, well known to one of ordinary skill in the art, in which reflected rays of light are returned in directions close to the opposite of the direction from which the light originated. The retroreflectometer 81 may be positioned below the first imager 50 and affixed to the left side panel 12 by conventional mechanisms. The retroreflectometer 81 measures the retroreflection of the section 30a of the center mark 30 and is calibrated to yield accurate and equivalent 30-meter geometry, or any other applicable industry standard, retroreflection measurements. Another retroreflectometer 91 (see FIG. 12) may be positioned below the second imager 60 and affixed to the right side panel 14 by conventional mechanisms. The retroreflectometer 91 provides calibrated retroreflection measurements of section 25a of the edge mark 25, for example.

Data and control signals communicate with the retroreflectometer 81 via a flexible cable 88. The cable 88 also includes power cables to supply the necessary electrical power to retroreflectometer 81. A similar cable (not shown) provides data and control signal communication and electrical power to the retroreflectometer 91.

The relative position of the imaging sensor 70 with respect to GPS antenna 510 is assumed known by conventional mechanisms (e.g., vectorial offsets are determined by conventional mechanisms). Therefore, the GPS position of the imaging sensor 70 may be determined by one of ordinary skill in the art. In addition, the relative position of the imaging sensor within the second imager 60 with respect to the GPS antenna 510 is assumed known by conventional mechanisms, and likewise therefore, the GPS position of the imaging sensor within the second imager 60 is known.

The imagers 50 and 60 are calibrated so that the relative location of an actual object within the angular field of view 85 on the roadway top surface 17 can be determined with respect to the imaging sensor 70. For example, the relative location of the edge 30b of the center mark 30 with respect to the imaging sensor 70 can be determined. Dimensions of an actual object from its image can also be determined. Conventional camera calibration techniques are known in the art for calibrating imagers to yield accurate object dimensions, locations, and distances of objects to image sensors from images using conventional coordinate transformation algorithms. For example, perspective and lens distortion can be corrected for by conventional camera calibration techniques, and the imagers 50 and 60 may be GPS location calibrated.

Therefore, knowing the relative location of the object (e.g., the center mark 30) with respect to the imaging sensor 70, and the relative location of the imaging sensor 70 with respect to the filter-enhanced GPS location of the GPS antenna 510, allows for the determination of the absolute GPS geographical position of an imaged object (or parts thereof) on the roadway top surface 17, such as a roadway mark. Further, the length and width dimensions of the actual object imaged onto the imaging sensor 17 can also be determined, such as the length and width dimensions of the section 30a of the roadway mark 30. It is therefore understood that every image pixel has an associated absolute filter-enhanced GPS geographical position. For example, all four corners of the image of the area 55 have an associated accurate, absolute filter-enhanced GPS geographical location which corresponds to the actual corners of the area 55.

The instant filter-enhanced GPS location of any object within the angular field of view 85 of the calibrated first imager 50 is determined assuming that the filter-enhanced GPS location data are instantly available when the image from the calibrated first imager 50 is acquired. The filter-enhanced GPS location of any object within the field of view of the calibrated second imager 60 is also instantly determined in a similar fashion. If the filter-enhanced GPS location data are not instantly known when the images from the imagers 50 and 60 are acquired because of GPS receiver latency or for other reasons, positional interpolation based upon the known time the images were captured is required.

Figure 10A:
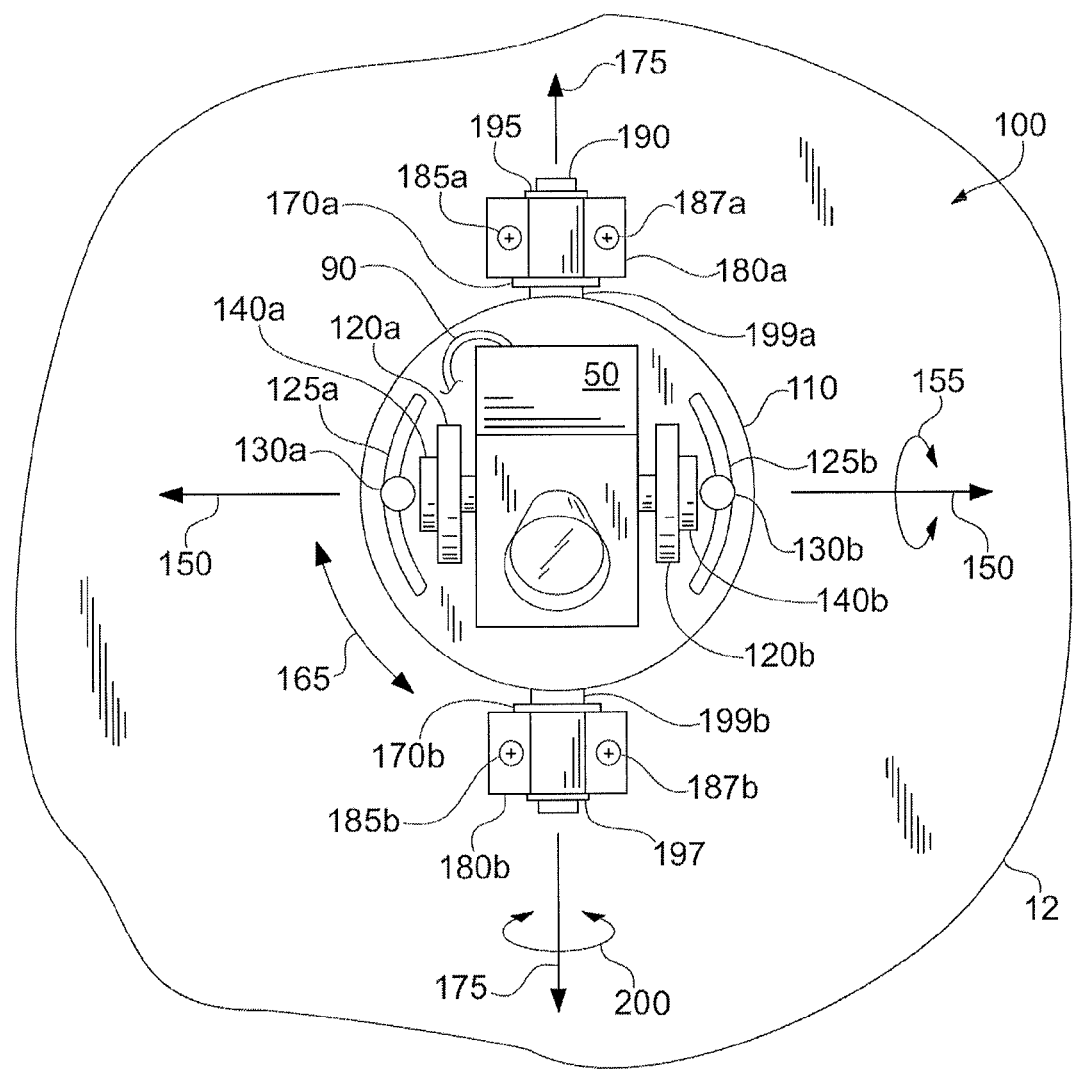
FIG. 10A is a front view of the adjustable imager mount.
Figure 10B:
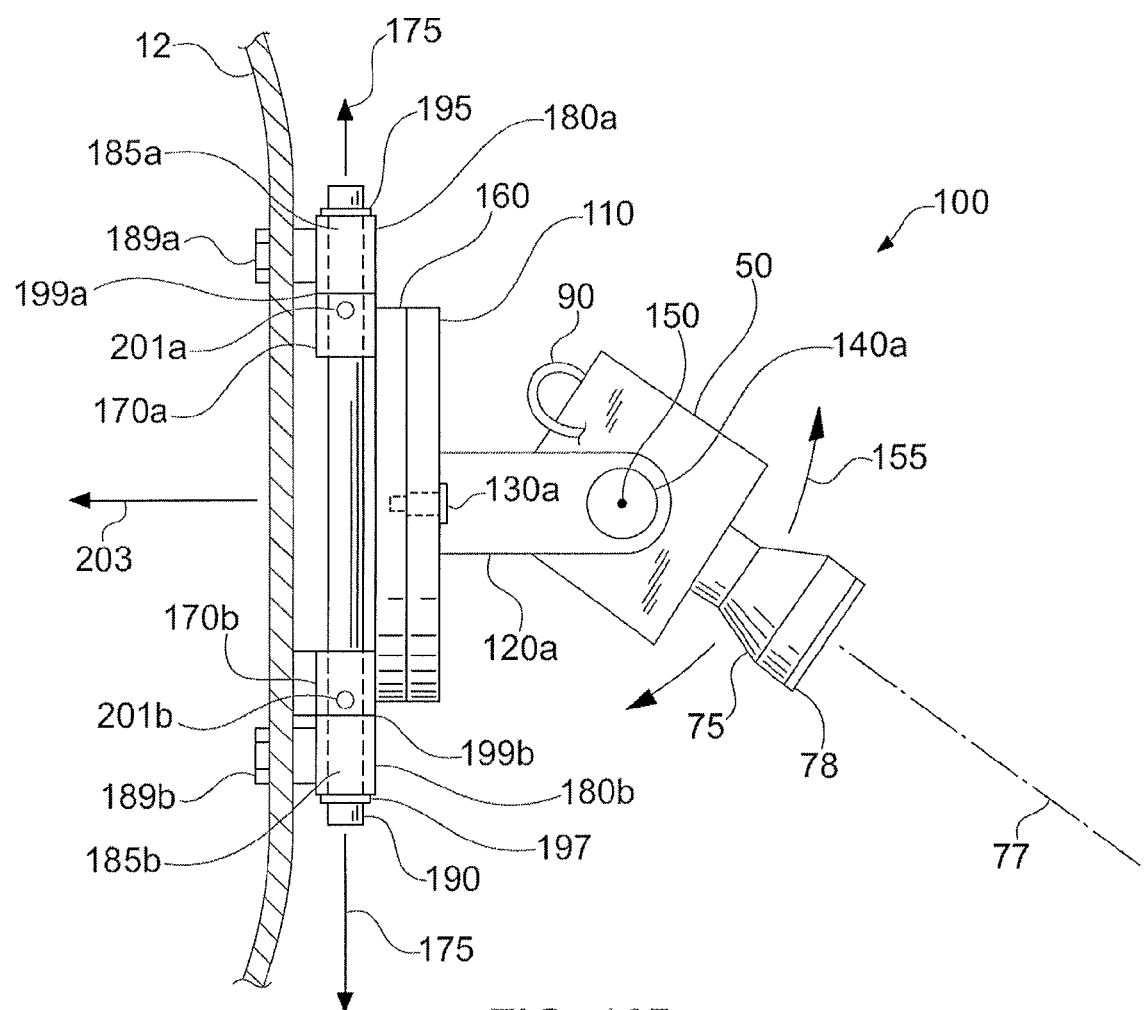
FIG. 10B is a side view of the adjustable imager mount shown in FIG. 10A.

Referring now to FIGS. 10A and 10B, the first imager 50 may be mounted to the left side panel 12 of the vehicle 1 with an adjustable angular mount 100. The angular mount 100 includes a cylindrically shaped rotatable mounting plate 110 having fixed imager support brackets 120a and 120b. The brackets 120a and 120b extend outwardly from the surface of the rotatable mounting plate 110, and are affixed to the rotatable mounting plate 110 using conventional attachment mechanisms such as screws, or they may be welded into place (not shown).

The rotatable mounting plate 110 additionally has through slots 125a and 125b formed to accept shoulder screws 130a and 130b. The first imager 50 is positioned between the brackets 120a and 120b and is held in place with conventional rotatable mounts 140a and 140b, such that the first imager 50 is rotatable around an axis 150 as indicated by rotational arrows 155. The first imager 50 is affixed to the rotatable mounts 140a and 140b using conventional attachment mechanisms such as screws (not shown).

The rotatable mounting plate 110 is axially aligned with, and rotatably mounted to, a cylindrically shaped support plate 160. The rotatable mounting plate 110 is affixed to support plate 160 with shoulder screws 130a and 130b. Loosening the screws 130a and 130b allows the rotatable mounting plate 110 to rotate around an axis 203 as indicated by rotational arrows 165. Tightening the screws 130a and 130b affixes the rotatable mounting plate 110 to the support plate 160 and prevents rotation of the rotatable mounting plate 110 with respect to the support plate 160.

The support plate 160 has, further affixed on its surface facing the vehicle left side panel 12, two conventional bearings 170a and 170b. The bearings 170a and 170b are aligned along an axis 175 and are affixed to the support plate 160 using conventional mechanisms such as screws (not shown). The bearings 170a and 170b also have through set screws 201a and 201b.

Affixed to the vehicle side panel 12 are two conventional shaft support brackets 180a and 180b. Conventional machine screws 185a, 187a, 185b, and 187b and respective nuts (including nuts 189a and 189b, and other not shown), are used to affix shaft support brackets 180a and 180b to vehicle side panel 12.

The support brackets 180a and 180b, and the bearings 170a and 170b, are all aligned along the axis 175. A shaft 190 (preferably stainless steel) is inserted through the bearings 170a and 170b, and the support brackets 180a and 180b, and is affixed to the shaft support brackets 180a and 180b by conventional clamps 195 and 197, respectively.

Washers 199a and 199b minimize the frictional contact between the upper outer face of the bearing 170a and the bottom outer face of the support bracket 180a, and the bottom outer face of the bearing 170b and the upper outer face of the support bracket 180b, respectively.

The support plate 160 is prevented from rotating around the shaft 190 by tightening the set screws 201a and 201b. Thus, the support plate 160 is able to fixedly rotate about the axis 175 as indicated by rotational arrow 200.

The adjustable angular mount 100 provides for three adjustable orthogonal rotations for the first imager 50 around the axes 150, 175, and 203. The first imager 50 can therefore be mounted on a contoured side panel 12 and subsequently aligned to the image area 55 and then secured in this aligned position. In addition, the adjustable angular mount 100 can be motorized and electronically controlled using a conventional motorized camera mount and externally controlled via a computer and joystick.

It is further understood that other equipment could be used to affix the shaft support brackets 180a and 180b to vehicle side panel 12. For example, machine screws along with respective nuts could be replaced with other types of attachments for securing the shaft support brackets 180a and 180b, and hence the adjustable angular mount 100, to the left side panel 12 of the vehicle 1.

Figure 10C:
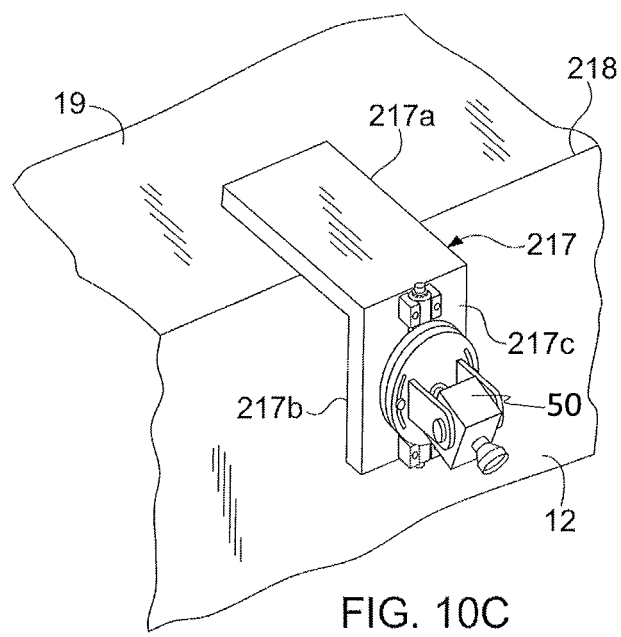
FIG. 10C is a perspective view of an L-shaped bracket used for affixing the adjustable imager mount to the roof of a vehicle.

Still referring to FIG. 10C, the adjustable angular mount 100 may also be affixed to vehicle 1 (e.g., to the left side of roof 19 of vehicle 1) using a conventional L-shaped bracket 217. A leg 217a of the bracket 217 is attached to the roof 19 by a conventional mechanism (for example, by screws or welded into place, not shown). The leg 217a extends beyond a roof line 218 of the vehicle 1. A leg 217b of the bracket 217 is vertically positioned and provides an outside surface 217c for affixing the shaft support brackets 180a and 180b, using conventional attachment mechanisms.

Figure 11:
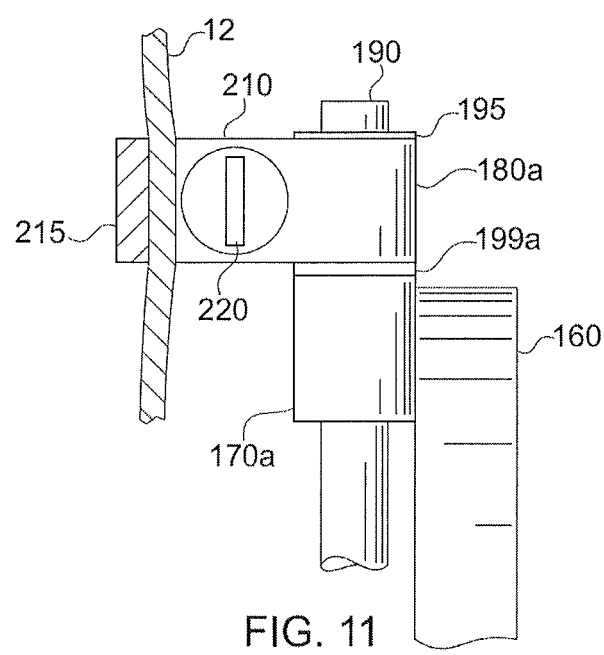
FIG. 11 is a side view of a magnetic clamp for affixing the imager mount to the side of a vehicle.

Referring now to FIG. 11, an example of another mechanism for attaching the adjustable angular mount 100 to the left side panel 12 is shown. The mechanism includes a conventional releasable magnetic clamp 210 affixed to the shaft support bracket 180a. A turning switch 220 directs the magnetic field of the magnetic clamp 210 to forcibly attract the magnetic clamp 210 to the ferromagnetic metallic vehicle left side panel 12. If the side panel 12 of the vehicle 1 is constructed of non-ferromagnetic material, a ferromagnetic strip 215 placed on the inside surface of the side panel 12 and oppositely aligned with the magnetic clamp 210 is used in combination with the magnetic field of the magnetic clamp 210 to affix the support bracket 180a. Another magnetic clamp (not shown) is similarly affixed to the shaft support bracket 180b. In addition, the ferromagnetic strip 215 could also be placed behind window glass of the vehicle 1 allowing the magnetic clamp 210 to fix the adjustable angular mount 100 to the glass surface.

Suction cups could also be used in place of the releasable magnetic clamps 210, 216, and are especially advantageous for affixing the adjustable angular mount 100 to side window glass. Also, a combination of one magnetic clamp (for affixing to a metallic side of the vehicle 1) and one suction cup (for affixing to glass) could be used to affix the adjustable angular mount 100. Suction cups could also be used to affix the adjustable angular mount 100 on smooth surfaces. A combination of ferromagnetic material and the magnetic clamp 210 along with suction cups could also be used to affix the adjustable angular mount 100 to the side panel 12. It is noted that the bracket 217 may also be affixed to the roof 19 using one or more magnetic clamps similar in construction to the magnetic clamp 210, or one or more suction cups, or a combination thereof, in place of the conventional attachment mechanisms.

It is also understood the second imager 60 is affixed to the right side panel 14 or on the right side of the roof 19 of the vehicle 1 using similarly constructed mounts (not shown).

Referring now to FIG. 12, a schematic block diagram 500 of another embodiment is shown. The embodiment includes a number of components and systems: the GPS antenna 510, the GPS receiver 22, a programmable synchronization circuit 530, the first imager 50, the lens element 75, the aperture 76, the floodlight 51, the second imager 60, the lens element 95, the aperture 96, the floodlight 61, a bi-directional communication bus 540, a display 550, a keyboard 560, a joystick 570, a computer 580, a vehicle speed detector 545, the retroreflectometers 81 and 91, and a power supply 590 (e.g., a battery).

Also shown in FIG. 12 is an accelerometer sub-system 1000, a gyroscopic sub-system 1010, a magnetometer sub-system 1020, an air pressure sensor 1030, a temperature sensor 1040 and a front wheel steering angle sensor 1050.

The GPS receiver 22, the synchronization circuit 530, the imagers 50 and 60, the lens elements 75 and 95, the apertures 76 and 96, the speed detector 545, the floodlights 51 and 61, the retroreflectometers 81 and 91, the accelerometer sub-system 1000, the gyroscopic sub-system 1010, the magnetometer sub-system 1020, the air pressure sensor 1030, the temperature sensor 1040 and the front wheel steering angle sensor 1050 and the computer 580 are electrically interconnected, and in communication with each other, for example, via a bi-directional bus 540.

The computer 580 is a conventional computer having an image acquisition system 582 for controlling and triggering the imagers 50 and 60, and a real-time clock (time base) for calculating accurate time intervals (not shown).

In addition, the keyboard 560 connects to the computer 580 via a dedicated bi-directional connection 561 and provides a way for a user to input data into the computer 580. The display 550 connects to the computer 580 via a dedicated bi-directional bus 551 and provides the user with a visualization of mark images generated by the computer 580 and visually displays other information to the user. The joystick 570 connects to the computer 580 via a wired connection 571 and is used to control the motorized adjustable angular mount 100.

The display 550, the keyboard 560, and the joystick 570 are conventional computer peripherals. A conventional mouse is also connected to the computer 580 via a cable (not shown). The keyboard 560, the display 550, the joystick 570, and the mouse could also communicate with the computer 580 via a wireless connection or a combination of cable and wireless connections, or connect directly to the bus 540 for communicating with the computer 580.

The GPS antenna 510 receives GPS radio waves or signals 505 which originate from a remote GPS satellite system and/or a GPS-pseudolite array. The GPS antenna 510 is conductively connected to the input of the GPS receiver 22. The GPS radio signals 505 could also include real time kinematic (RTK) service provider signals (not shown). RTK satellite navigation is a technique used to enhance the precision of position data derived from satellite-based positioning systems. The technique can be used in conjunction with GPS, GLONASS, and/or Galileo. It uses measurements of the phase of the signal's carrier wave, rather than the information content of the signal, and relies on a single reference station to provide real-time corrections, providing up to centimeter-level accuracy. With reference to GPS in particular, the system is commonly referred to as Carrier-Phase Enhancement, or CPGPS.

The GPS receiver 22 determines the time and geographical location 507 of the GPS antenna 510 at a periodic rate programmed by the computer 580, or the GPS receiver 22 can be polled by the computer 580 for positional and time information. Raw GPS geographical location/positional data and time information from the GPS receiver 22 is placed onto the bus 540.

The accelerometer sub-system 1000 includes conventional accelerometer sensors for each axis x, y, and z of the coordinate system 9, and measures the acceleration of the vehicle 1 for each axis and also computes the velocity and position for each axis (all derived from the acceleration data). The gyroscopic sub-system 1010 includes gyroscope sensors for measuring the rotational acceleration about each x, y and z axis and also computes angular velocity and the Euler angle orientation (i.e., in addition to the roll, pitch and yaw angles) of vehicle 1. The magnetometer sub-system 1020 includes conventional magnetometer sensors to determine the earth's magnetic field in the x, y and z directions and computes the direction and magnitude of the magnetic field with respect to the vehicle coordinate system 9. The air pressure sensor 1030 measures the atmospheric air pressure and the temperature sensor 1040 measures the ambient temperature. Both the air pressure sensor 1030 and temperature sensors are of conventional design. The front wheel steering angle sensor 1050 measures the angle of the front wheels with respect to the forward direction of the vehicle 1. Steering wheel steering angle may be obtained from a steering wheel sensor of conventional design using, for example, optical or magnetic rotational sensors manufactured by SKF (model numbers AHE-5401C or AHE-5701C) headquartered in Lansdale, Pa. (North American office), or Bosch (model number LWS6) headquartered in Gerlingen, Germany. It is specifically noted that the computer 580 may access all sensor data including vehicle speed data from the speed detector sensor 545, and RTK correctional data.

Figure 13:
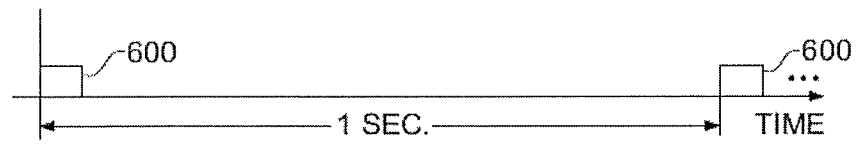
FIG. 13 is a timing diagram illustrating a periodic GPS receiver timing pulse.

Referring to FIG. 13, the GPS receiver 22 also outputs a periodic pulse signal 600 onto a line 594 which flows to an input connection of a synchronization circuit 530. The time of occurrence of the periodic pulse signal 600 is accurately known. For example, the Trimble GPS receiver model number BD982 provides a one pulse per second (1 pps) signal with a corresponding ASCII formatted Universal Time Coordinated (UTC) time tag (i.e., the exact time of pulse occurrence).

Figure 14:
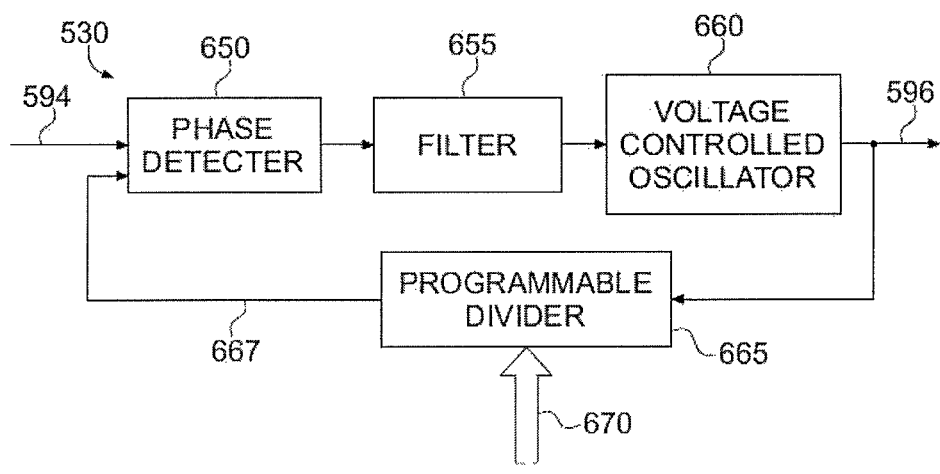
FIG. 14 is a block diagram of a phase lock loop having a programmable divider inserted into the phase lock loop feedback signal path.

Referring to FIG. 14, the synchronization circuit 530 comprises a conventional phase lock loop circuit (having a phase detector 650, a low pass filter 655, and a voltage controlled oscillator 660) and a programmable divider circuit 665 inserted into a phase lock loop feedback path 667.

The programmable divider 665 is programmed to divide the periodic pulse signal 600 placed onto the line 594 by an integer number represented by a binary digital signal 670 input from the bus 540. The binary digital signal 670 is placed onto the bus 540 by the computer 580. The output signal from the voltage controlled oscillator 660 is placed onto a line 596 which then flows via the bus 540 to the trigger input of the image acquisition system 582 contained within the computer 580.

Figure 15:
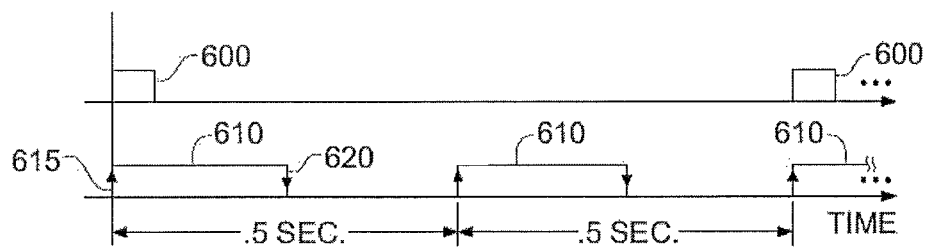
FIG. 15 is a timing diagram illustrating a periodic GPS receiver timing pulse and synchronization circuit output.

For example and referring now to FIG. 15, an eight-bit programmable divider (divide by N counter) 665 programmed with binary digital signal "00000010" (which represents a divider integer value of 2) causes the programmable divider 665 to divide the periodic pulse signal 600 by 2. This produces a periodic signal 610 which is twice the frequency of the periodic pulse signal 600. For example, for a one pulse per second periodic pulse signal 600 and a divide by 2 integer value programmed into the programmable divider 665, a periodic pulse signal 610 is produced having a frequency of 2 pulses per second (period equals 0.5 seconds) which will be output from the voltage controlled oscillator 660 and placed onto the line 596.

The phase lock loop also maintains excellent frequency tracking to strobe the periodic pulse signal 600. Thus knowing the time of occurrence of the periodic signal 600 and the divider integer defines the exact time of when the rising edge 615 of the periodic pulse signal 610 occurs. Thus, the synchronization circuit 530 can be programmed via the computer 580 for producing the periodic signals 610 having an equal or higher frequency as, and synchronized with, the periodic pulse signal 600.

An example of a phase lock loop is a 74HC4046 integrated circuit. The phase lock loop function can also be implemented in software, or a combination of software and hardware. Additionally, a microcontroller (not shown) may be used instead of the phase lock loop and may be programmed to output a signal synchronized to the periodic pulse signal 600 but of equal or higher frequency.

In response to being triggered by the periodic pulse signal 610, the image acquisition system 582 simultaneously triggers the imagers 50 and 60 to capture images of the areas 55 and 65, respectively. The captured images of the areas 55 and 65 are then subsequently stored in a computer data memory 720 (see FIG. 15). As discussed below, along with each captured image are an image index number, time, and an interpolated GPS geographical position. It is assumed that the imagers 50 and 60 are triggered on the rising edge 615 of the periodic pulse signal 610, although the imagers 50 and 60 could also be triggered on the falling edge 620 of the periodic pulse signal 610.

Triggering the imagers 50 and 60 at an equal or higher frequency than the frequency of the periodic pulse signal 600 provides for one or multiple images of the areas 55 and 65 of the roadway surface 17 for every pulse of the periodic pulse signal 600. As an example, having the computer 580 program the divider circuit 665 with an equivalent integer value of 2 results in the synchronization circuit 530 producing a periodic pulse signal 610 which is twice the frequency of the periodic pulse signal 600 as shown in FIG. 15.

The speed detector 545 determines the speed of the vehicle 1 which may be determined by conventional mechanisms such as an electronic speedometer. The speed of the vehicle 1 may also be determined by the computer 580 from the known distance traveled using GPS coordinates and the time it takes for the vehicle 1 to travel the known distance.

The power supply 590 provides electrical power to all the components of the block diagram 500 via a power bus 592 and is preferably operated from an internal battery (not shown) of the vehicle 1. The power supply 590 may provide both AC and DC power.

Figure 16:
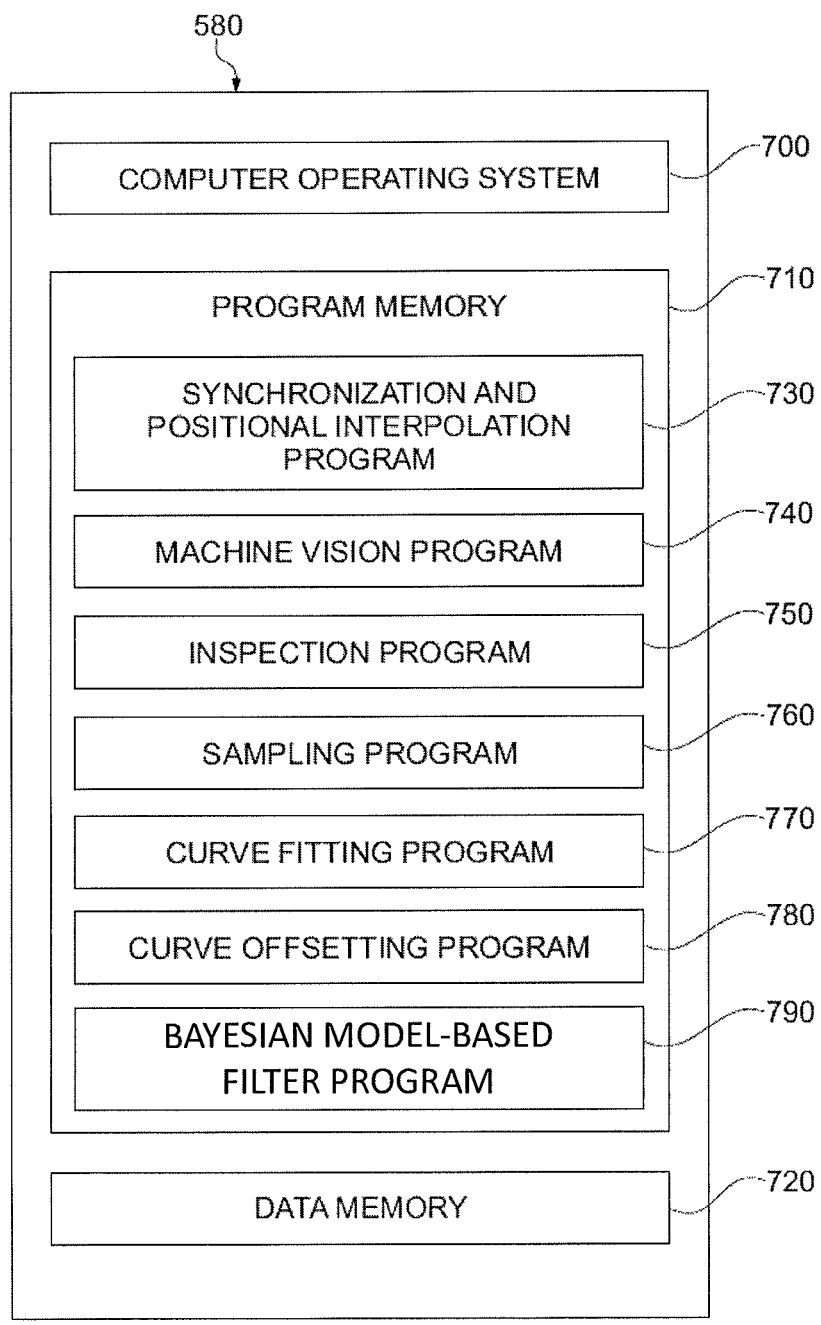
FIG. 16 is a block diagram illustrating a computer used in the present invention, which includes a computer operating system, program memory, and data memory.

Referring now to FIG. 16, the computer 580 further includes a computer operating system software 700, a program memory 710, and the data memory 720. The operating software 700 is a conventional operating system (OS) such as Windows 7 manufactured by Microsoft, a Unix-based OS, or an Apple Computer OS system. The data memory 720 is a conventional computer read-write memory. For example, the data memory 720 could include separately or in combination conventional solid state drive(s), high-speed hard disk drive(s), and/or random access memory (RAM). The program memory 710 comprises a synchronization and positional interpolation program 730, a machine vision program 740, an inspection program 750, a sampling program 760, a curve fitting program 770, a curve offsetting program 780, and a Bayesian model-based filter program 790 (implemented as a Kalman filter program).

The synchronization and positional interpolation program 730 corrects for any time latency (if any) in the GP S receiver 22 (discussed below and with reference to FIG. 17) and also determines the filter-enhanced GPS geographical position for each captured image. In addition, the synchronization and positional interpolation program 730 determines the GPS derived time-tag and provides a sequential image index number for each captured image. These data are then stored into the data memory 720.

Figure 17:
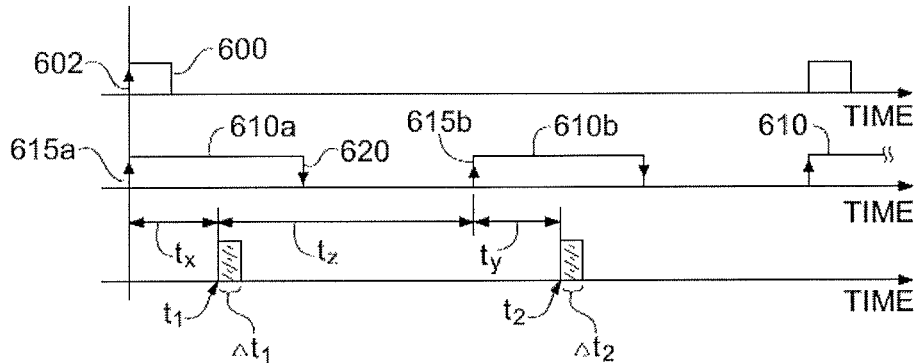
FIG. 17 is a timing diagram showing GPS receiver time latency.

Referring now to FIG. 17, the periodic pulse signal 600 along with the synchronized periodic pulse signal 610 is shown. The rising edges (e.g., the first two rising edges 615*a* and 615*b*) of the synchronized periodic pulse signal 610 (the first two pulses are indicated as 610*a* and 610*b*) are used to trigger the image acquisition system 582 thereby acquiring images of the areas 55 and 65 from the imagers 50 and 60, respectively.

At instant time t1, the GPS receiver 22 acquires raw GPS geographical positional and GPS time data. The raw GPS geographical position data is then fused with the sensor data by the Kalman filter program 790 to calculate a more accurate, Kalman filter corrected, GPS geographical positional data. These data are available during time interval Δt1 after the positional and time data are acquired at instant time t1. Instant time t1 could occur at the rising edge 602 of the periodic pulse signal 600 and would therefore be synchronized to the periodic pulse signal 600, or it could be delayed by time interval tx from the rising edge 602 of the periodic pulse signal 600. The time interval Δt1 is defined as the time latency which occurs because the GPS receiver 22 needs calculation time to compute the GPS time and raw GPS geographical location values from the satellite signals 505, or for other reasons.

Likewise, at instant time t2, the GPS receiver 22 acquires raw GPS geographical positional and GPS time data. The raw GPS geographical position data acquired at instant time t2 is then fused with the sensor data by the Kalman filter program 790 to calculate a more accurate, Kalman filter corrected, GPS geographical positional data. Instant time t2 could be delayed by time interval ty from the rising edge 615*b* of the trigger signal pulses 610*b*. The time interval Δt2 is defined as the time latency associated with instant time t2 which occurs because the GPS receiver 22 needs calculation time to compute the GPS time and raw GPS geographical location values from the satellite signals 505, or for other reasons.

Instant time t2 could occur at a preset time interval after t1, or instant times t2 and t1 could occur periodically. In either case, there is a possibility that the image trigger signal pulses 610*a* and 610*b* are not synchronized with instant time t1 or instant time t2, and therefore the exact filter-enhanced GPS geographical location of the image is not known within a high degree of positional accuracy.

Accurate GPS coordinates for the images of the areas 55 and 65 from the imagers 50 and 60, respectively, are determined at the rising edge 615*b* by first determining the time interval (t2-t1) and the GPS geographical positional difference (or equivalent positional differences in ENU or UTM coordinates). Knowing the UTC time-tag of the rising edge 615*b* of the pulse 610*b* yields the time interval tz. Knowing tz and the time interval (t2-t1), a simple linear interpolation is used to determine the geographical position of the images which are triggered by the rising edge 615*b*.

The GPS location of images triggered by the rising edge 615*b* equals the time interval tz divided by the time interval (t2-t1) times the geographical positional difference corresponding to times t2 and t1, plus the geographical position at t1. This process is repeated for subsequent images.

Figure 18:
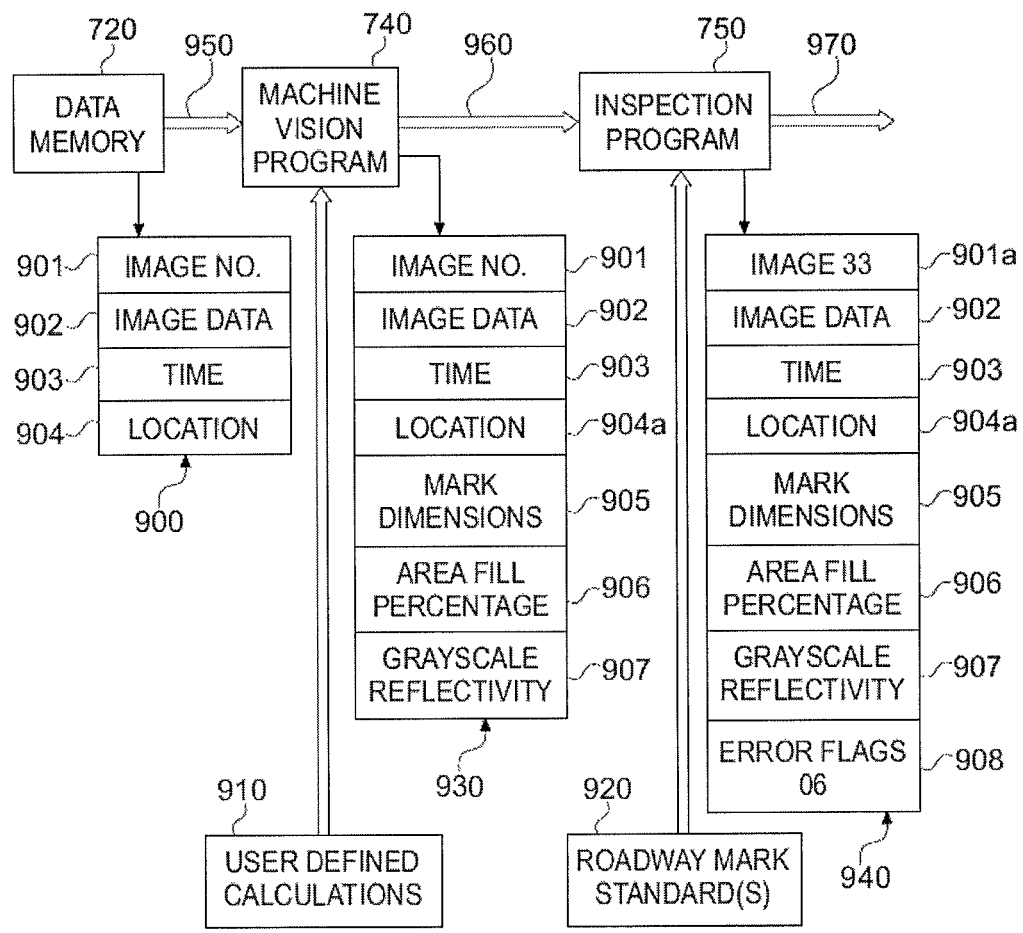
FIG. 18 is a schematic block diagram showing the data input and data output of the machine vision and inspection programs.

Referring to FIG. 18, each triggered image from the imagers 50 and 60 therefore has a data block 900. The data block 900 includes an associated image index number 901 sequentially identifying the captured images, the actual captured image data 902 of the roadway area (which may or may not include a roadway mark), a GPS derived time-tag 903 (i.e., the time the images were acquired), and an associated accurate filter-enhanced GPS geographical location 904 (i.e., Kalman filter enhanced GPS geographical location)—all of which are stored in the data memory 720 by the synchronization and positional interpolation program 730. The data block 900 is then passed to the machine vision program 740 as indicated by arrow 950.

The machine vision program 740 includes a number of machine vision algorithms which are selected by the user-defined calculations input 910 to perform desired calculations on the image data 902. The calculations may include, for example, edge detection, geometric computations and distance computations of imaged objects, and other generic machine vision calculations. For example, the machine vision program 740 includes algorithms which the user selects by the user-defined calculations input 910 to determine the roadway mark edges within the field of view of the imagers 50 and 60 (for example the edges 30*b* and 30*c*); the actual width and length dimensions and the absolute filter-enhanced GPS location of the roadway mark from the roadway mark image; and other roadway mark characteristics such as the area of the roadway mark. The machine vision program 740 along with color responsive imagers 50 and 60 may also determine the color of the roadway mark (for example, yellow or white).

The machine vision program 740 also includes algorithms which the user may select using the user-defined calculations input 910 to determine, using the grayscale values of the acquired images, the reflectivity of the roadway mark, the reflectivity of the surrounding roadway surface, and the relative difference between the reflectivity of the roadway mark and reflectivity of the surrounding roadway surface. Grayscale images may include images where the value of each pixel is a single value which will ultimately be interpreted by some rendering platform as values (such as intensities) to be displayed (or analyzed). Displayed images of this sort are typically composed of shades of gray (hence the moniker "grayscale") although any color (or, indeed, different colors) can serve in this regard. For any particular grayscale standard, there is a given available range of grayscale level values. For example, a given grayscale standard might represent a range of black at the weakest intensity to white at the strongest intensity. Thus, for example, an image of the section 30*a* of the center mark 30 may have a value of 220 (very "white") based upon a grayscale value of 0-255 (assuming an 8-bit intensity quantization), while the surrounding roadway surface (such as asphalt-macadam) may have a value of 20 (very "black"), yielding a grayscale contrast difference of 200 between the section 30*a* and the surrounding roadway surface. Further, the machine vision program 740 may include algorithms to determine the color (using any conventional color metric, such as RGB etc.) and color intensity of the roadway mark.

The machine vision program 740 also includes algorithms to compare the grayscale values of the images of the roadway and roadway mark with a predetermined threshold value. If the grayscale values are below this predetermined threshold value, the machine vision program 740 turns on the floodlights 51 and 61 to better image the roadway and roadway marks under low ambient light conditions.

Other roadway mark characteristics include the reflectivity of the roadway marks 20, 25, 30, the reflectivity of the surrounding roadway top surface 17, and the relative difference between the reflectivity of the roadway marks 20, 25, 30 and the reflectivity of the surrounding roadway top surface 17. As used in this document, "reflectivity" may refer to the fraction of incident light that is reflected by the surface (e.g., the roadway marks 20, 25, 30 or the roadway top surface 17).

The machine vision program 740 further includes algorithms which may also be selected by user-defined calculations input 910 to determine the area "fill percentage" using the grayscale values of the roadway mark. For example, the "fill percentage" may be defined as:

$$\frac{\text{Total area of roadway mark} - \text{missing area}}{\text{Total area of roadway mark}}$$

In other words, the fill percentage may be based on the relationship between the portion of the marks 20, 25, 30 that is not filled (e.g., without paint) as compared to the total area of the marks 20, 25, 30 that should be completely filled (e.g., defined by the outer perimeter of the intended or original marks 20, 25, 30).

Figure 19A:
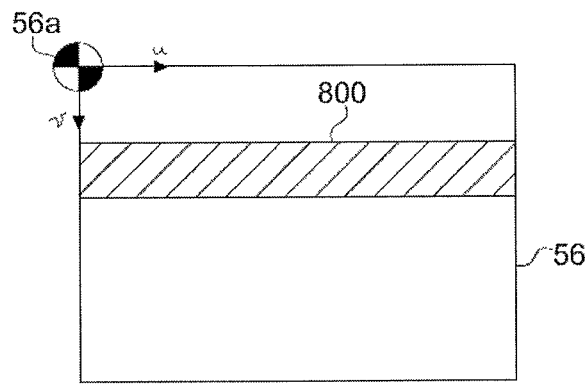
FIG. 19A is an image of a roadway mark having 100% area fill.
Figure 19B:
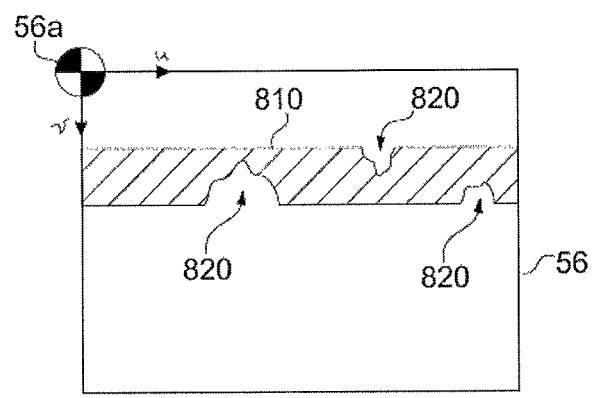
FIG. 19B is an image of a roadway mark having less than 100% area fill.

For example, FIG. 19A illustrates an image 56 of the area 55 having an imaged roadway mark segment 800 having an imaged roadway mark area fill percentage of 100%. FIG. 19B illustrates an image 56 of the area 55 having an imaged roadway mark segment 810 with partially worn-away portions 820 and having an imaged roadway mark area fill percentage of less than 100%.

The machine vision program 740 additionally includes algorithms to define the equivalent absolute filter-enhanced GPS coordinates of the corners of the image (and hence the absolute GPS coordinates of the corners of the area 55). For example, in FIG. 19A the absolute filter-enhanced GPS coordinates of the upper left hand corner of the image 56 is determined and an image corner referenced coordinate system 56a having image axes u-v can be defined.

The machine vision program 740 additionally includes algorithms which may also be selected by the user-defined calculations input 910 to compute the lateral distances (i.e., in the y direction of the coordinate system 16) between roadway marks and can determine, for example, the width of the lane 11a and/or the lateral spacing between double roadway marks, or the widths of the roadway marks. The machine vision program 740 may also be programmed by the user-defined calculations input 910 to input retroreflection data from the retroreflectometers 81 and 91.

The machine vision program 740 subsequently expands the original data block 900 to now include the desired user-defined calculations input 910 in addition to the original data contained within the data block 900. For example, the data block 900 is now expanded to include roadway mark dimensions 905 (for example, roadway mark width and length), area fill percentage 906, and grayscale reflectivity values 907, all of which are now grouped within a data block 930 and subsequently stored in the data memory 720. If retroreflection data are required, the data block 930 is further expanded to include retroreflection data. Other data may be included in the data block 930, such as lane width etc. The data block 930 can be further stored in the computer data memory 720. Machine vision program 740 also identifies the roadway mark from the roadway image and determines the filter-enhanced GPS location of the mark and stores this information in block 904a.

Figure 20:
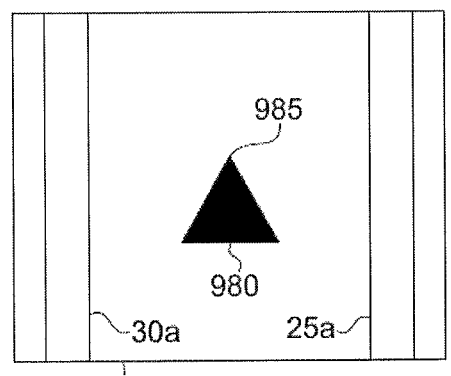
FIG. 20 illustrates the computer display showing an image of the roadway center and edge marks along with an arrow representing the vehicle location relative to the two marks.

Referring to FIG. 20, the machine vision program 740 also combines the captured images from the imagers 50 and 60 and outputs a merged image 990 to the display 550 via the computer 580 using the absolute GPS coordinates of the roadway marks and the location of the GPS antenna 510 with respect to the center of the vehicle 1. Positional offsets between the GPS antenna 510 and the imagers 50 and 60 have been previously determined by conventional mechanisms. Again, the GPS coordinates are the Bayesian model-based filter-enhanced GPS coordinate locations.

The merged image 990 consists, for example, of the imaged section 30a of the center mark 30 and the imaged section 25a of the roadway edge mark 25 with the vehicle 1 being represented as a triangle 980 having a tip 985 indicating the direction of travel of the vehicle 1. As the vehicle 1 moves laterally between the sections 30a and 25a, the triangle 980 likewise laterally moves between the imaged sections 30a and 25a. The merged image 990 correctly represents the lateral distance between the sections 30a and 25a with respect to the lateral location of the vehicle 1.

The data block 930 is then passed to the inspection program 750 as indicated by an arrow 960. The inspection program 750 inputs both the data block 930 and the user-defined roadway mark standards data 920, and further performs a comparison between the data stored in the data block 930 and the roadway mark standards data 920. Any roadway mark which does not meet the defined roadway mark standards data 920 is flagged with a code and stored in an error flags section 908 of a data block 940.

For example, the data block 940 is shown as the output of the inspection program 750 having the image index number 901a as number "33." Appended to the data block 930 is the error flags section 908. Stored within the error flags section 908 is the error flag "06," which indicates that the roadway mark derived from image 33 did not meet, for example, the roadway mark width standard. All data which fail the comparison between the data stored in the data block 930 and the roadway mark standards data 920 are stored in the data memory 720 as indicated by an arrow 970 for later analysis and remedial work.

The sampling program 760 receives a GPS reference location from the GPS receiver 22 and constructs an orthogonal Cartesian (or other conventional) coordinate system (grid system) having the origin defined at the reference location. For example, the Cartesian coordinate system 16 could be a conventional ENU coordinate system, or could be an equivalent UTM coordinate system. The sampling program 760 samples the geographical location of the pre-existing roadway mark based upon either a distance or time sampling interval. The distance sampling interval can be determined by the computer 580 from the GPS coordinates of the GPS antenna 510 computed by the GPS receiver 22. The time sampling interval can be determined either from the internal time base of the computer 580 or from GPS time computed by the GPS receiver 22, or other time bases, such as the one pulse per second (1 pps) GPS receiver 22 derived timing signal.

The curve fitting program 770 inputs discrete GPS coordinate data (Kalman filter enhanced) previously stored in the data memory 720 and determines a first continuous mathematical function which best fits the discrete GPS coordinate data. The curve offsetting program 780 inputs the continuous function determined by the curve fitting program 770 and generates a second continuous function similar and parallel to the first function but offset from the first function by a given distance. For example, the first function may represent the center mark 30 on the roadway surface 17. A second function defining a line for the roadway edge mark 25 may be derived from the first function by offsetting the first function by a distance, or the first function may represent the roadway edge mark 20 and the roadway center mark 30 may be derived from the first function by offsetting the first function by a distance.

Figure 21A:
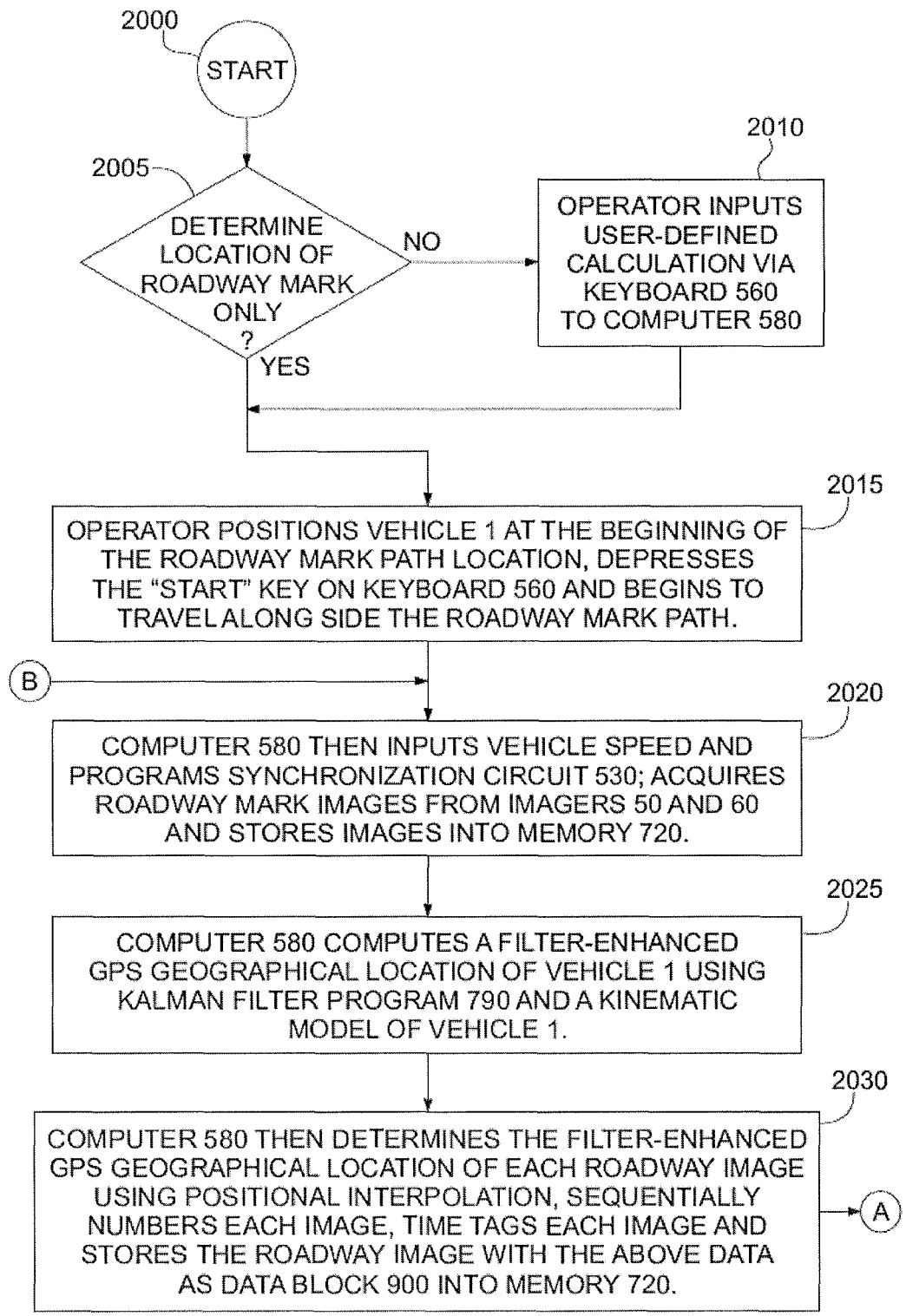
FIGS. 21A-21C illustrates a flow diagram of the filter-enhanced GPS roadway mark locator and inspection apparatus.
Figure 21B:
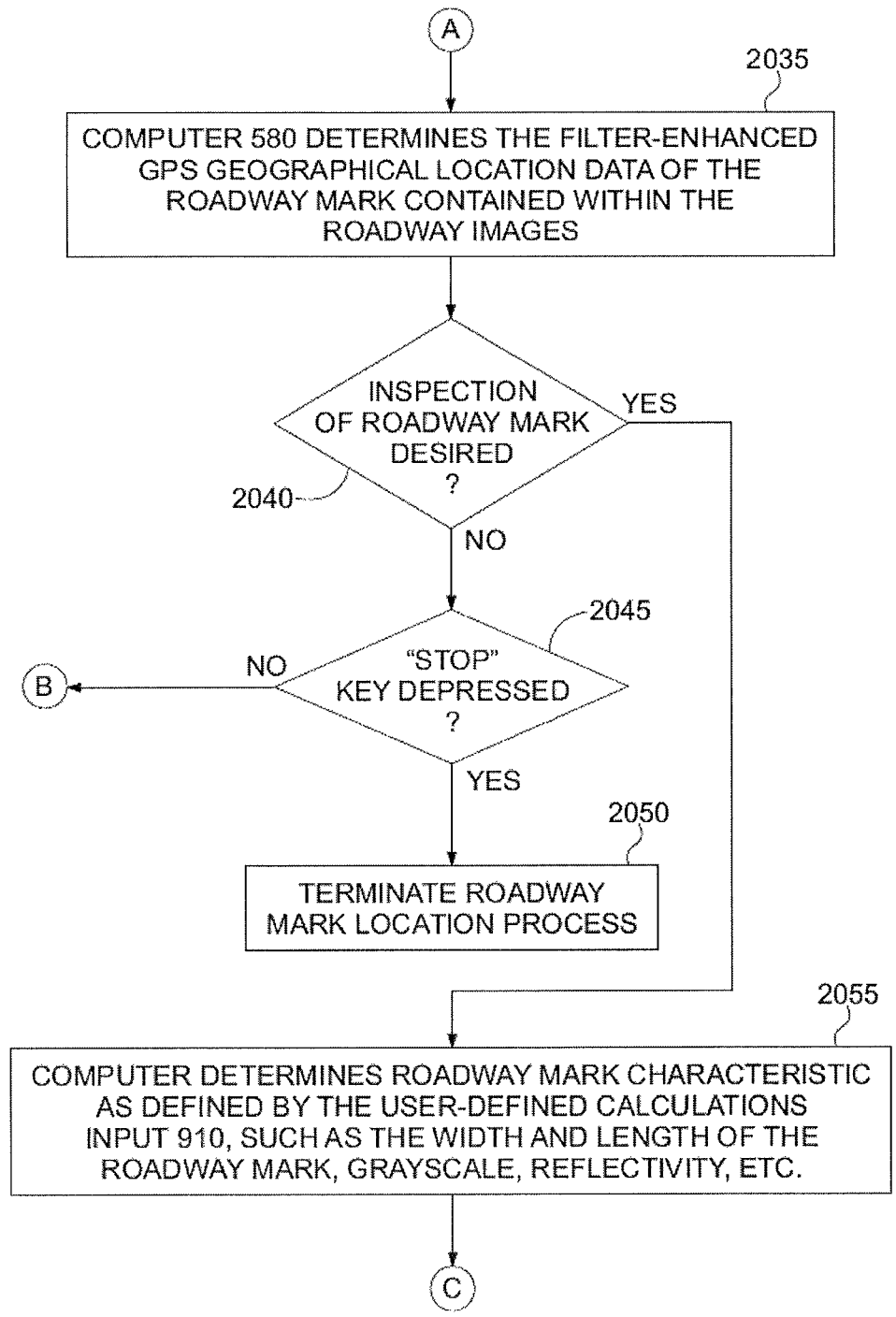
Figure 21C:
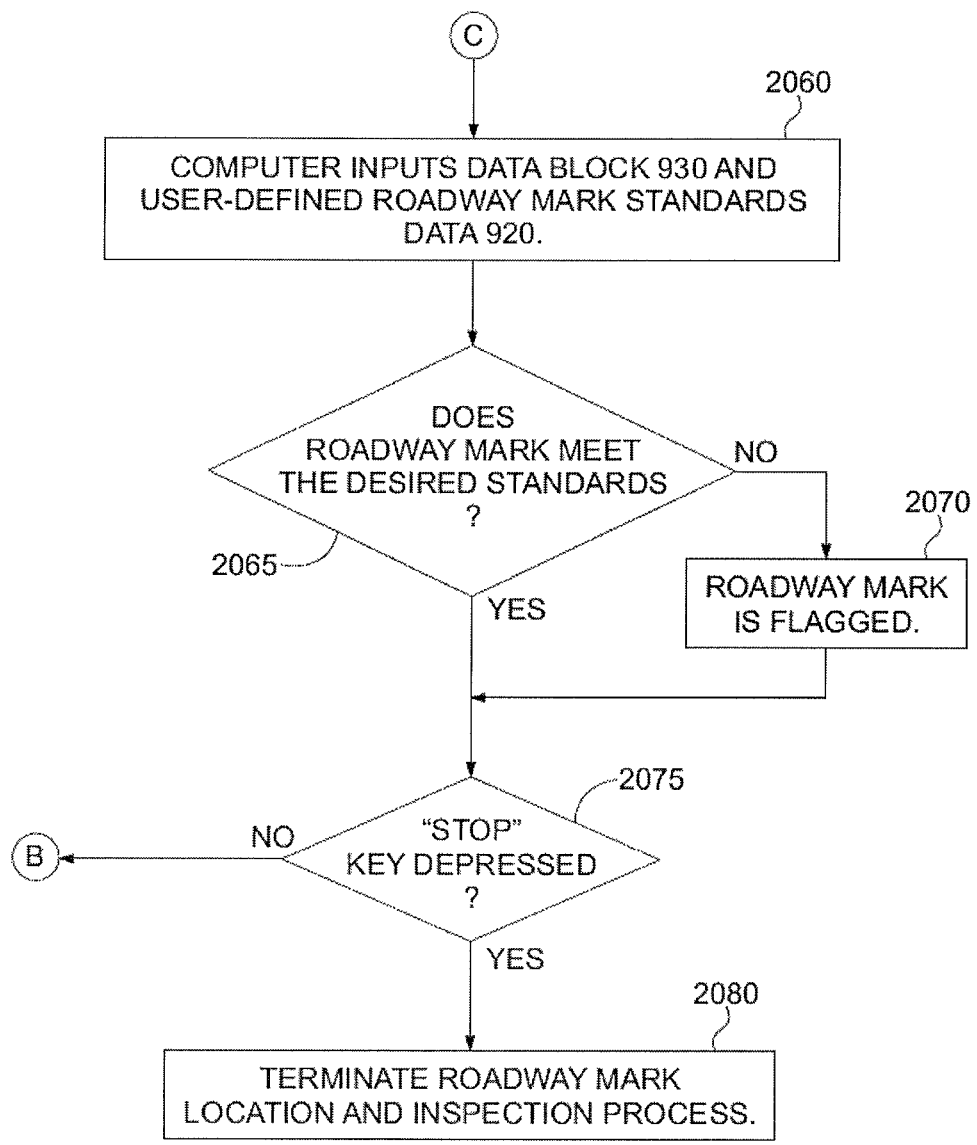

In operation and referring to FIGS. 21A-C, the operator begins the process of determining and recording the accurate filter-enhanced GPS geographical location of a roadway mark and/or inspecting the roadway mark beginning with step 2000 by first powering-up the system (i.e., turning on the power supply 590). The power supply 590 supplies power via the bus 592 to the respective components discussed above. With power applied via the bus 592, all components begin operating. In response to supplied power, the GPS receiver 22 begins to input the GPS radio signals 505 from the GPS antenna 510 and starts to calculate the raw GPS geographical location 507 and time-tag information. The GPS receiver 22 also generates the periodic pulse signal 600 which flows onto the line 594 to the synchronization circuit 530.

The program flow then continues to step 2005. In step 2005, the operator chooses to locate or locate and inspect the roadway mark and transmits their decision to the computer 580 via the keyboard 560. If the operator chooses to only locate and record the roadway mark location, program flow continues to step 2015.

If the operator chooses to locate and inspect the roadway mark, process flows continues to step 2010. In step 2010, the operator inputs the desired user-defined calculations 910 using the keyboard 560. Program flow then continues to step 2015.

In step 2015, the operator positions the vehicle 1 at the beginning roadway mark path location (the reference location which may be the origin of coordinate system 16), and begins to travel on the roadway 2 maintaining the vehicle 1 within the lane 11a defined by roadway demarcation marks, for example, the center mark 30 and the roadway side mark 25. At a chosen position for beginning to locate or locate and inspect the left and/or right side roadway marks and/or determine the geographical location of the pre-existing roadway marks, the user depresses a "Start" key on the keyboard 560 which communicates this key selection to the computer 580 via the connection 561. Program flow continues to step 2020.

In step 2020, the computer 580 then inputs the speed data of the vehicle 1 from the speed detector 545 (or alternatively uses the differences in vehicle GPS position and time data from the GPS receiver 22 to compute vehicle speed). In response to the speed of the vehicle 1, the computer 580 programs the programmable divider circuit 665 of the synchronization circuit 530 via the signals 670 placed onto the bus 540. In response to the programmed divider circuit 665, the synchronization circuit 530 outputs the periodic pulse signal 610 onto the line 596 which flows via the bus 540 to the image acquisition system 582 contained within the computer 580. In response to the periodic signal 610, the image acquisition system 582 triggers the imagers 50 and 60 to capture the roadway mark areas 55 and 65, respectively, and stores the images of the roadway mark into the computer data memory 720. Additionally, the computer 580 inputs via the bus 540 sensor data from the accelerometer sub-system 1000, the gyroscopic sub-system 1010, the magnetometer sub-system 1020, the air pressure sensor 1030, the temperature sensor 1040 and the front wheel steering angle sensor 1050.

In response to the speed of the vehicle 1, the programmed divider circuit 665 insures that the frequency of the trigger periodic pulse signal 610 is sufficient to trigger the imagers 50 and 60 at a rate to acquire overlapping images so that a continuous image of the roadway mark path is obtained and there are no missing sections of the roadway mark.

It is further noted that by having the frequency of image-triggering periodic pulse signal 610 programmable and dependent upon the speed of the vehicle 1 insures that efficient use of the computer data memory 720 occurs when storing image data. For example, the vehicle 1 may be stopped at a traffic light or experience significant variations in vehicle speed as might occur in stop-and-go traffic. Adjusting the frequency of the image-triggering periodic pulse signal 610 as a function of the speed of the vehicle 1 insures that at lower vehicle speeds fewer roadway images are taken while at higher vehicle speeds many more roadway images are taken while still maintaining sufficient image overlap so that there are no missing sections of the roadway mark and the complete and entire roadway mark and mark path has been imaged. Program flow then continues to step 2025.

In step 2025, the computer 580 computes the filter-enhanced GPS geographical location data of vehicle 1 (and any point on vehicle 1 using positional offset correction) using the Bayesian model-based filter program 790, described in greater detail below. The program 790 further has a kinematic model of the vehicle 1. Sensor data is fused to produce a statistically optimal GPS geographical location of the vehicle 1. Program flow continues to step 2030.

In step 2030, the synchronization and positional interpolation program 730 corrects the positional data of each roadway image for the GPS receiver 22 latency, if any, and performs positional interpolation using filter-enhanced GPS geographical location data to insure an accurate filter-enhanced GPS geographical position for each roadway image, sequentially numbers each captured image with the image index number 901, and then stores the index number 901, the captured image data 902, the time of image acquisition 903 (time tags the roadway image), and the filter-enhanced GPS geographical location 904 of the roadway image as data block 900 into the computer data memory 720. Program flow then continues to step 2035.

In step 2035, the machine vision program 740 then inputs the images stored in the data block 900 format indicted by the arrow 950, performs geometric calculations and identifies the roadway mark within the roadway mark image and determines the filter-enhanced GPS geographical location of the roadway mark, noted as data 904a in FIG. 18. Program flow then continues to step 2040.

In step 2040, if the location of the roadway mark is singularly desired, program flow continues to step 2045. If roadway mark inspection is additionally desired, program flow continues to step 2055.

In step 2045, a check is made to see if the operator has depressed the "Stop" key on the keyboard 560. If the "Stop" key has been depressed, program flow continues to step 2050 which terminates the roadway mark location process. If the "Stop" key was not depressed, program flow continues back to the beginning of step 2020 and further roadway mark location data is collected and stored into the computer data memory 720.

Roadway mark location data can then be used by the sampling program 760 and the curve fitting program 770 to calculate a first continuous mathematical function to best fit the discrete filter-enhanced GPS geographical location data, thus providing a smooth roadway mark path continuous location function.

In step 2055, the machine vision program 740 identifies the roadway mark within the roadway image, determines the filter-enhanced GPS location of the mark, and also determines the width and length of the roadway mark, grayscale reflectivity, fill percentages, and other roadway mark characteristics as defined by the user-defined calculations input 910. The original data stored in the data block 900 for each image are now expanded to include the actual roadway mark filter-enhanced GPS geographical location 904a, the mark dimensions 905, the area fill percentage 906, and the grayscale reflectivity values 907 and any other user-defined calculations input 910 forming the data block 930. The data block 930 may also be stored in the computer data memory 720. In addition, the machine vision program 740 displays the merged image 990 which is subsequently viewed by the operator (see FIG. 20). Program flow then continues to step 2060.

In step 2060, the inspection program 750 inputs the data block 930 as indicated by the arrow 960 and also inputs the user-defined roadway mark standards data 920. Program flow then continues to step 2065.

In step 2065, the inspection program 750 compares the data contained within the data block 930 with the corresponding data contained within the roadway mark standards data 920. If the roadway mark meets (or exceeds) the roadway mark standards 920, program flow continues to step 2075. Otherwise program flow continues to step 2070.

In step 2075, the computer 580 determines if the "Stop" key has been depressed on keyboard 560. If the Stop key has been depressed, program flow continues to step 2080. In step 2080, the computer 580 terminates the roadway mark location and inspection process. Otherwise, if the Stop key is not depressed, program flow continues back to the beginning of step 2020.

In step 2070, the roadway mark not meeting the user defined roadway mark standards 920 is error flagged as noted in the error flags section 908 in FIG. 18 and saved to the computer data memory 720 as indicated by the arrow 970. Program flow then continues to step 2075.

The sampling program 760 then samples the filter-enhanced GPS geographical position of the roadway mark using the location data 904a. The curve fitting program 770 inputs the filter-enhanced sampled GPS geographical location data 904a previously stored in the computer data memory 720 and determines a first continuous mathematical function which best fits the discrete GPS coordinate data. The curve offsetting program 780 inputs the continuous function determined by the curve fitting program 770 and generates a second continuous function similar and parallel to the first function but offset from the first function by a given distance. For example, the first function may represent the roadway center mark 30 on the roadway 2. A second function defining a line for the roadway edge mark 25 may be derived from the first function by offsetting the first function by a distance, or the first function may represent the roadway edge mark 20 and the roadway center mark 30 may be derived from the first function by offsetting the first function by a distance. Usually the roadway mark path continuous function is determined from the collected location data 904a after the vehicle 1 has completed the entire desired roadway mark path, although this functionality could be easily incorporated into the program flow of FIGS. 21A-21C.

The continuous function(s) determined by the curve fitting program 770 and/or the curve offsetting program 780, along with roadway mark characteristics, are then used by a GPS roadway marker as previously described to replicate the original roadway marks 20, 25, 30 onto the repaved roadway top surface 17. As previously noted, the operator depresses the "Stop" key which terminates the above processes.

Thus, the geographical position of the roadway marks 20, 25, 30 which do not meet the desired roadway mark standards can be identified and, with the accurate GPS geographical position known, later used for remedial work. The roadway mark GPS geographical position can also be used to remark the repaved roadway top surface 17. The filter-enhanced GPS geographical location data of the roadway mark path and roadway side marks can be used to further enhance lane warning departure systems which may not work if the roadway marks are obscured by snow or reflecting sunlight.

The systems depicted in FIGS. 4 and 12 and described above show individual components necessary to implement a Bayesian model-based filter (e.g., a Kalman filter) enhanced GPS system for (a) determining accurate GPS geographical positions of roadway marks from raw GPS location data, and (b) replicating the original roadway mark. The system may include an inertial navigation system (INS) which integrates most of the aforementioned sensors and a dual GPS receiver in one package. One example of such a system is the Spatial Dual model manufactured by Advanced Navigation of New South Wales, Australia. Advanced Navigation also manufactures a more accurate INS system using a fiber optic gyroscope (FOG). These systems provide a compact and robust system and automatically provide improved Kalman filter enhanced GPS geographical location data. The spatial dual model uses two GPS antennas and two cooperating GPS receivers to achieve better heading accuracy at low speeds than that obtained from just one receiver (this is especially important for slow speeds sometimes encountered during reapplication of roadway mark material).

Figure 22A:
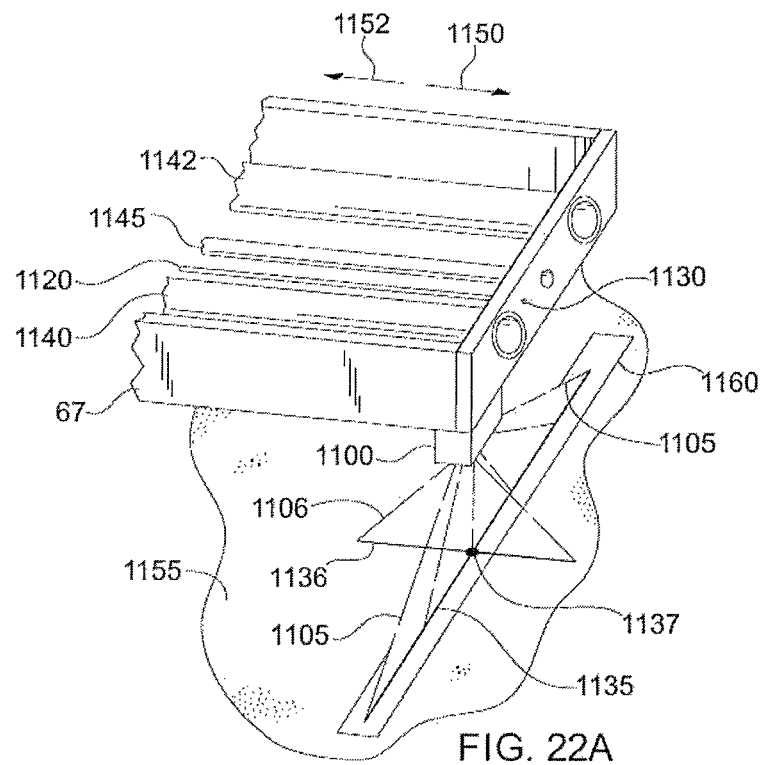
FIG. 22A illustrates a laterally extended carriage having a downwardly directed laser line positioned over and intersecting a roadway mark.
Figure 22B:
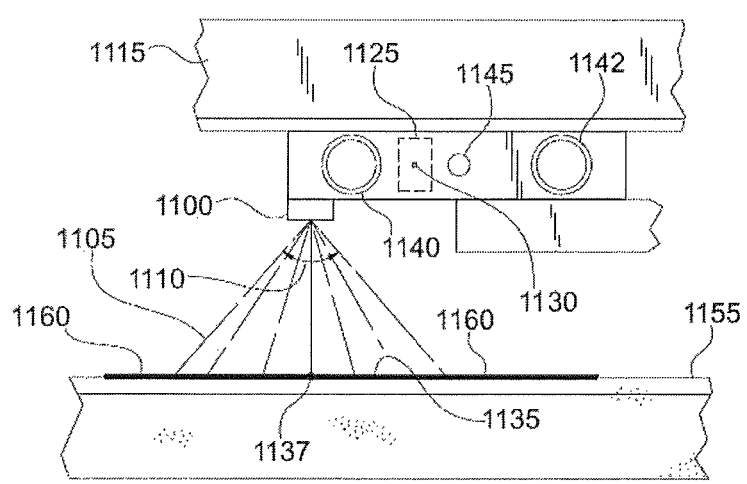
FIG. 22B illustrates a side planar view of the laterally extended carriage with the downwardly directed laser lines intersecting the roadway mark and surface.

According to another embodiment, the present invention provides an apparatus for manually determining the geographical location of a roadway mark using a visual projected laser cross hair line (or dot). Referring to FIGS. 22A and 22B, a roadway surface 1155 is shown having a pre-existing roadway mark 1160. A carriage 67 is shown in a laterally extended position away from a body 1115 of the vehicle 1. Attached to the outermost point of the carriage 67 is a conventional downwardly focused laser cross hair line generator 1100 producing projected laser lines 1105 and 1106 (perpendicular to each other). The laser cross hair line generator 1100 is rotatably positioned on the carriage 67 so that the projected laser line 1105 is substantially parallel to the x-axis of the vehicle 1. The projected laser line 1105 is also characterized by a fan angle 1110, and the laser line 1106 is also characterized by a fan angle (not shown). The intersection of the laser lines 1105 and 1106 with the road surface 1155 produces visual line patterns 1135 and 1136, respectively, which can be observed by the carriage operator (the projected laser lines 1105 and 1106 are reflected off of the roadway surface 1155). Preferably, a green laser is used for this application. The intersection of the projected laser lines 1105 and 1106 produce a visual intersection point 1137.

A linear distance sensor (preferably a conventional draw wire sensor) 1125 is attached to body 1115 and an extendable wire 1120 of the linear distance sensor 1125 is attached to the carriage at point 1130. An example of a draw wire sensor is model WDS-P115 manufactured by Micro-Epsilon of Raleigh, N.C. Also shown in FIGS. 22A and 22B are lateral carriage support arms 1140 and 1142 and a hydraulic piston rod 1145. The carriage operator has lateral control of the position of the carriage 67 in directions noted by arrows 1150 and 1152 (i.e., the lateral position of the carriage 67 can be manually adjusted) by controlling a hydraulic system which extends or retracts the hydraulic piston rod 1145. Thus the operator can laterally align the carriage 67 so that the visual line patterns 1135 and 1136 and intersection point 1137 can be positioned over the lateral center of the roadway mark 1160. The lateral position of the visual intersection point 1137 is therefore determined by the linear distance sensor 1125.

Figure 23:
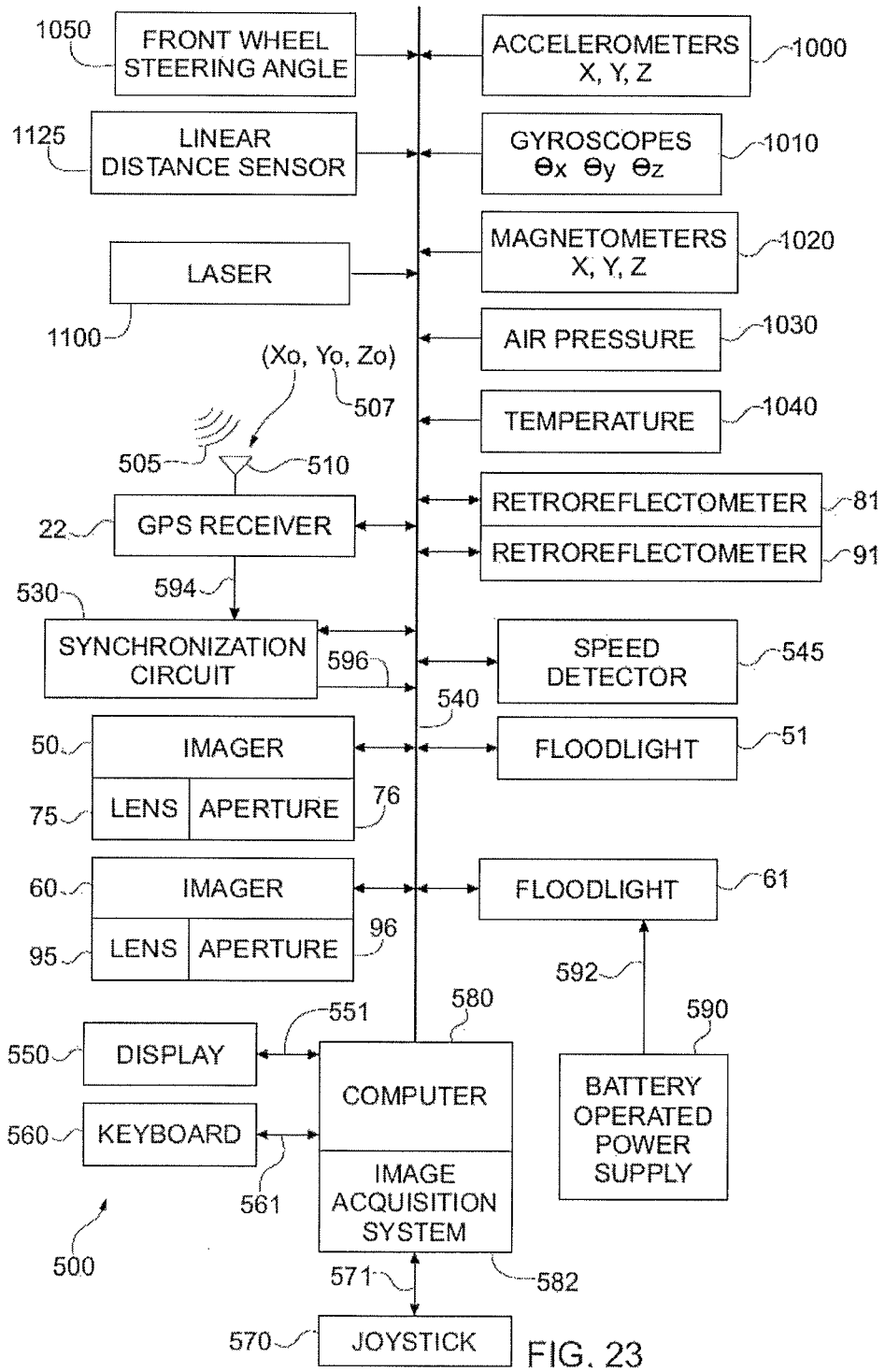
FIG. 23 is a block diagram of another embodiment of the invention, specifically illustrating the addition of lasers and a linear distance sensor for measuring the lateral distance of an extended carriage.

Referring additionally to FIG. 23, a block diagram of the manually operated roadway mark locator is shown and is similar to that of FIG. 12 except that the linear distance sensor 1125 and laser 1100 have been added. Both the linear distance sensor 1125 and laser cross hair line generator 1100 are in bi-directional communication with the computer 580 and all other components via the bus 540. Not explicitly shown is the hydraulic system for moving carriage the 67 of which is more fully described international patent application PCT/US2016/017000, incorporated by reference into this document, in its entirety and for all purposes.

In operation, the driver positions the vehicle 1 alongside of the roadway mark 1106. The carriage operator through the keyboard 560 then instructs computer to turn on the laser cross hair line generator 1100. The laser cross hair line generator 1100 then projects the laser lines 1105 and 1106 onto the roadway surface 1155. The carriage operator then laterally moves the carriage 67 until the intersection of the laser lines 1105 and 1106 (i.e., the intersection point 1137)

intersects the roadway mark 1160 (usually at the lateral center of the mark). At this point the laser lines 1105 and 1106 intersection is aligned with and centered over the roadway mark.

The operator then verbally instructs the driver to proceed along the roadway mark path and simultaneously depresses a "Start" key which instructs computer 580 to begin calculating the Kalman filter enhanced geographical of the visual intersection point 1137. It is further noted and understood that positional offsets between the GPS antenna and the center of the cross hair projection onto the roadway surface have been accounted for and a calibrated filter-enhanced GPS position of the visual intersection point 1137 on the roadway surface 1155 has been determined using conventional calibration techniques. As the vehicle 1 moves along the roadway mark path, the carriage operator maintains registration between the intersection point 1137 and the lateral center of the roadway mark 1160 by manually adjusting the lateral position of the carriage 67.

Raw GPS data is corrected based upon sensor data and the kinematic model of the vehicle 1 using the Bayesian model-based filter program 790 as previously described above. The computer 580, instead of inputting images with the periodic pulse signal 610, now inputs data from the linear distance sensor 1125 and, using the previously calibration offsets, computes the filter-enhanced GPS location of the intersection point 1137, and therefore the center of the roadway mark 1160. Thus the position of the roadway mark path is sampled in a similar fashion to that discussed above except that the linear distance sensor 1125 is used instead of images of the roadway mark 1160. Further, it is understood that an integrated inertial navigation system having Kalman and Kalman-like filter algorithms (such as the Spatial Dual previously mentioned) may also be used with this embodiment.

Figure 24:
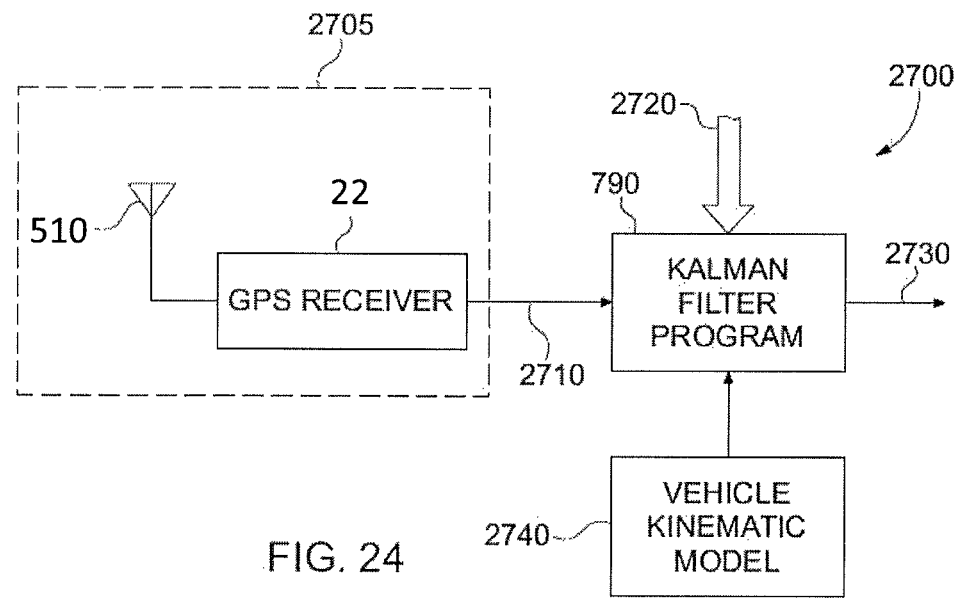
FIG. 24 is a block diagram illustrating the application of the Bayesian model-based filter implemented as a Kalman filter.

Referring now to FIG. 24, a block diagram illustrating the application of the Bayesian model-based man filter program 790 to the roadway mark locator, inspection apparatus and marker is shown, and in particular shows the inputs to the Kalman filter program. The input is the raw GPS data derived from the GPS receiver 22 (or an array of GPS receivers noted as 2705) and sensor data (for example, the accelerometers, gyroscopes, magnetometers etc.) represented by large arrow 2720. The output of the Kalman filter is the "corrected" GPS coordinates, i.e., the Kalman filter enhanced GPS geographical location data 2730 (vs. raw GPS data 2710 which may be RTK corrected). It is understood that the kinematic model of the vehicle 1 in the state space formulation 2740 is included in the Kalman filter program.

Figure 25:
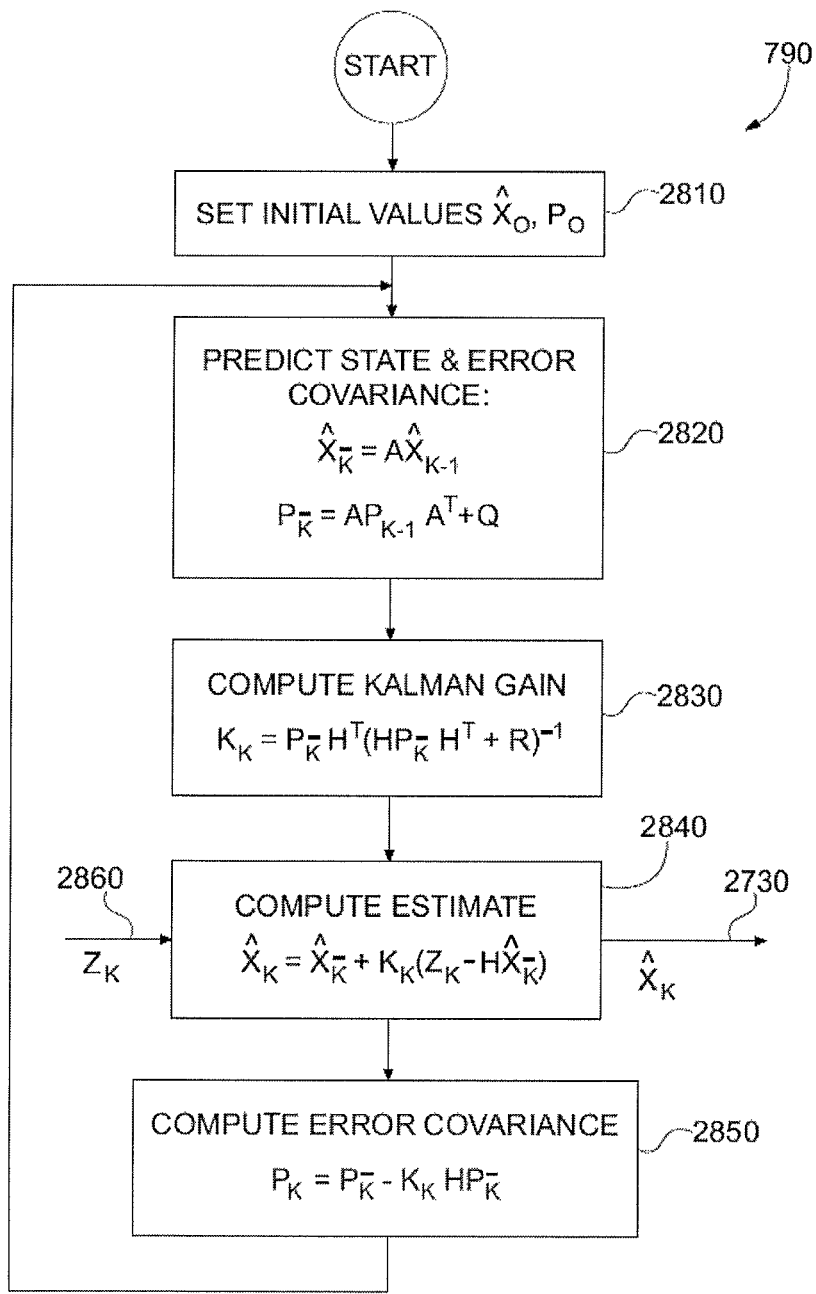
FIG. 25 is a block diagram illustrating an example of the Kalman filter algorithm.

Referring now additionally to FIG. 25, an example of a Kalman filter algorithm (program) 790 is shown. The Kalman filter statistically optimizes the estimate of a process state at some discrete time, for example, the GPS position of the vehicle 1, and then obtains feedback data from noisy measurements obtained from sensors, such as the magnetometer sub-system 1020, front wheel steering angle sensor 1050, gyroscopic sub-system 1010, accelerometer sub-system 1000, air pressure sensor 1030, air pressure sensor 1030, and temperature sensor 1040, speed detector 545 and the raw GPS location data (which may be modified using RTK data). Equations for the Kalman filter can be categorized into the time update equations which project forward in time the current state and error covariance estimates (prediction stage) to obtain the a priori estimates for the next step by using the system evolution prediction model, and the measurement update equations which incorporates new measurement data into the a priori estimate (corrects the previous a priori estimate) to obtain an improved a posteriori estimate (correction stage). Values are also input to initialize the filter program. An example of a Kalman filter algorithm is illustrated. The Kalman filter algorithm depicted in FIG. 25 is taken from *Kalman Filter for Beginners* by Phil Kim (ISBN: 1463648359).

In step 2810, the initial values for the state $\bar{\bar{X}}$ and error covariance $P_k$ (respectively $\hat{X}_0$ and $P_0$) are input into an algorithm 790 (where for initial values k=0). Operational flow then continues to step 2820.

In step 2820, the predicted state $\hat{X}_{\bar{k}}$ and the predicted error covariance $P_{\bar{k}}$ at a current time k is computed based upon the previous values of $\hat{X}$ and P (i.e., $\hat{X}_{k-1}$ and $P_{k-1}$). The variable A represents the state transition matrix and the variable Q is the covariance matrix of the state transition noise. The matrix A contains the equations of motion of the system. Operational flow then continues to step 2830.

In step 2830, the Kalman gain $K_k$ is determined from the predicted error covariance. The variable H represents the state to measurement matrix and the variable R represents the covariance matrix of the measurement noise. Operational flow then continues to step 2840.

In step 2840, an estimate of the current state $\hat{X}_k$ is computed using the Kalman gain computed in step 2830. $Z_k$ 2860 represents data from accelerometer sub-system 1000, gyroscopic sub-system 1010, magnetometer sub-system 1020, air pressure sensor 1030, temperature sensor 1040, speed detector 545, front wheel steering angle sensor 1050 data and GPS location data 2710 input. Filter-enhanced GPS geographical location data $\hat{X}_k$ 2730 is output from this step. It should be noted that the above sensors are referenced to FIGS. 4, 12, and 23. Operational flow then continues to step 2850.

In step 2850, the current error covariance $P_k$ is computed using the Kalman gain computed in step 2830 and the predicted error covariance $P_{\bar{k}}$ computed in step 2820. Operational flow then continues back to step 2820. The program terminates upon depressing the "Stop" key.

As previously mentioned, an inertial navigation system manufactured by Advanced Navigation incorporates two GPS receiver modules and cooperating antennas along with a temperature sensor, an air pressure sensor, a magnetometer sub-system, an accelerometer sub-system, a gyroscope sub-system. Provisions are also made for accepting the speed of vehicle 50.

The advantages of using Kalman or Kalman-like filter algorithms for the roadway marking industry includes the following:
1. More accurate GPS geographical data is computed for determining the GPS geographical location of roadway marks;
2. Smoother GPS geographical data is available;
3. The filter is recursive and efficient; and
4. Is easy to code and lends itself to computer implementation.

All of the above advantages improve roadway mark locators, inspection apparatus and markers.

Although illustrated and described above with reference to certain specific embodiments, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

The invention claimed is:
1. An apparatus for determining a geographical location of a roadway mark from a moving vehicle, the apparatus comprising:
   a GPS antenna mounted to a vehicle;
   a GPS receiver responsive to the GPS antenna and configured to determine a raw geographical location of the GPS antenna;
   a first imager mounted to the vehicle, wherein the first imager is (a) synchronously responsive to the GPS receiver and (b) configured to image a first roadway mark to provide a first roadway mark image;
   a plurality of sensors configured to collect data about the conditions of the vehicle; and
   a computer (a) responsive to the GPS receiver, the first imager, and the plurality of sensors and (b) configured to determine a GPS location of the first roadway mark using a Bayesian model-based filter which accounts for the raw geographical location of the GPS antenna and the data collected by the plurality of sensors.
2. The apparatus according to claim 1 wherein:
   the GPS antenna is configured to receive GPS radio wave signals originating from a GPS satellite system or a GPS-pseudolite array, and
   the GPS receiver is configured to receive the GPS radio wave signals from the GPS antenna and decode the GPS signals to determine the raw geographical location of the GPS antenna.
3. The apparatus according to claim 2, wherein the GPS radio wave signals comprise a real time kinematic correction signal.
4. The apparatus of claim 1, wherein the computer is further configured to (i) calculate roadway mark characteristics from the first roadway mark image and (ii) compares the calculated roadway mark characteristics against a standard set of roadway mark characteristics.
5. The apparatus according to claim 4, wherein the roadway mark characteristics are at least one of a width of the roadway mark, a length of the roadway mark, a grayscale reflectivity, retroreflectivity, and a fill percentage.
6. The apparatus according to claim 1, wherein the first imager is mounted to the vehicle using an adjustable mount including a fixably adjustable axis of rotation parallel to a roadway surface including the first roadway mark for aligning the first imager so that the first imager can focus on the roadway mark.
7. The apparatus according to claim 1, wherein the first roadway mark is located to the left of a direction of travel of the vehicle, the apparatus further comprising a second imager mounted on the vehicle and aligned to image a second roadway mark to the right of the direction of travel of the vehicle,
   wherein the second imager is (a) synchronously responsive to the GPS receiver and (b) configured to image a second roadway mark to provide a second roadway mark image; and, and
   the computer is (a) further responsive to the second imager and (b) configured to determine a GPS location of the second roadway mark using a Bayesian model-based filter which accounts for the raw geographical location of the GPS antenna and the data collected by the plurality of sensors.
8. The apparatus according to claim 1, wherein the Bayesian model-based filter is a Kalman filter.

9. The apparatus according to claim 1, wherein the plurality of sensors include one or more sensors selected from the group consisting of an accelerometer, a gyroscope, a magnetometer, an air pressure sensor, a temperature sensor, steering wheel angle sensor and a speed detector.
10. The apparatus according to claim 1, wherein the Bayesian model-based filter further accounts for a kinematic model of the vehicle.
11. The apparatus according to claim 1, wherein the Bayesian model-based filter converts the raw geographical location of the GPS antenna to a filter-enhanced geographical location of the GPS antenna by adjusting the raw geographical location of the GPS antenna based on the data collected from the plurality of sensors and a kinematic model of the vehicle.
12. The apparatus according to claim 1, wherein the first imager is a calibrated imager.
13. The apparatus according to claim 12 wherein the first imager is a GPS calibrated imager.
14. The apparatus according to claim 1, wherein the first imager is a charge coupled device camera.
15. A method for determining a geographical location of a roadway mark from a moving vehicle, comprising:
   determining with a GPS receiver a raw geographical location of a GPS antenna mounted to a vehicle;
   collecting data about the conditions of the vehicle using a plurality of sensors;
   imaging a first roadway mark using a first imager mounted to the vehicle to produce a first roadway mark image, wherein the first imager is synchronously responsive to the GPS receiver; and
   using a computer which is responsive to the GPS receiver, the first imager, and the plurality of sensors to determine a GPS location of the first roadway mark using a Bayesian model-based filter which accounts for the raw geographical location of the GPS antenna and the data collected by the plurality of sensors.
16. The method according to claim 15, wherein the first imager is a GPS calibrated imager.
17. The method according to claim 15, further comprising using the computer to:
   calculate roadway mark characteristics from the first roadway mark image; and
   compare the calculated roadway mark characteristics against a standard set of roadway mark characteristics.
18. The method according to claim 16, wherein the roadway mark characteristics include at least one of a width of the first roadway mark, a length of the first roadway mark, a grayscale reflectivity, retroreflectivity, and a fill percentage.
19. The method according to claim 15, further comprising the GPS antenna receiving GPS radio-wave signals originating from a GPS satellite system or a GPS-pseudolite array, wherein determining the raw geographical location of the GPS antenna comprises the GPS receiver receiving the GPS radio-wave signals from the GPS antenna and decoding the GPS radio-wave signals.
20. The apparatus according to claim 19, wherein the GPS radio-wave signals comprise a real time kinematic correction signal.
21. The method according to claim 15, wherein the first imager is mounted to the vehicle using an adjustable mount including a fixably adjustable axis of rotation parallel to the roadway surface for aligning the first imager so that the first imager can focus on the roadway mark.

22. The method according to claim 15, wherein the first roadway mark is located to the left of a direction of travel of the vehicle, further comprising:
  imaging a second roadway mark located to the right of the direction of travel of the vehicle using a second imager mounted to the vehicle to produce a second roadway mark image, wherein the second imager is synchronously responsive to the GPS receiver; and
  using a computer to determine a GPS location of the second roadway mark using a Bayesian model-based filter which accounts for the raw geographical location of the GPS antenna and the data collected by the plurality of sensors.

23. The method according to claim 15, wherein the Bayesian model-based filter is a Kalman filter.

24. The method according to claim 15 wherein the plurality of sensors include one or more sensors selected from the group consisting of an accelerometer, a gyroscope, a magnetometer, an air pressure sensor, a temperature sensor, steering wheel angle sensor and a speed detector.

25. The method according to claim 15, wherein the Bayesian model-based filter further accounts for a kinematic model of the vehicle.

26. The method according to claim 15, further comprising the Bayesian model-based filter converting the raw geographical location of the GPS antenna to a filter-enhanced geographical location of the GPS antenna by adjusting the raw geographical location of the GPS antenna based on the data collected from the plurality of sensors.

27. The method according to claim 15, wherein the first imager is a calibrated imager.

28. The method according to claim 15, wherein the first imager is a charge coupled device camera.

29. An apparatus for locating and placing marks on a roadway, the apparatus comprising:
  a GPS antenna mounted to a vehicle;
  a GPS receiver responsive to the GPS antenna and configured to determine a raw geographical location of the GPS antenna;
  a first imager mounted to the vehicle, wherein the first imager is (a) synchronously responsive to the GPS receiver and (b) configured to image a roadway mark to provide a roadway mark image;
  a plurality of sensors configured to collect data about the conditions of the vehicle;
  a computer (a) responsive to the GPS receiver, the first imager, and the plurality of sensors, and (b) configured to:
    (1) determine a GPS location of the first roadway mark using a Bayesian model-based filter which accounts for the raw geographical location of the GPS antenna and the data collected by the plurality of sensors, and
    (2) determine a continuous smooth geographical location function best-fitted to the GPS location of the roadway mark; and
  a marker responsive to the computer for replicating automatically the roadway mark onto the roadway based on the continuous smooth geographical location function.

30. The apparatus according to claim 29, wherein:
  the GPS antenna is configured to receive GPS radio wave signals originating from a GPS satellite system or a GPS-pseudolite array, and
  the GPS receiver is configured to receive the GPS radio wave signals from the GPS antenna and decode the GPS signals to determine the raw geographical location of the GPS antenna.

31. The apparatus according to claim 30, wherein the GPS receiver is further configured to receive real time kinematic (RTK) signals to determine the raw geographical location of the GPS antenna.

32. The apparatus according to claim 29 further comprising a second imager which images the roadway in front of the vehicle.

33. The apparatus according to claim 29 further comprising a speed detector and a nozzle array and control system, the speed detector informing the nozzle array and control system and enabling the nozzle array and control system to adjust the rate at which it places marking material onto the roadway.

34. The apparatus according to claim 29, wherein the computer generates an additional roadway mark function by offsetting the continuous function by an amount consistent with the desired position of a second roadway mark relative to the replicated roadway mark.

35. An apparatus for guiding a vehicle having a snow plow along a roadway, the apparatus comprising:
  a GPS antenna mounted to a vehicle;
  a GPS receiver responsive to the GPS antenna and configured to determine a raw geographical location of the GPS antenna;
  a first imager mounted to the vehicle, wherein the first imager is (a) synchronously responsive to the GPS receiver and (b) configured to image a first roadway mark to provide a first roadway mark image;
  a plurality of sensors configured to collect data about the conditions of the vehicle;
    a computer (a) responsive to the GPS receiver, the first imager, and the plurality of sensors and (b) configured to:
      (1) determine a GPS location of the roadway mark using a Bayesian model-based filter which accounts for the raw geographical location of the GPS antenna and the data collected by the plurality of sensors, and
      (2) determine a continuous smooth geographical location function best-fitted to the GPS location of the roadway mark; and
  a system responsive to the computer for positioning the snow plow based on the continuous smooth geographical location function.

36. An apparatus for locating and placing marks on a roadway, the apparatus comprising:
  a GPS antenna mounted to a vehicle;
  a GPS receiver responsive to the GPS antenna and configured to determine a raw geographical location of the GPS antenna;
  an imager mounted to the vehicle, wherein the imager is (a) synchronously responsive to the GPS receiver and (b) configured to image a roadway mark to provide a roadway mark image;
  a plurality of sensors configured to collect data about the conditions of the vehicle; and
  a computer (a) responsive to the GPS receiver, the imager, and the plurality of sensors, and (b) configured to:
    (1) determine a GPS location of the roadway mark using a Bayesian model-based filter which accounts for the raw geographical location of the GPS antenna and the data collected by the plurality of sensors, and
    (2) determine a continuous smooth geographical location function best-fitted to the GPS location of the roadway mark; and
  a nozzle array and control system responsive to the computer for replicating automatically the roadway mark at a location defined by the continuous smooth geographical location function by placing a marking material on the roadway.

37. An apparatus for determining a continuous smooth geographical location function of a roadway mark comprising:
- a GPS antenna mounted to a vehicle;
- a GPS receiver responsive to the GPS antenna and configured to determine a raw geographical location of the GPS antenna;
- an imager mounted to the vehicle, wherein the imager is (a) synchronously responsive to the GPS receiver and (b) configured to image a roadway mark to provide a roadway mark image;
- a plurality of sensors configured to collect data about the conditions of the vehicle; and
- a computer (a) responsive to the GPS receiver, the imager, and the plurality of sensors, and (b) configured to:
  (1) determine a GPS location of the roadway mark using a Bayesian model-based filter which accounts for the raw geographical location of the GPS antenna and the data collected by the plurality of sensors, and
  (b) calculate a smooth continuous geographical location function from the GPS location of the roadway mark.

38. The apparatus according to claim 37, wherein the smooth continuous geographical location function is a best-fitted continuous geographical location function.

\* \* \* \* \*

UNITED STATES PATENT AND TRADEMARK OFFICE
CERTIFICATE OF CORRECTION

PATENT NO. : 9,784,843 B2
APPLICATION NO. : 15/082365
DATED : October 10, 2017
INVENTOR(S) : Dolinar et al.

Page 1 of 1

It is certified that error appears in the above-identified patent and that said Letters Patent is hereby corrected as shown below:

In the Claims

In Claim 7, at Column 41, Line 59 should read:
mark image; and

Signed and Sealed this
Thirteenth Day of February, 2018

Andrei Iancu
*Director of the United States Patent and Trademark Office*